(12) United States Patent
Ram et al.

(10) Patent No.: US 7,797,226 B2
(45) Date of Patent: Sep. 14, 2010

(54) INTERACTIVE GRID-BASED GRAPHICAL TRADING SYSTEM FOR REAL TIME SECURITY TRADING

(75) Inventors: Pranil Ram, 130 L. P. Leviste St. Salcedo Village, Unit 5-D, LPL Center, Makati City (PH) 1227; Crispin M. Almodovar, Singapore (SG)

(73) Assignee: Pranil Ram, Makati (PH)

( * ) Notice: Subject to any disclaimer, the term of this patent is extended or adjusted under 35 U.S.C. 154(b) by 173 days.

(21) Appl. No.: 12/035,670

(22) Filed: Feb. 22, 2008

(65) Prior Publication Data
US 2008/0140559 A1 Jun. 12, 2008

Related U.S. Application Data

(63) Continuation of application No. 09/897,437, filed on Jul. 3, 2001, now abandoned.

(51) Int. Cl.
*G06Q 40/00* (2006.01)
(52) U.S. Cl. .............................. 705/37; 705/38; 705/36; 705/35
(58) Field of Classification Search .............. 705/35–38
See application file for complete search history.

(56) References Cited

OTHER PUBLICATIONS

Virtual Reality on the Trading Desk Lawton, George. Wall Street & Technology. New York: Feb. 1992. vol. 9, Iss. 6; p. 14, 3 pgs.*

* cited by examiner

*Primary Examiner*—Frantzy Poinvil
*Assistant Examiner*—Clement Graham

(57) ABSTRACT

An interactive grid-based graphical trading system for use in securities trading provides a dynamic, visual display of trading data consisting of orders, quotes and indices, for any security and for any number of market participants. The trading data are plotted on a grid consisting of cells arranged in rows and columns, which are associated with specific parameters. Distinct visual presentation styles are used, and differences in the price parameter are represented spatially. The values of the price and other parameters associated with the same orders and quotes are mapped against the values associated with the rows and columns of the grid. A trader may place or modify trading orders by interacting with the trading data displayed on the grid, and with specific GUI objects displayed on the same grid. Trading instructions are generated and transmitted to a market participant, in a manner transparent to the trader.

20 Claims, 44 Drawing Sheets

FIG. 12

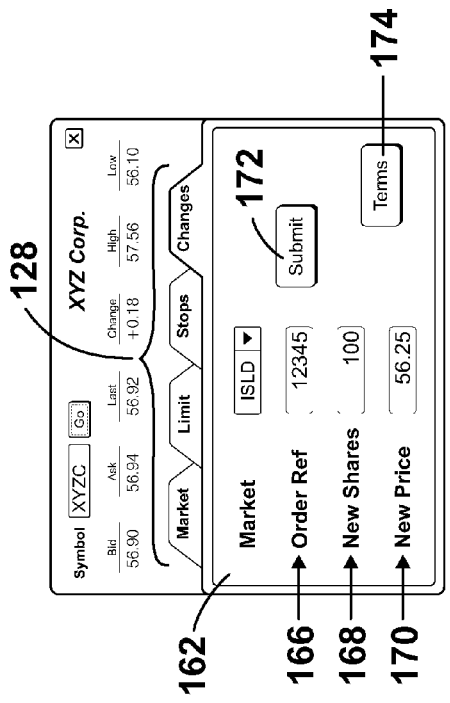
FIG. 17
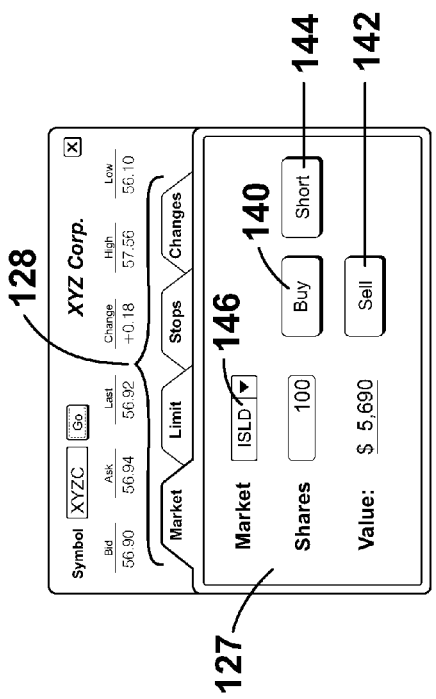
FIG. 16
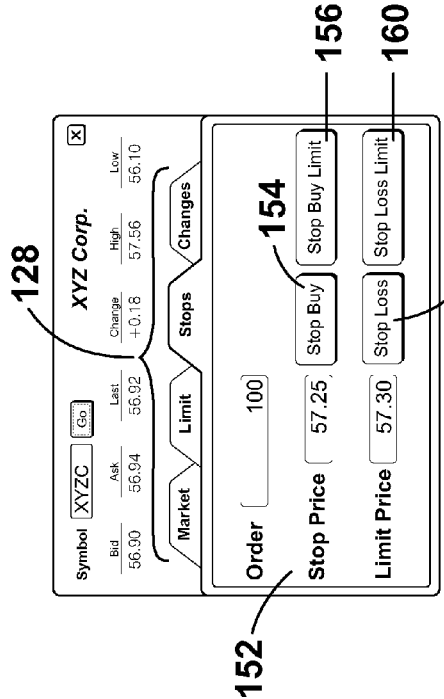
FIG. 19
FIG. 18

FIG. 39

256 — Cash / Replay / Options tabs

Symbol XYZC

Display Options
- ☒ Center Activity
- ☐ Show Bid/Ask
- ☐ Show Trades

From
- Date ▼ 02/12/2001
- Time ▼ 11:00:00 AM ← 258

To
- Date ▼ 02/12/2001
- Time ▼ 12:00:00 PM ← 260

Complete Animation In ▼ Minutes ▶ ← 119

118 → Replay
Cancel

Special Terms Settings
- ○ No Special Terms
- ○ All or None
- ● Minimum Quantity  200
- ☒ Good Till Fill,  10  DAYS
- ☐ Other Terms Cancel   Submit

Cash / Replay / Options

Option Symbol  OEYDD ← 190
Specification  OPENING ▼
Order Type  LIMIT ▼
Contracts  ▼ 10 ▲
Price  ▼ 1.70 ▲
BUY ▼

OEX April 620 Calls
S & P 100 Index

Submit ← 192

Position Guide Settings

Symbol ____   PG 200

- ● Invest ___ % of Portfolio
- ○ Invest ___ % of Buying Power

AND ▼

$ ___ In each Stock   NO MORE THAN ▼
$ ___ In each Option

Advanced Settings ← 264

Round Quantity  UP ▼

*MAXIMUM POSITION IS 2,000 SHARES*

Position Guide
Recommends →  200  Shares ← 262

US 7,797,226 B2

INTERACTIVE GRID-BASED GRAPHICAL TRADING SYSTEM FOR REAL TIME SECURITY TRADING

This application is a continuation of and claims priority to U.S. patent application Ser. No. 09/897,437 filed on Jul. 3, 2001, the entire contents of which are hereby incorporated by reference.

FIELD OF THE INVENTION

This document contains material that is subject to copyright protection. The applicant has no objection to the facsimile reproduction of this patent document, as it appears in the U.S. Patent and Trademark Office (PTO) patent file or records or in any publication by the PTO or counterpart foreign or international instrumentalities. The applicant otherwise reserves all copyright rights whatsoever.

The present invention relates to software which may be employed by individual traders who trade in real time with respect to a specific market, as buyers or sellers. The present invention provides an interactive grid-based graphical trading system comprising a "checkerboard" matrix of intersecting one or more rows and one or more columns representing, interchangeably, price increments along one axis and one or more markets or market participants along a second axis, for any specific security. The resulting grid displayed on a suitable display device is associated with market information so that a buying or selling instruction may be given. Moreover, since the display functions in real time, the user receives a dynamic graphical representation of existing market conditions at that instant in time with respect to any security. Similarly, the trader using the interactive grid-based graphical trading system may effect an order placement or order modification transaction by dragging and dropping an icon or any suitable GUI object into the "checkerboard" matrix. The user can then subsequently reposition the order graphically in terms of price and/or market participant.

BACKGROUND OF THE INVENTION

There are a number of trading systems, and a number of individuals, who engage in real time day-to-day or minute-to-minute security trading. Very often, such individuals are referred to as day traders.

Moreover, many stock brokers have an interest or duty to observe the dynamics of the market, including price fluctuations and volume of trading in any security.

However, even some proprietary software which is available for use by such individuals as day traders and stock brokers may require considerable key stroke input, and may not provide a dynamic display which indicates not only current market conditions but, by being observed over a period of time, such dynamic display would indicate what the market is doing with respect to a particular security. For example, Bank of Montreal Investorline™. requires that a user shall first enter the ticker symbol for a selected security, then enter the price, then the number of shares, and finally click on a confirmation button. As will be explained hereafter, the present invention permits the user to effectively drag and drop an icon representing at least one selected security, with a selected trading order, over a grid to a selected cell having a selected price, and dropping the icon so as to effect the desired trading order.

Graphical displays in keeping with the present invention will indicate whether the market is moving up or down, whether there is a high volume or low volume of trades occurring at the present time, and even the number of buy or sell orders that may be in place, and at what price, as they may be handled by any market participant.

The trader to whom the present invention is particularly directed is usually, but not necessarily, a sophisticated trader, who is interested in the dynamics of the market, and who is interested in obtaining data for any selected security at any instant in time, as well as to watch the changes in market conditions as they may affect that security over a period of time.

The present invention provides means, including particularly a graphical user interface, to permit the trader to achieve the goals set forth above.

While the present invention is particularly directed to an interactive grid-based graphical trading system for use in trading securities, it necessarily includes all of the appropriate physical architecture and logical architecture at least, in functional terms that are necessary in order to facilitate operation of the present invention.

Of course, it will be understood that the present invention contemplates the existence throughout the network of traders and market participants, of secure and high speed communications channels, and of sufficiently powerful and high speed computer hardware to function appropriately and to assure seamless and transparent functionality and operation of the market overview and security trading functionalities of the present invention. The present invention also contemplates that proprietary software which embodies features, functions, and particulars of the teachings herein, will be resident in any computer hardware at the site of any trader practicing or operating this invention.

SUMMARY OF THE INVENTION

The present invention provides an interactive grid-based graphical trading system for use by any trader who engages in trading securities through established security trading markets, in essentially real time. The system comprises a grid-based graphical interface for use by any trader. The graphical interface is adapted to establish a connection with any backend system used by any market participant through suitable communication channels.

The interactive grid based graphical trading system is available through a computer at each participating trader's site.

The interactive grid-based graphical trading system is adapted to receive and display market trading data received from a plurality of market participants, in essentially real time. Also, any trader may select any particular security for which data are electively required, at any instant in time.

The interactive grid-based graphical trading system includes first process means that function to send transaction instructions through communication channels to the backend system used by any market participant. It also receives messages from the backend system through communication channels. Furthermore, the grid-based graphical interface includes second process means that function to receive, process, and display market trading data, and messages, to any trader.

The market trading data includes information chosen from the group of market trading data consisting of: order data as to buy, sell, or other trading orders existing at that instant in time for any selected security or group of securities, quote data as to bid and ask prices, volume, market participant identifiers, and other parameters, existing at that instant in time for any selected security or group of securities. Also, the market trading data is transmitted to each grid-based graphical interface at the site of any participating trader from the backend system of any market participant in computer-readable electronic format.

Moreover, the interactive grid-based graphical trading system includes third process means that function to transform market trading data received from any backend system, at any instant in time, into a graphical representation for display on any display device. The graphical representation includes at least one grid having a plurality of cells arranged in an array of at least one row or at least one column. A row is an arrangement of horizontally adjacent cells with at least one common property A column is an arrangement of vertically adjacent cells with at least one common property. Each cell within the plurality of cells belongs to one row and one column.

A plurality of cells is arranged in a matrix chosen from the group consisting of: a plurality of rows and at least one column, a plurality of columns and at least one row. The plurality of rows, or the plurality of columns, are associated with an axis representing price.

Any cell may be associated with the market trading data, and contains a graphical representation of market trading data, which is associated with a specific price or range of prices.

Each cell along the price axis indicates a price or price range for which the market trading data exists. The other of at least one column or a least one row is indicative of a specific criterion chosen from a plurality of selected criteria within which the market trading data may be categorized as to price or a range of prices.

Any trader can place, or modify, an order for a selected security or group of securities, over which that trader has discretion. This is done by interacting with the grid-based graphical interface. The interaction can be accomplished by a drag and drop operation, and the order or the quote is represented graphically in a cell.

The communication channels may be network-based, so that at any instant in time a connection between any trader and a backend system of any market participant may be persistent or intermittent.

Typically, the interactive grid-based graphical trading system network is the Internet.

Moreover, any cell in a plurality of cells may be assigned specific visual or graphical attributes or properties chosen from the group of graphical or visual attributes or properties consisting of: color, border, label indicator, graphic overlay, text overlay, and combinations thereof.

The specific attribute or property assigned to any cell is a function of the specific market trading data associated therewith.

Furthermore, any trader can modify the parameters of any order over which that trader has discretion, for a selected security or group of securities being displayed on the grid-based graphical interface, at any instant in time. This is accomplished by selecting a relevant order cell using a pointing device interactive with the grid-based graphical interface, and dragging and dropping the selected relevant order cell to a destination cell. The dragging and dropping of the selected relevant order cell causes the grid-based graphical interface to activate the first process means to send transaction instructions comprising an amendment of previous specific trading parameters associated with the relevant selected order.

The second process means may electively effect an alteration of the specific visual or graphical properties assigned to both the relevant order cell and the destination cell.

The axis associated with price may be presented as a specific price range above and specific price range below the last traded price of a selected security or groups of securities at any instant in time. Furthermore, the last traded price is present on the price axis.

Furthermore, in the interactive grid-based graphical trading system of the present invention, the communication channels may include middleware used by any market participant.

In the interactive grid-based graphical trading system of the present invention, the price difference between two adjacent cells along the price axis may be the minimum price variance (MPV), or a multiple of the minimum price variance, for any selected security or groups of securities being displayed at any instant in time.

Market trading data representing specific order data and quote data for a selected security or group of securities may be presented in a matrix comprising a plurality of rows and a plurality of columns of cells. Each row of cells or each column of cells is associated with a specific price or range of specific prices for any given security or group of securities. The market trading data being displayed in any cell of the row of cells or the column of cells includes a plurality of specific components related to selected market parameters associated with the data.

The specific order data and specific quote data are linked and associated to a respective one of a set of GUI objects in the grid-based graphical interface at each trader's location.

If middleware is present, it functions to translate data and instructions sent over any communication channel into a format that is understood by the grid-based graphical interface at any trader's location, or a respective backend system at any market participant's location.

The middleware has components therein to translate any trading order instruction issued from a trader, or to translate messages from a market participant.

Typically, the grid-based graphical trading interface for any trader has a data storage. Also, the middleware may have an associated data storage relevant to the system.

In the interactive grid-based graphical trading system of the present invention, a selected security for the trading data may be displayed at any instant in time, and may be changed to another selected security by any trader, at any instant in time.

The trading data for any selected security may be displayed at any instant in time by any trader. It is constantly updated having regard to new trading data being received by the grid-based graphical interface for that selected security.

Any backend system will perform at least the following tasks: account management for each trading account, processing trading orders for each valid transaction which a trader issues; order execution, whereby each valid transaction issued by any trader is executed; data dissemination, whereby market trading data concerning any security is delivered to any trader's grid-based graphical interface, and backend system management for monitoring and maintaining security and operation of the backend system.

Each market participant may be chosen from the group consisting of stock brokerages, electronic communication networks (ECN's), stock exchanges, commodity exchanges, futures exchanges, bourses, and auction houses.

In the interactive grid-based graphical trading system of the present invention, each selected security for which market trading data is displayed may be chosen from the group consisting of shares of stock, commodities, futures, options, bonds, warrants, exchange traded funds (ETFs), share or index based options, futures contracts, options on futures contracts, and items that are bought or sold by auction.

In the present invention, data communications over the communications channels are in keeping with selected protocols which are established to standardize data interchange between the grid-based graphical interface communicating over the communications channels, with any backend systems. Furthermore, the data communications may electively use secure data encryption modes.

The middleware may further perform the task of connection management, whereby connection requests from any trader's grid-based graphical interface to the backend systems are granted or rejected, and where existing connections are monitored and managed.

The interactive grid-based graphical trading system of the present invention includes a display panel, where the display panel contains individual icons representing each security held by any respective trader in that trader's account.

In the interactive grid-based graphical trading system of the present invention, each icon may represent a security position held by that trader in that trader's account. Also, any icon may be dragged and dropped onto a specific valid cell of the grid-based graphical interface. The drag and drop operation on any selected icon causes the grid-based graphical interface to issue transaction instructions to a respective backend system through the middleware.

Furthermore, a display panel is associated with the interactive grid-based graphical trading system at any trader's location, where the display panel contains GUI objects to represent any monetary value or security which is held in any trader's account. In addition, the interactive grid-based graphical trading system includes fourth process means that permits the monetary value or security associated with a respective GUI object to be separated into a plurality of GUI object, which may represent in total the monetary value or security, as elected by the trader.

Moreover, the GUI objects may be used to represent specific quantities of units of any selected security, and additional GUI objects may be used to represent selected amounts of cash. In each instance, each GUI object is linked to data representing the specific quantities of units of any selected security, or representing the selected amounts of cash in software at the trader's location.

Typically, the grid-based graphical interface is application software, which is available through a computer at the respective trader's location.

In keeping with the present invention, one of the plurality of rows or one of the plurality of columns of cells is associated with at least one market participant, so that each cell can represent one or more specific quote data or order data being posted by at least one market participant for the selected security or item being displayed at any instant in time.

Cells representing at least one buy order or buy quote at or near the bid price, and different cells representing at least one sell order or sell quote at or near the ask price, which thus represent market trading data being posted by a market participant for a selected security, are simultaneously displayed.

Also, any cell that represents at least one order associated with at least one market participant at the respective specific price or range of specific prices indicated by that cell, is displayed with selected graphical properties.

The graphical properties of the present invention may be chosen from the group consisting of: a distinct color, a distinct shape, distinct text labels, and combinations thereof. The graphical properties identify the cell as representing data for at least one order or at least one quote.

In the interactive grid-based graphical trading system of the present invention, text labels may indicate at least one parameter selected by a trader for at least one order or at least one quote represented by the cell. Also, at least one parameter may be chosen from the group consisting of: order type, the quantity of units of the selected security, the symbol of the selected security, the duration of the order, and combinations thereof.

Additional data may be associated with each cell. This additional data can be electively displayed by clicking or right-clicking on the given cell. Furthermore, the additional data may be chosen from the group of data consisting of: the number of orders associated with the given cell, the total volume or number of contracts, the total dollar value of the orders outstanding, the total volume of the orders traded, and the lot size outstanding, and combinations thereof.

In keeping with the present invention, the data displayed on a display panel on the display device at any trader's location may include text based quote data and related summary statistics for a selected security or group of securities at any instant in time.

Furthermore, text based quote data and related summary statistics may include data chosen from the group consisting of: the exchange or market where the selected security is being traded, the current bid price, the current ask price, the current bid size, the current ask size, the last trade price, the size of the last transaction in terms of the number of units of the selected security traded, the change in the price of the last trade with respect to the closing price of the previous session, the volume in terms of the number of units of the selected security that had been traded during the current trading session, the high price of the session, the low price of the session, the opening price of the session, and combinations thereof.

In the interactive grid-based graphical trading system of the present invention, the text based quote data may be categorized as Level 1 data.

Also, in the interactive grid-based graphical trading system of the present invention, a standard protocol may define the format of the instructions and data that are exchanged between the interactive grid-based graphical trading system and any backend system of any market participant.

Typically, in the interactive grid-based graphical trading system of the present invention, a standard protocol may be based on eXtensible Markup Language (XML).

Moreover, in the interactive grid-based graphical trading system of the present invention, data from a backend system may be associated with a respective GUI object at any trader's grid-based graphical interface.

Within the interactive grid-based graphical trading system, a plurality of grid-based graphical interfaces are presented in a plurality of overlapping tab pages. The tab for any of the pages can thus be selected. The plurality of tab pages are contained in at least one display panel on the display device, where at least one grid-based graphical interface is associated with one tab page or one display panel at any instant in time.

Also, the specific visual or graphical properties of any tab page may change at any instant in time, as a result of a specific event occurring.

Furthermore, the specific event may be triggered by specific market or user defined criteria related to said tab page, or to the securities associated with the tab page.

Additionally, a transaction may be effected by dragging and dropping GUI object representing a specific trading instruction, for a specific security, from one display panel on the system to the grid-based graphical interface.

Moreover, a transaction may be effected by dragging and dropping a GUI object representing a specific trading instruction, for a specific security, from a grid-based graphical interface to an alternate GUI object.

In the interactive grid-based graphical trading system of the present invention, a specific trading instruction may effect a cancel order instruction for the specific security.

Furthermore, a transaction instruction which changes a parameter associated with an existing open order may be translated by middleware, so as to appear to the trader as a single seamless instruction.

Still further, any trading order transaction may be effected by dragging and dropping a GUI object which is representative of a specific transaction onto a valid cell of the grid-based graphical interface, where the first process means will issue a respective transaction instruction through a respective communication channel to a respective market participant.

Also, in the interactive grid-based graphical trading system of the present invention, any trading order transaction may be effected by dragging and dropping a selected GUI object representative of an intended transaction onto a destination cell on the grid-based graphical interface. The dragging and dropping of the selected GUI object causes the grid-based graphical interface to apply the first process means, so as to result in the placement of a new order with a market participant. Furthermore, if the new order includes specific trading parameters, the second process means may electively alter the specific visual or graphical properties assigned to both the selected GUI object and the destination cell.

In the interactive grid-based graphical trading system of the present invention, any trading order transaction which has been placed on the grid-based graphical interface but not yet filled, may be cancelled by dragging the respective GUI object associated with the order outside the grid-based graphical interface.

Moreover, any open order for a specific security for which a trader has discretion, may be cancelled by dragging and dropping a selected cell associated with the specific open order from the grid-based graphical interface to a selected GUI object associated with a cancel transaction order. The dragging and dropping of the cell causes the interactive grid-based graphical trading system to apply the first process means, so as to result in the placement of a cancel order instruction with the associated market participant. The cancel order instruction includes specific parameters, where the second process may electively alter the specific visual or graphical properties assigned to both the selected GUI object and the selected cell.

Also, the price values represented by the price axis maybe electively associated with an absolute price or price range, or a relative price or price range.

In addition, the adjustment of the price values, and the alteration of the associated visual or graphical properties of each cell, along the price axis, is under the control of the third process means.

Within the grid-based graphical interface, the relevant visual or graphical properties of any cell associated with either order data or quote data will dynamically change in response to an amendment of its original properties, and in relation with the values represented by the given cell's respective axes.

Moreover, the displayed price range for any price axis may be automatically determined according to a set of relevant market trading data.

In addition, the range of price values which are displayed along the price axis, and the price value for a selected row or column, may be determined for each selected security at any instant in time as a factor of one of the criteria chosen from the group consisting of: the closing price for that security during the prior session, the opening price for that security during the current session, the highest price paid for that security during the current session, the lowest price bid for that security during the current session, and the last price paid for that security, and combinations thereof.

Furthermore, the criteria for the at least one column may be chosen from the group consisting of: a market participant, a security, a component of an index, an index, aggregate trading data from a plurality of market participants, the trading activity of a market participant during the current session, the trading activity of a component of an index, the pending orders of the market participant at any instant in time, aggregate buy order and quote data from a plurality of market participants, aggregate sell order and quote data from a plurality of market participants, and combinations thereof.

Still further, an axis not associated with the price axis can represent any market criteria aside from price.

Also, the present invention contemplates that a display panel for an integrated chat session may be included in the graphical interface.

Still further, the grid-based graphical interface for any trader may have memory means associated therewith, whereby a record function stores the market trading data in the memory at selected time intervals. A replay function for the data, to recall the market trading data associated with the selected time intervals, and to graphically display the data over a selected time period, may be selectively invoked by the trader.

The interactive grid-based graphical trading system of the present invention may further include software whose purpose is to review and weigh a trader's cash position and portfolio holdings, in order to make a recommendation on an order parameter for a trading order for a selected security, at any instant in time. The recommendation is a function of an order parameter chosen from the group of order parameters consisting of: the bid price, the bid size, the ask price, the ask size, the last trade price, the volume or contracts traded over an interval of time, the volatility, the liquidity, and combinations thereof, for the selected security at any instant in time.

Also, the order parameter is at least one of the size of the trading order, the quantity of the trading order, price of trading order, and duration of the trading order for the selected security.

Furthermore, the graphical display at any trader's location may include a display panel containing data categorized as Nasdaq Level II data for a selected security at any instant in time. The Nasdaq Level II data includes at least one set of data which is chosen from the group consisting of: the identity of a market participant whose data is being displayed, the bid price and size associated with a given market participant's data, the ask price and size associated with a market participant's data, and combinations thereof.

In addition, at least one row or at least one column may have a GUI object associated therewith, whereby the status of open orders associated with the GUI object may be changed under the control of the first process means.

A specific color, text label, pattern, shape, or texture may be associated for each different type of trading order which is displayed in any cell.

Also, a specific color, texture, text label, shape, or pattern may be associated with each cell representing an ask price, or a higher price than the ask price, for any selected security in any given market. A different specific color, texture, text label, shape, or pattern may be associated with each cell representing a bid price, or a lower price than the bid price, for the selected security in any given market.

Furthermore, the interactive grid-based graphical trading system of the present invention may include a fourth process means whose function is to transform Nasdaq Level II data for any selected security, at any instant in time, into a format suitable for display on the grid-based graphical interface.

The interactive grid-based graphical trading system of the present invention may also further include fifth process means, whose function is to transform a stock exchange's market depth data, or an Electronic Communication Network's (ECNs) electronic order book for any selected security, at any instant in time, into a format suitable for display on the grid-based graphical interface.

The replay function of the present invention may be controllable so that playback of the market trading data is accelerated in time, or de-accelerated in time, and displayed visually.

Also, the market trading data which is displayed for a selected security at any instant in time can be electively filtered to display a subset of the trading data, which subset satisfies criteria based at least on one parameter associated with the data.

In addition, the columns representative of a parameter of the trading data can be arranged automatically based on criteria defined by the trader.

Furthermore, the columns representative of a parameter of the trading data can be arranged manually through a drag and drop operation of a respective column header by the trader.

Also, any one of the icons may be chosen from the group of images consisting of: the logo of the company associated with the security, the trading symbol of the security, the type of security, the quantity of units of the security, the type of order for the security, the status of the order for the security, and combinations thereof.

In the interactive grid-based graphical trading system of the present invention, a selected tab page associated with a given security may become the active tab page as a result of at least one user interaction associated with the security.

Moreover, a tab page may be automatically created, at any instant in time, so as to be associated with a specific security, as a result of at least one user interaction associated with the security. The created tab page for the specific security does not exist prior to the user interaction.

Any cell representing a specific order is displayed relative to the price axis, where the position of any cell is determined by the difference between the price associated with the specific order and the price associated with a base price indicator on the price axis. Also, at least one cell representing a specific order, is displayed.

Also, any cell representing a specific quote may be displayed relative to the price axis. The position of any cell is determined by the difference between the price associated with the specific quote and the price associated with a base price indicator on the price axis. In addition, at least one cell representing a specific quote, may be displayed.

In an alternative embodiment of the interactive graphical trading system of the present invention, there is also provided a graphical interface adapted to display market trading data received from at least one market participant, wherein the graphical interface establishes connections with any backend systems used by any market participants through communication channels; wherein the market trading data includes information chosen from the group of market trading data consisting of: order data as to buy, sell, or other trading orders, quote data as to bid and ask prices, volume, market participant identifiers, and other parameters, and wherein the market trading data is transmitted to the graphical interface from the back end system in computer-readable electronic format.

The graphical interface includes at least one display panel for graphically presenting market trading data, wherein the market trading data is graphically presented on at least one display panel. An intended trading order is represented on the at least one display panel by a GUI object, wherein the GUI object is selected and positioned over the at least one display panel by a user of the graphical interface, using pointing and positioning means for pointing and positioning the GUI object on the graphical interface. The act of selecting and positioning the GUI object representing the trading order, over the at least one display panel, effects order placement or order modification instructions.

In another embodiment, an interactive grid-based graphical component subsystem for presenting market trading data is provided, wherein the component subsystem comprises a set of GUI objects, user interaction modes, and program logic. Here, the interactive grid based graphical component subsystem is implemented in software made available through a computer at a user's location.

The interactive grid-based graphical software object is implemented as a software component, and the software component is used in software applications and is adapted for any specific computing platform.

The interactive grid based graphical software object is adapted to receive and display market trading data from a plurality of market trading data sources, and any particular market trading data source may be electively selected at any instant in time.

The set of GUI objects are graphical representations of visual elements associated with the interactive grid-based graphical software object, and the set of GUI objects are associated with visual and graphical properties from the group consisting of: color, shape, size, text labels, and combinations thereof.

The user interaction modes represent a set of actions available to a user for interacting with the interactive grid based graphical software object, such that the user interaction modes affect the graphical representation displayed on the interactive grid-based graphical software object. The user interaction modes on any GUI object are selected from the group consisting of: right click, double click, and left click using a pointing device, a drag and drop operation, a stylus screen tap, a stylus drag and drop operation, a touch screen tap, shortcut keys, and combinations thereof.

The program logic functions to receive process and graphically represent market trading data. The program logic further functions to receive, process, and interpret user interactions with the software object; and the graphical representation includes at least one grid having a plurality of cells arranged in an array of at least one row or at least one column.

Here, a row is an arrangement of horizontally adjacent cells with at least one common property, and a column is an arrangement of vertically adjacent cells with at least one common property; and each cell within the plurality of cells belongs to one row and one column.

The plurality of cells is arranged in a matrix chosen from the group consisting of: a plurality of rows and at least one column, and a plurality of columns and at least one row. The plurality of rows or the plurality of columns are associated with an axis representing price.

The visual and graphical properties of GUI objects are altered as a result of changes in the received market trading data, and user interaction with the software object.

Any cell may be associated with the market trading data, and contains a graphical representation of the market trading data.

Also, the matrix is associated with the market trading data, and also contains a graphical representation thereof.

Each cell along the price axis indicates a price or price range for which the market trading data exists, and the other of the at least one column or the at least one row is indicative of a specific criterion chosen from a plurality of criteria within which the market trading data may be categorized as to price or a range of prices. That plurality of criteria is from the group consisting of: a specific security, a group of securities, an index, a market participant, a group of market participants, a segment of time, and combinations thereof.

Thus, any trader can place or modify an order for a selected security or group of securities, over which that trader has discretion, by interacting with the interactive grid-based graphical software object. That interaction can be accomplished by a drag and drop operation.

In yet another embodiment of the present invention, there is provided an interactive grid-based graphical quote presentation system for use by any user to receive and display market trading data from any market participant, in essentially real time. The system comprises a grid-based graphical interface for use by any trader, and the graphical interface is adapted to establish at least one connection to any market participant through at least one communication channel.

The interactive grid-based graphical quote presentation system is made available through a computer at any user's location; and is adapted to receive and display market trading data received from a plurality of market participants, essentially in real time. Thus, any user may select any particular securities for which data are electively required, at any instant in time.

The interactive grid-based graphical quote presentation system includes first process means that function to send requests through communication channels to at least one market trading data source, and to receive messages from the at least one market participant through the at least one communication channel.

The grid-based graphical quote presentation system also includes second process means that function to receive, process, and display the market trading data, and the messages, to any user;

The market trading data includes information chosen from the group of market trading data consisting of: quote data as to bid and ask prices, volume, market participant identifiers, and other parameters, existing at that instant in time for any selected security or group of securities; and the market trading data is transmitted to each interactive grid-based graphical quote presentation system from the market participants, in computer-readable electronic format.

The interactive grid-based graphical quote presentation system includes third process means that function to transform the market trading data received from any market trading data sources, at any instant in time, into a graphical representation for display on any display device, and the graphical representation includes at least one grid having a plurality of cells in an array of at least one row or at least one column. The definitions of rows and columns, and their association with a price axis, are as mentioned above.

Any user can issue a request for trading information at any instant in time, by interacting with the interactive grid-based graphical quote presentation system. Thus, the interaction can effect the issuance of the instructions associated with a request for quote information; and the interaction can be accomplished by one or a plurality of interaction modes Yet another embodiment of the present invention provides a software object providing a graphical representation of trading data originating from at least one data source, wherein the graphical representation of trading data is electively interactive, and wherein the interface object is executable by a computer.

Here, there is a first process means for establishing at least one connection with at least one data source, wherein the at least one data source is selected from the group consisting of: securities exchanges, commodities exchanges, electronic communication networks (ECNs), data feed providers, brokerage firms, and qualified market participants. The at least one data source may also electively be historical trading data published on a suitable storage media. Moreover, the at least one data source may be external to the computer where the software object is executing or:

Second process means are provided for retrieving trading data from the at least one data source; which data may be electively retrieved continuously or from time to time.

There are third process means provided for transforming the trading data into a form that is suitable for display by the interface object.

Also, there are fourth process means are provided for displaying the trading data by means of at least one visual presentation style.

Finally, there are provided fifth process means for receiving and interpreting input from a user of the interface object, through a selected user interaction mode. The input can cause the interface object to automatically generate trading instructions, based on the user's specific input and the context of the currently displayed trading data.

The trading instructions are selected from the group consisting of: order instructions, sell order instructions, order cancellation instructions, and order amendment instructions. The trading instructions can be sent to at least one backend trading system capable of processing the instructions; and the at least one backend trading system is associated with the at least one market participant, which is selected from the group essentially consisting of: stock exchanges, electronic communication networks (ECNs), order-entry firms, brokerage firms, commodities exchanges, currency markets, and qualified market participants. Moreover, the at least one processing system can be market simulation software. In any event, the at least one backend trading system can be physically separated from the computer where the software object is executing; or it can reside in the same computer where the interface object is executing.

As before, the trading data includes data elements selected from the group consisting of: order data and quote data, and the order data and the quote data are associated with specific securities. Moreover, the order data and the quote data directly reflect real orders and quotes posted to at least one market, exchange, and qualified market participant; and the data elements possess a price dimension directly related to the price of the security associated with the data elements.

The values associated with the price dimension are numeric price values. Also, the data elements may electively possess at least one other dimension or parameter. The software object is adapted to retrieve the trading data from the at least one data source, and the trading data may be electively received continuously, or from time to time. In any event, the software object automatically binds to the trading data.

The software object further includes a drawing area for displaying a visual representation of the data elements.

As before, the data elements comprising order data or quote data can be represented on the software object's drawing area by icons, shapes, and other graphical user interface (GUI) objects; wherein the icons, shapes, and other GUI objects are rendered by means of at least one visual presentation style. Thus, the at least one visual presentation style functions to graphically distinguish between different types of orders and quotes.

The software object comprises an axis associated with numeric values, and the numeric values associated with the axis directly correspond to the numeric price values of the price dimension. Also, the numeric values associated with the axis are based on at least one criterion.

The software object further includes at least one other axis associated with the at least one other dimension or parameter; and the price axis and the at least one other axis are represented on the drawing area using at least one visual presentation style.

The first price axis and the at least one other axis define a specific coordinate system when combined in a specific manner, which specific coordinate system functions to describe the positions of the shapes or icons representing the data elements in the drawing area. The description of positions of the shapes or icons facilitates the plotting of the shapes or icons onto the drawing area.

The plotting comprises at least one process for determining the positions of the shapes or icons on the drawing area, wherein the at least one process is based on at least one criterion, and wherein the at least one criterion is the numeric price value of the price dimension associated with the data elements.

The positions are defined in terms of the coordinate system; and the positions are determined for the purpose of plotting and rendering the shapes or icons representing the data elements onto the drawing area. The plotting and rendering is electively dynamic and continuous, and is linked to the continuous retrieval of data.

The first price axis functions to provide a reference frame for plotting and rendering the dynamic variation in values of the price dimension associated with the data elements; and the dynamic variation in values of the price dimension associated with the data elements is represented by varying the positions of the shapes or icons on the drawing area, with respect to the first price axis.

The at least one other axis functions to categorize the data elements, as represented by the shapes or icons on the drawing area, according to at least one other criterion; and the at least one other criterion is based on the values of the other dimensions or parameters associated with the data elements.

Also, the first price axis and the at least one other axis function to facilitate the manipulation by a user of the interface object, and of the values of specific parameters associated with the data elements as represented by the shapes or icons plotted and rendered on the interface object's drawing area, by providing reference frames against which variations in values can be measured.

The manipulation is subject to at least one rule, and is accomplished by means of at least user interaction mode.

Thus, the manipulation by a user of the software object causes the interface object to automatically generate trading instructions based on the user's specific input and the context of the currently displayed trading data. The trading instructions are selected from the group consisting of: buy order instruction, sell order instruction, order cancellation instruction, and order amendment instruction; and the trading instructions are sent to at least one processing system capable of processing the instructions.

Further embodiments of the present invention contemplate a software object providing a graphical representation of trading data originating from at least one data source, wherein the software object is executable by a computer. In the sense described above, a first further embodiment includes: first process means for establishing at least one connection with at least one data source; second process means for receiving trading data from the at least one data source; third process means for transforming the trading data into a form that is suitable for display by the software object; and fourth process means for displaying the trading data by using at least one visual presentation style.

As before, the at least one data source is selected from the group consisting of: securities exchanges, stock markets, currency markets, commodities exchanges, electronic communication networks (ECNs), brokerage firms, auction houses, data feed providers, market simulation software, trading data published on computer-readable media, and combinations thereof; and the trading data comprises data elements selected from the group consisting of: quote data, order data, and index data. The data elements are associated with a specific security or a group of securities and possess a price dimension representing the price of the security or the value of the index associated with the data elements. The values associated with the price dimension are numeric price values or numeric index values, and the data elements possess at least one additional dimension.

The software object further includes a visual manifestation displayed on the display means, and the visual manifestation includes a drawing area for rendering a graphical representation of the trading data.

The visual manifestation includes an axis associated with numeric price values which are associated with a price dimension, and the axis—which is a price axis—is rendered on the drawing area using at least one visual presentation style.

The visual manifestation further includes graphical user interface (GUI) objects, which are selected from the group consisting of: icons, images, geometric shapes, and combinations thereof; and which function to graphically represent order data and quote data received from the at least one data source. The GUI objects function to graphically represent trading orders initiated by a user of the software object, and are rendered on the drawing area by the at least one visual presentation style. The at least one visual presentation style functions to graphically distinguish between different types of orders and quotes associated with the data elements.

The price axis defines one dimension of a coordinate system; wherein the coordinate system functions as a reference for plotting the GUI objects onto the drawing area.

The plotting includes at least one process for determining the positions where the GUI objects are rendered on the drawing area, and the at least one process correlates the numeric price values of the price dimension with the numeric price values associated with the price axis.

The positions are defined with respect to the one dimension of a coordinate system, and are determined for the purpose of plotting and rendering the GUI objects onto the drawing area.

In this embodiment, the trading data is received in essentially real time, and affects dynamic variations in the values of the price dimension and the at least one additional dimension associated with the data elements.

Thus, the dynamic variations in the values of the price dimension, and the at least one additional dimension, are represented by dynamically varying the positions and graphical properties of the GUI objects on the drawing area.

In another further embodiment, the software described above further includes fifth process means for receiving and interpreting input from a user of the software object, by means of at least one user interaction mode.

Here, the graphical properties and settings are electively adjusted by a user of the software object, and the adjustment is accomplished by the user through at least one user interaction mode. The adjustment is facilitated by the fifth process means.

In yet a further embodiment of the software object hereof, the software object further includes sixth process means for generating and transmitting trading instructions, and for receiving feedback data pertaining to the status of the trading instructions.

Here, the visual manifestation associated with the price axis and the GUI objects, the fifth process means, and the sixth process means, together facilitate the graphical placement of trading orders, and the graphical amendment of trading orders. The graphical placement and the graphical amendment of trading orders is performed by a user of the software object by interacting with the visual manifestation, and the interaction is subject to at least one rule. Also, the interaction is accomplished by means of at least user interaction mode. The GUI object functions to graphically represent trading orders initiated by a user of the software object.

The graphical placement and graphical amendment of trading orders causes the software object to generate trading instructions, and the trading instructions are selected from the group consisting of: buy order instructions, sell order instructions, order cancellation instructions, and order amendment instructions. The trading instructions are transmitted to at least one backend trading system capable of processing the trading instructions; and the backend system is associated with at least one market participant. Feedback data pertaining to the status of the trading orders is received and interpreted by the software object through the sixth process means.

Typically, the at least one data source is an external system physically separated from the computer where the software object is executing, the external system is accessible to the software object through communication channels.

However, the at least one data source may reside in the same computer where the software object is executing.

In keeping with the present invention, the software object is adapted to receive streaming trading data from the at least one data source; and the trading data is received essentially continuously.

Moreover, the software object is adapted to request the trading data from the at least one data source, and the trading data is received in response to the request.

In the present invention, the visual manifestation may further include at least one additional axis, where the at least one additional axis is associated with at least one additional dimension. In this case, the at least one axis is associated with at least one criterion, and the at least one criterion is selected from the group consisting of: a market participant, a group of market participants, a security, a group of securities, an index, an interval of time, and combinations thereof.

The at least one additional axis is rendered on the drawing area using at least one visual presentation style.

Also, the price axis and the at least one additional axis combine to define a multi-dimensional coordinate system, where the number of dimensions of the multi-dimensional coordinate system is determined by the number of axes, and where the multi-dimensional coordinate system functions as a reference for plotting the GUI objects onto the drawing area.

The plotting includes at least one process for determining the positions where the GUI objects are rendered on the drawing area; and the at least one process correlates the numeric price values of the price dimension with the numeric price values associated with the price axis. Thus, the at least one process categorizes the data elements according to the at least one criterion associated with the at least one additional axis.

The positions are determined with respect to the multi-dimensional coordinate system, and are determined for the purpose of plotting and rendering the GUI objects onto the drawing area.

In any of the above embodiments, the at least one market participant possesses at least one backend trading system physically separated from the computer where the software object is executing, and the trading system is accessible to the software object through communication channels.

Typically, the at least one market participant possesses at least one trading system physically residing in the same computer where the software object is executing.

The present invention provides that the feedback data is transformed into a form that is suitable for display on the drawing area, through the third process means; and the feedback data is displayed on the drawing area, through the fourth process means.

Another provision of the present invention is that the software object is adapted to connect to and retrieve trading data from the at least one data source. Typically, the at least one data source is physically separated from the computer where the software object is executing, and is accessible to the software object through communication channels. The at least one data source is a diverse system, and communication with the at least one diverse system is facilitated by middleware.

Also, another provision of the software object of the present invention is that the software object is adapted to transmit trading instructions to, and receive feedback data from, a plurality of backend trading systems. The plurality of backend trading systems are external to the computer where the software object is executing. The plurality of data sources are accessible to the software object through communication channels. The plurality of backend trading systems may employ dissimilar communication protocols; and communication between the software object and the plurality of backend trading systems is facilitated by middleware.

The present invention provides that the software object may be implemented as an integrated feature of an application program intended for securities trading.

Also, the software object may be implemented as a self-contained, reusable software component. In that case, the software component is selected from the group consisting of: an ActiveX control, a Java applet, a Java Swing component, and combinations thereof; and the implementation of the software object independently functions as a quote presentation system, or as a quote presentation system with order placement and order amendment capabilities. As such, the software object is incorporated within an application program intended for securities trading.

The software object of the present invention may be implemented as a set of macros or scripts. In that case, typically the macros or scripts are created by utilizing programmability features of specific application programs, and each specific application program is selected from the group consisting of: Microsoft Excel, Microsoft Word, Microsoft PowerPoint, Microsoft Visio, Lotus 1-2-3, and WordPerfect.

It should be noted that typically the trading data is encoded using eXtensible Markup Language (XML), and the trading data may be compressed, encrypted, or both.

Also, the trading instructions may be encoded using eXtensible Markup Language (XML), and may be compressed, encrypted, or both.

Typically, the price axis is directly related to the range of trading prices associated with a specific security, and is partitioned into a plurality of segments. Each of the plurality of segments represents a numeric price, or a range of numeric prices, representative of trading prices of the specific security; and every trading price associated with the specific security is represented in the price axis by not more than one segment along the price axis. Each of the plurality of segments is labelled with a nominal numeric value representative of the price or range of prices associated with the segment, and the difference between the nominal numeric prices associated with any two adjacent segments corresponds to the specific security's minimum price variance (MPV), or a multiple thereof.

The price axis may be indirectly related to the range of trading prices associated with a specific security, and in that case, the price axis is representative of a mathematical formula, which may be based on the difference between a price parameter of the specific security and a reference value. The reference value may be selected from the group consisting of: the previous closing price of the security, the bid price, the ask price, the last trade price, an index value, the average, the high, and the low of the security's price or the index value over a selected period of time. Also, the price parameter is selected from the group consisting of: the last trade price, the limit order price, the stop order price, and combinations thereof.

Thus, the price axis may be partitioned into a plurality of segments, where each of the plurality of segments is associated with the result of the application of the mathematical formula to the data elements, and each of the plurality of segments is labelled with a nominal numeric value representative of the result.

At least one user interaction mode is selected from the group consisting of: clicking, double-clicking, dragging and dropping, pressing a keyboard shortcut, pressing a command button, and typing, and combinations thereof; and the at least one user interaction mode utilizes at least one input device. Typically, the at least one input device is selected from the group consisting of: a mouse, a trackball, a stylus, a joystick, a light pen, a keyboard, a pointing device, and combinations thereof.

In still a further embodiment of the present invention, there is provided an interactive grid-based graphical trading system for use by any trader. This further grid-based graphical trading system comprises a grid-based graphical interface, which is adapted to establish a connection with any backend system.

The interactive grid-based graphical trading system is adapted to receive and display market trading data received from the backend system;

Here, the interactive grid-based graphical trading system includes first process means that function to send transaction instructions to the backend system, and to receive messages and market trading data from the backend system, and second process means that function to receive, process, and display the market trading data, and the messages.

As before, the market trading data includes information chosen from the group of market trading data consisting of: order data of the trader, and quote data for any selected security or group of securities.

Also, the interactive grid-based graphical trading system includes third process means that function to transform the market trading data into a graphical representation for display on a display device, wherein the graphical representation includes at least one grid having a plurality of cells arranged in a matrix chosen from the group consisting of: a plurality of rows and at least one column, and a plurality of columns and at least one row, as defined above. The same conditions as to rows and columns of cells, and a price axis therefor, exist as discussed above.

Any cell may be associated with the market trading data, and contains a graphical representation of the market trading data; and each cell along the price axis indicates a price or price range for which the market trading data exists, while the other of the at least one column or the a least one row is indicative of a specific criterion chosen from a plurality of criteria within which the market trading data may be categorized.

Thus, any trader can place, or modify, an order for a selected security or group of securities, over which that user has discretion, by interacting with the grid-based graphical interface.

Typically, the trader engages in trading securities through established security trading markets; and typically the trader engages in trading securities in real time.

Moreover, the connection which is made by the interactive grid-based graphical trading system of the present invention is to any backend system used by any market participant.

That connection with any backend system may be through suitable communications channels.

Moreover, the communication channels may include middleware used by any market participant.

Of course, as before, the order data of the trader is chosen from the group consisting of: buy, sell or other trading orders existing at that instant in time, for any selected security or group of securities.

Also, the quote data may be chosen from the group consisting of: bid price, ask price, last trade prices, bid size, ask size, last trade volume, market participant identifier, and other quote parameters for any selected security or group of securities, and combinations thereof.

Typically, the interactive grid-based graphical trading system of the present invention is available through a computer at each participating trader's site.

In keeping with the provisions of the present invention, the user of the interactive grid-based graphical trading system hereof may select any particular securities for which data are electively required, at any instant in time.

The criteria relied upon by the interactive grid-based graphical trading system of the present invention may be chosen from the group consisting of: a specific security, a group of securities, an index, a market participant, a group of market participants, a segment of time, and combinations thereof.

In general, the graphical representation is associated with graphical properties chosen from the group consisting of: a distinct color, a distinct shape, distinct text labels, and combinations thereof; and wherein the graphical properties identify the cell as representing data for at least one order or at least one quote.

Also, in the interactive grid-based graphical trading system hereof, the market trading data is transmitted to each the grid-based graphical interface at the site of the any trader from the backend system of any market participant, in computer-readable electronic format.

Of course, any user of the interactive grid-based graphical trading system of the present invention may accomplish the interaction by a drag and drop operation.

Another aspect of the present invention provides for an interactive trading system for use by any trader who engages in trading systems through established security trading markets, in essentially real time.

That recommendation system comprising at least one input data, wherein the input data is chosen from the group consisting of: trading account data, securities data, preference data, risk data, and combinations thereof.

Process means are provided to analyse the input data, and to output a recommendation as to the size or volume of an order;

Typically the recommendation is a numeric value.

In the interactive trading recommendation system of the present invention, the trading account data may be chosen from the group consisting of: cast in a trading account, the market value of stocks in a trading account, the value of bonds in a trading account, and combinations thereof.

Also, the securities data may be chosen from the group consisting of: the value of an index: the bid, ask or last trade price of a security, a group of securities, or an index: holding data on a security or a group of securities; and combinations thereof.

Still further, the preference data may be chosen from the group consisting of: the minimum funds available for investment, the maximum funds available for investment, the funds available for investment in an industry sector or group. The percentage of cash holdings to invest, the percentage of the portfolio to invest, the identity of a security, asset allocation data, the trader's investment objectives, and combinations thereof.

The risk data may be chosen from the group consisting of: the volatility of security or a group of securities, the volatility of an index or group of indexes, a technical indicator, the profit or loss on a security or group of securities, and combinations thereof.

In the interactive trading recommendations system of the present invention, the recommendation may be represented as a GUI object.

If so, the GUI object is dragged and dropped onto a suitable order entry interface of a trading system.

Still further, the recommendation may be made available to at least one external system chosen from the group consisting of: a software object, a software application, a spreadsheet, a trading system, a website, and combinations thereof.

In any aspect of the recommendation system of the present invention, at least one of the input data is manually entered.

Still further, at least one of the input data may be retrieved automatically.

Typically, in the interactive trading recommendation system of the present invention, the order entry interface is a grid-based graphical interface.

Also, the interactive trading recommendation system of the present invention may be implemented as a self-contained, reusable software component: wherein the software component is incorporated within an application program intended for securities trading.

Moreover, the interactive trading recommendation system hereof may be implemented as an integrated feature of an application program intended for securities trading.

In general, the numeric value of the recommendation made by the recommendation system of the present invention is representative of a parameter of trading order chosen from the group consisting of: units of shares, units of lot size, number of contracts, and combinations thereof.

Also, the numeric value may be rounded up or down to a standard lot size or contract size.

Another aspect of the interactive trading recommendation system of the present invention provides for means to bias the numeric value higher or lower, in accordance with at least one criterion chosen from the group consisting of a technical indicator, a statistic, a parameter of a security, a group of securities, and an index.

In yet another aspect of the interactive trading recommendation system of the present invention, a display panel is associated with an order entry function, and the display panel contains at least one tab page. The tab page is associated with an order entry function for a specific order type, and the title of the tab of the page associates the specific order entry type with the tab page. The order entry type may be chosen from the group consisting of: a market order, a limit order, a stop order, a short order, a change order, an options order, a futures order, a mutual fund order, a bond order, a T-bill order, a money market order, and combinations thereof.

Still further, in the interactive grid-based graphical trading system hereof, a displayed fixed price range associated with the price axis may be electively adjusted to display the price range in accordance with the current trading price range or spread of a security or a group of securities.

In the interactive graphical trading system of the present invention, any GUI object may be assigned specific visual or graphical attributes or properties chosen from the group of graphical or visual attributes or properties consisting of: color, border, label indicator, graphic overlay, text overlay, and combinations thereof;

Also, the specific attribute or property assigned to any GUI object may be a function of the specific market trading data associated therewith.

As noted, any trader can modify the parameters of any order, over which that trader has discretion, for a selected security or group of securities being displayed on the interactive graphical interface, at any instant in time, by selecting a relevant GUI object representing an order using a pointing device interactive with the graphical interface, and dragging and dropping the selected GUI object representing an order to a destination display panel or GUI object. The dragging and dropping of the selected GUI object representing an order causes the graphical interface to activate first process means to send transaction instructions comprising an amendment of previous specific trading parameters associated with the relevant selected order; and the second process means electively effects an alteration of the specific visual or graphical properties assigned to both the relevant GUI object representing an order and the destination display panel or GU object.

In keeping with the present invention, the market trading data representing specific order data and quote data for a selected security or group of securities is represented by GUI objects, wherein each GUI object representing quote data or order data is associated with a specific price or range of specific prices for any given security or group of securities, and wherein the market trading data represented by GUI objects includes a plurality of specific components related to selected market parameters associated with that data.

Also, the trading data for any selected security being displayed at any instant in time by any trader may be constantly updated having regard to new trading data being received by the graphical interface for that selected security.

The interactive graphical trading system of the present invention may further include a display panel. The display panel contains individual icons representing each security held by any respective trader in that trader's account.

Each icon represents a security position held by that trader in that trader's account, and any such icon is dragged and dropped onto a display panel of the graphical interface. The drag and drop operation on any selected icon causes the graphical interface to issue transaction instructions.

Also, a text label may indicate at least one parameter selected by a trader for the at least one order or at least one quote represented by the GUI object. The at least one parameter may be chosen from the group consisting of order type, the quantity of units of the selected security, the symbol of the selected security, the duration of the order, and combinations thereof.

Another aspect of the present invention provides that a transaction may be effected by dragging and dropping a GUI object representing a specific trading instruction, for a specific security, from one display panel on the graphical trading system to another display panel.

Also, a transaction may be effected by dragging and dropping a GUI object representing a specific trading instruction, for a specific security, from a graphical interface to an alternate GUI object.

If so, specific trading instruction affects a cancel order instruction for the specific security.

Still further, a transaction instruction that changes a parameter associated with an existing open order may be translated by middleware used by any market participant, so as to appear to the trader as a single seamless instruction.

The interactive graphical trading system of the present invention allows for a trading order transaction to be effected by dragging and dropping a selected GUI object representative of an intended transaction onto a destination GUI object on the graphical interface. The dragging and dropping of the selected GUI object causes the graphical interface to apply the first process means, so as to result in the placement of a new order with a market participant; the new order includes specific trading parameters. The second process means electively alters the specific visual or graphical properties assigned to both the selected GUI object and the destination GUI object.

If there's an open order for a specific security for which a trader has discretion, it may be cancelled by dragging and dropping a selected GUI object associated with the specific open order from the graphical interface to a selected GUI object associated with a cancel transaction order. The dragging and dropping of the GUI object causes the interactive graphical trading system to apply the first process means so as to result in the placement of a cancel order instruction with the associated market participant; and the cancel order instruction includes specific parameters. The second process electively alters the specific visual or graphical properties assigned to the selected GUI object.

In the software object of the present invention, the GUI objects further comprise at least one additional axis; the at least one additional axis is associated with data elements with at least one additional dimension: The at least one additional axis is associated with at least one criterion; and the at least one criterion is selected from the group consisting of: a market participant, a group of market participants, a security, a group of securities, an index, an interval of time, and combinations thereof;

The price axis and the at least one additional axis combine to define a multi-dimensional coordinate system; and the number of dimensions of the multi-dimensional coordinate system is determined by the number of axes: Thus, the multi-dimensional coordinate system functions as a reference for displaying the GUI objects onto a grid-based graphical interface.

Displaying a GUI object comprises one or a plurality of methods for determining the positions where the GUI objects are to be rendered on the grid-based graphical interface: At least one method correlates the numeric price values of the price dimension with the numeric price values associated with the price axis; and at least one method categorizes the data elements according to the one or a plurality of criteria associated with the at least one additional axis.

The positions of the GUI objects are determined with respect to the multi-dimensional coordinate system, and the positions are determined for the purpose of displaying the GUI objects onto the grid-based graphical interface.

In the software object of the present invention, the at least one market participant may possess at least one trading system physically separated from the computer where the software object is executing. If so the trading system is accessible to the software object through communication channels.

Also, the at least one market participant may possess at least one trading system physically residing in the same computer where the software object is executing.

The software object of the present invention, is capable of connecting, receiving, and retrieving trading data from at least one data source, which is physically separated from the computer where the software object is executing. The at least one data source is accessible to the software object through communication channels, and the at least one data source is a diverse system. The communication is facilitated by middleware.

In software object of the present invention, the price axis may be indirectly related to the range of trading prices associated with a specific security, wherein the price axis is representative of a mathematical formula. The mathematical formula may be based on the difference between a price parameter of a specific security and a reference value, and the reference value may be selected from the group consisting of: the previous closing price of the security, the bid price, the ask price, the last trade price, an index value, and the average, the high, or the low of the security's price or the index value over any given period of time. The price parameter may be selected from the group consisting of: the last trade price, the limit order price, the stop order price, or combinations thereof.

Also, the price axis may be partitioned into a plurality of segments, wherein each of the plurality of segments is associated with the result of the application of the mathematical formula to the data elements. Each of the plurality of segments is labeled with a nominal numeric value representative of the result.

It is possible for the interactive grid-based graphical quote presentation system of the present invention communication channels to be network-based, so that at any instant in time a connection between any trader and a backend system of any market participant may be persistent or intermittent.

Of course, the network may generally be the Internet.

In the interactive grid-based graphical quote presentation system of the present invention any cell in the plurality of cells may be assigned specific visual or graphical attributes or properties chosen from the group of graphical or visual attributes or properties consisting of: color, border, label indicator, graphic overlay, text overlay, and combinations thereof. The specific attribute or property assigned to any cell may be a function of the specific market trading data associated therewith.

Of course, the axis associated with price may be presented as a specific price range above and a specific price range below the last traded price of a selected security or groups of securities at any instant in time, and the last traded price is present on the price axis.

In any aspect of the present invention, the communication channels may include middleware used by any market participant.

In the interactive grid-based graphical quote presentation system of the present invention, the price difference between two adjacent cells along the price axis may be the minimum price variance (MPV), or a multiple of the minimum price variance, for any selected security or groups of securities being displayed at any instant in time.

Also, the market trading data representing specific quote data for a selected security or group of securities may be presented in a matrix comprising a plurality of rows and a plurality of columns of cells, wherein each row of cells or each column of cells is associated with a specific price or range of specific prices for any given security or group of securities. The market trading data being displayed in any cell may include a plurality of specific components related to selected market parameters associated with the data.

Of course, the specific quote data may be linked and associated to a respective one of a set of GUI objects in the grid-based graphical interface at each trader's location.

Where there is middleware being employed, the middleware may function to translate data and instructions sent over any communication channel into a format that is understood by the grid-based graphical interface at any trader's location, or a respective backend system at any market participant's location.

In general, the grid-based graphical interface for any trader has data storage.

Also, in general middleware has associated data storage relevant to the grid-based graphical quote presentation system.

It is possible in the interactive grid-based graphical quote presentation system of the present invention for a selected security for which trading data is displayed at any instant in time to be changed to another selected security by any trader, at any instant in time.

Also, the trading data for any selected security being displayed at any instant in time by any trader may be constantly updated having regard to new trading data being received by the grid-based graphical interface for that selected security.

In the interactive grid-based graphical quote presentation system of the present invention, one of the plurality of rows or one of the plurality of columns of cells may be associated with at least one market participant, so that each cell can represent one or more specific quote data being posted by at least one market participant for the selected security or item being displayed at any instant in time.

Also, cells representing a selected quantity of buy orders at or near the bid price, and different cells representing a selected quantity of sell orders at or near the ask price, which represent market trading data being posted by a market participant for a selected security, may be simultaneously displayed.

In general, the graphical properties of the interactive grid-based graphical quote presentation system of the present invention are chosen from the group consisting of: a distinct color, a distinct shape, distinct text labels, and combinations thereof. The graphical properties identify the cell as representing data for at least one quote.

The interactive grid-based graphical quote presentation system of claim 177, wherein a text label indicates at least one parameter selected by a trader for the at least one quote represented by the cell; wherein the at least one parameter is chosen from the group consisting of order type, the quantity of units of the selected security, the symbol of the selected security, the duration of the order, and combinations thereof.

The interactive grid-based graphical quote presentation system of claim 77, wherein additional data is associated with each cell; whereby the additional data can be electively displayed by clicking or right-clicking on the cell; and wherein the additional data is chosen from the group of data consisting of: the number of orders associated with the cell, the total volume or number of contracts, the total dollar value of the orders outstanding, the total volume of the orders traded, and the lot size outstanding, and combinations thereof.

The data displayed on a display panel on a display device at any trader's location may include text based quote data and related summary statistics for a selected security or group of securities at any instant in time.

That text based quote data and related summary statistics may include data chosen from the group consisting of: the exchange or market where the selected security is being traded, the current bid price, the current ask price, the current bid size, the current ask size, the last trade price, the size of the last transaction in terms of the number of units of the selected security traded, the change in the price of the last trade with respect to the closing price of the previous session, the volume in terms of the number of units of the selected security that had been traded during the current trading session, the high price of the session, the low price of the session, the opening price of the session, and combinations thereof.

Of course, the price values represented by the price axis may be electively associated with an absolute price or price range, or a relative price or price range.

If so, the adjustment of the price values, and the alteration of the associated visual or graphical properties of each cell, along the price axis, is typically under the control of third process means.

In the interactive grid-based graphical quote presentation system of the present invention the relevant visual or graphical properties of any cell associated with quote data may dynamically change in response to an amendment of its original properties, and in relation with the values represented by the cell's respective axes.

The displayed price range for any price axis may be automatically determined according to a set of relevant market trading data.

If so, the range of price values which are displayed along the price axis, and the price value for a selected row or column may be determined for each selected security at any instant in time as a factor of one of the criteria chosen from the group consisting of, the closing price for that security during the prior session, the opening price for that security during the current session, the highest price paid for that security during the current session, the lowest price bid for that security during the current session, and the last price paid for that security, and combinations thereof.

The criteria for which at least one column of a matrix is determined, may be chosen from the group consisting of: a market participant, a security, a component of an index, an index, aggregate trading data from a plurality of market participants, the trading activity of a market participant during the current session, the trading activity of a component of an index, the pending orders of the market participant at any instant in time, aggregate buy order data from a plurality of market participants, aggregate sell order data from a plurality of market participants, and combinations thereof.

Of course, in any interactive grid-based graphical quote presentation system hereof, any axis not associated with the price axis can represent any market criteria other than price.

In an interactive grid-based graphical system of the present invention, the grid-based graphical interface for any trader may have memory means associated therewith, whereby a record function stores market trading data in the memory at selected time intervals. Thus, a replay function for the data, to recall that market trading data associated with the selected time intervals, and to graphically display the data over a selected time period, may be selectively invoked by a trader.

Of course, any specific color, text label, pattern, shape, or texture may be associated for each different type of trading order which is displayed in any cell.

Thus, any specific color, texture, text label, shape, or pattern may be associated with each cell representing an ask price, or a higher price than the ask price, for any selected security in any given market; and wherein a different specific color, texture, text label, shape, or pattern may be associated with each cell representing a bid price, or a lower price than the bid price, for any selected security in any given market.

The interactive grid-based graphical quote presentation system of the present invention further include fourth process means that function to transform NASDAQ Level II data for any selected security, at any instant in time, into a format suitable for display on the grid-based graphical interface.

The interactive grid-based graphical quote presentation system hereof may also further include fifth process means that function to transform a stock exchange's market depth data, or an Electronic Communication Network's (ECNs) electronic order book for any selected security, at any instant in time, into a format suitable for display on the grid-based graphical interface.

The replay function noted above may be controllable so that playback of market trading data is accelerated in time, or de-accelerated in time, and displayed visually.

Also, the market trading data which is displayed for a selected security at any instant in time can be electively filtered to display a subset of the trading data, which subset satisfies criteria based at least on one parameter associated with the data.

It will be understood that columns representative of a parameter of the trading data can be arranged automatically based on criteria defined by a trader.

Of course, columns representative of a parameter of trading data can be arranged manually through a drag and drop operation of a respective column header by a trader.

It will also be understood that any icon may be chosen from the group of images consisting of: the logo of the company associated with any security, the trading symbol of the security, the type of security, the quantity of units of the security, the type of order for the security, the status of the order for the security, and combinations thereof.

In the interactive grid-based graphical quote presentation system of the present invention any cell representing a specific quote may be displayed relative to the price axis, wherein the position of any cell is determined by the difference between the price associated with a specific quote and the price associated with a base price indicator on the price axis. At least one cell representing a specific quote is displayed.

Differences in the values of the price dimension associated with order data and quote data may be represented through positional distinction, by potting GUI objects representative of that order data and quote data onto specific positions on the drawing area; and wherein the specific positions are determined by mapping the value of the price dimension against the values associated with the price axis.

Of course, the trading data may be representative of NASDAQ Level II data.

Also, any selected security for which trading data is displayed at any instant in time may be changed to another selected security by any trader, at any instant in time. The trading data can be electively filtered to display a subset of the trading data, which subset satisfies criteria based at least on one parameter associated with the trading data.

It is also possible that the backend trading system maybe market simulation software.

In the software object of the present invention, differences in the values of the price dimension and the values of the additional dimensions associated with the order data and quote data may be represented through positional distinction, by plotting the GUI objects representative of the order and quote data onto specific positions on the drawing area. The specific positions are determined by mapping the value of the price dimension and the values of the additional dimensions against the values associated with the price axis and the values associated with the at least one additional axis.

The axis associated with price may be presented as a specific price range above and a specific price range below the last traded price of a selected security or groups of securities at any instant in time.

The price difference between two adjacent cells along the price axis may be the minimum price variance (MPV), or a multiple of the minimum price variance, for any selected security or groups of securities being displayed at any instant in time.

Of course, specific order data and specific quote data may be linked and associated to a respective one of a set of GUI objects in the grid-based graphical interface at each trader's location.

Data communications established over communications channels may be in keeping with selected protocols which are established to standardize data interchange between the grid-based graphical interface communicating over any communications channels with any backend systems; and of course the data communications may electively use secure data encryption modes.

It will be understood that cells representing a selected quantity of buy orders at or near the bid price, and different cells representing a selected quantity of sell orders at or near the ask price, which represent market trading data being posted by a market participant for a selected security, may be simultaneously displayed.

In the interactive grid-based graphical trading system of the present invention, a plurality of grid-based graphical interfaces may be presented in a plurality of overlapping tab pages. The tab for any of those pages can be selected, and a plurality of tab pages may be contained in at least one display panel on the display device. The at least one grid-based graphical interface is associated with one tab page or one display panel at any instant in time.

Of course, the specific visual or graphical properties of any tab page may change at any instant in time, as a result of a specific event occurring.

If so, the specific event may be triggered by specific market or user defined criteria related to the tab page, or to the securities associated with the tab page.

Any interactive grid-based graphical trading system in keeping with the present invention may further include software whose purpose is to review and weigh a trader's cash position and portfolio holdings, so as to make a recommendation on an order parameter for a trading order for a selected security, at any instant in time, where the recommendation is a function of an order parameter chosen from the group of order parameters consisting of: the bid price, the bid size, the ask price, the ask size, the last trade price, the volume or contracts traded over an interval of time, the volatility, the liquidity, and combinations thereof, for that selected security at any instant in time.

The order parameter is at least one of the size of the trading order, the quantity of the trading order, price of trading order, and duration of trading order for the selected security.

When the graphical display at any trader's location includes a display panel containing data categorized as NASDAQ Level II data for a selected security at any instant in time. The NASDAQ Level II data includes at least one set of data which is chosen from the group consisting; the identity of a market participant whose data is being displayed, the bid price and size associated with a given market participant's data, the ask price and size associated with a market participant's data, and combinations thereof.

Of course, in the interactive grid-based graphical trading system of the present invention, wherein columns representative of a parameter of trading data can be arranged automatically based on criteria defined by the trader.

Also, columns representative of a parameter of the trading data can be arranged manually through a drag and drop operation of a respective column header by the trader.

In the interactive grid-based graphical trading system hereof, a selected tab page associated with a given security may become the active tab page as a result of at least one user interaction associated with that security.

Also, a tab page is automatically created, at any instant in time, and may be associated with a specific security, as a result of at least one user interaction associated with that security. It will be understood that the created tab page for the specific security does not exist prior to the user interaction.

PRIOR ART

U.S. Pat. No. 6,058,379, issued May 2, 2000 in the name of Odom et al teaches a networked exchange method in which a commodity may be traded from a seller to a purchaser using an exchange processor. A mode of operations for an exchange is specified, a commodity is identified and listed, and the listing is accessed by a potential purchaser. The potential purchaser accesses the network-based exchange, a negotiation occurs by processing information generated by the potential purchaser; and at the conclusion of the negotiation the concluded negotiation is cleared. All of the transaction software is driven by the exchange where the transaction is concluded.

Belzberg U.S. Pat. No. 6,134,535, issued Oct. 17, 2000, teaches a computerized stock exchange trading system where a graphical user interface is employed to automatically format orders from a spreadsheet to an order entry system. Parameters such as a share symbol, price selection, order size, and transaction type, as well as other indicators for the trading order, may be chosen using the graphical user interface and a mouse. The interface may be programmed so that data concerning a group of shares may be read from a spreadsheet which is formulated into an order, or in response to a signal from the trader whereby an index or basket of shares may be traded substantially instantaneously.

U.S. Pat. No. 6,195,647, issued Feb. 27, 2001 to The Nasdaq Stock Market, Inc., in the name of Martyn et al. This patent teaches a data processing system for on-line transactions whereby securities may be traded, wherein any user may configure his or her display so as to employ certain functions and to show displays for any particular security. Additional information may be displayed, such as information about selected securities, trade activity may be monitored, a trade may be participated in, or reported. It is also possible for a user to display information for a selective set of securities on a continuously updated basis, where any of the securities can be easily selected from a displayed list. Certain information and functions associated with the selected security may also be displayed.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which:

FIG. 12 is a typical computer monitor display at a trader's location, showing various kinds of data;

FIG. 16 shows data chosen from the market order entry tab, chosen from FIG. 12;

FIG. 17 shows data typically found on a limit order tab chosen from FIG. 12;

FIG. 18 shows data typically found on a stop order tab chosen from FIG. 12;

FIG. 19 shows data typically found on a change order tab chosen from FIG. 12;

FIG. 24 shows data chosen from an options order tab, chosen from FIG. 12;

FIG. 39 represents the settings which may be established when a replay tab is chosen from FIG. 12;

FIG. 40 is a representation of the settings which may be established when the Position Guide settings button 131 from FIG. 12 has been chosen;

FIG. 43 shows a dialog box in which special terms criteria may be set for any transaction;

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

Figure 1:
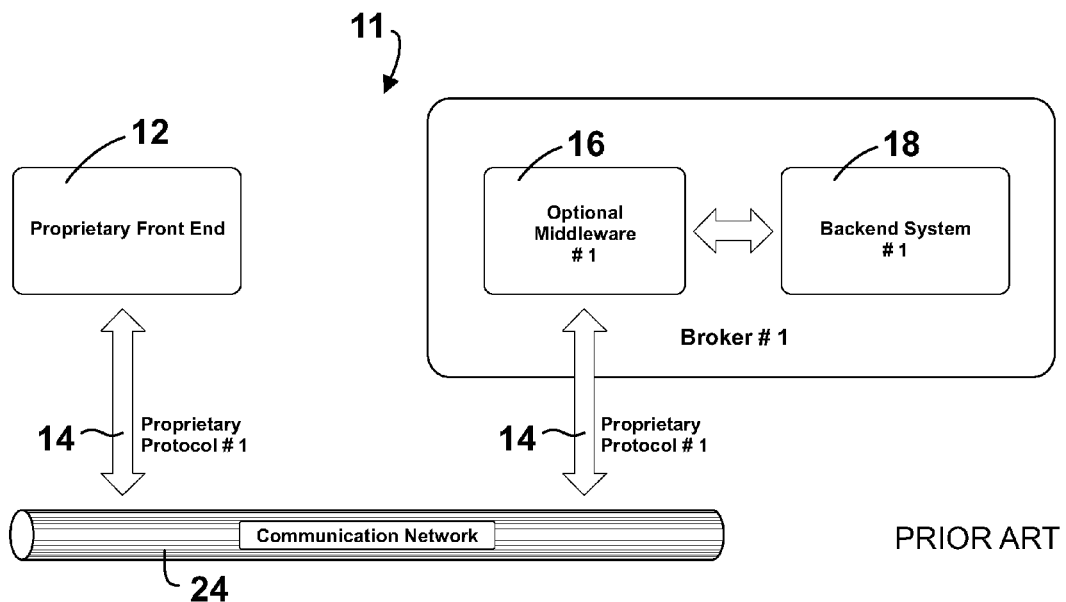
FIG. 1 is a schematic representation of a prior art system employed particularly by stock brokers for trading purposes by remotely located traders.
Figure 2:
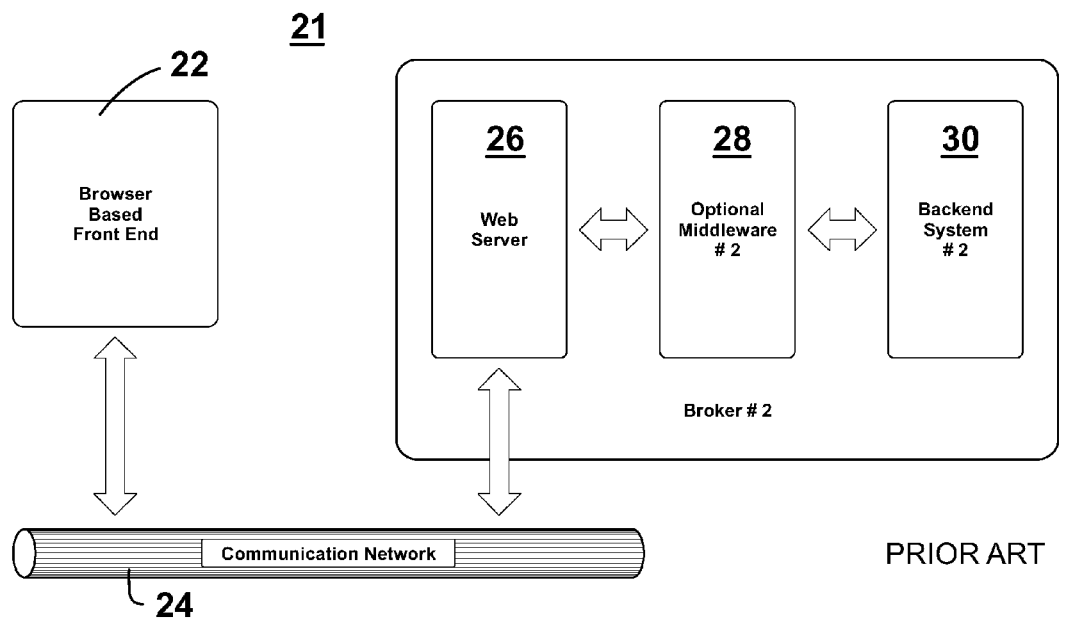
FIG. 2 is another schematic representation of a different, browser-based front end system currently employed by brokers for remotely located traders.

Turning first to FIGS. 1 and 2, two prior art systems are shown which employ different front ends. In the prior art system of FIG. 1, showing a system architecture which is in place and which is operated by Broker # 1, the system 11 comprises a proprietary front end 12, a proprietary protocol 14, an optional middleware 16, and the backend system 18. The optional middleware 16 and the backend system 18 are located on the premises of Broker # 1, who communicates through a proprietary protocol 14 to the proprietary front end 12.

In the prior art system of FIG. 2, the system 21 includes a web-based application, which presents a browser-based front end.

In this specification: the terms "frontend", "front-end", and "front end" are used interchangeably; the terms "backend", "back-end", and "back end are used interchangeably; and the terms "right-click" and "right click" are used interchangeably.

Communication is carried out through the Internet, as shown at 24. Within the premises of Broker # 2, there is a web server 26, there may be optional middleware 28, and there is a backend system 30.

Either interactive grid-based graphical trading system 12 or 22 is what a trader will see on his computer, and it is the tool that the trader uses to get quotes, manage his account with the respective brokerage firm, buy and sell shares or securities in general, and to track his transactions. Simple front ends tend to be implemented as web applications, as indicated in FIG. 2; however, any proprietary front end may also be employed. Any of these systems offer satisfactory performance, but proprietary front ends are generally not helpful, when it comes to visualizing market information. Web-based front ends are generally quite slow, because both the user interface and the data must be processed remotely at the web server or at the back end.

Of course, a system such as that shown in FIG. 2 is easy to deploy, manage, and maintain, if it is web-based because of its centralization at the premises of the respective broker.

If a proprietary front end is used, that system involves the installation of application software at the local computer employed by the trader. Those systems tend to be somewhat faster and more graphical, and they may be more interactive than strictly web-based applications, because the application is run locally. Of course, as with any locally installed software which is located at a desktop computer, or even on a small local area network operated by the trader, the software is prone to installation and maintenance problems, file corruption, version conflicts, and upgrade problems.

If either backend system 18 or 30 exists in conjunction with any embodiment of the present invention, it is because they are the backend systems that are operated by respective brokers, electronic communication networks (ECNs), or even stock exchanges, and the like. Any such backend system may likely reside in a high end UNIX machine. Any backend system will generally have the responsibility for handling a number of tasks.

They include account management. This is the responsibility for managing and keeping all data up to date for each account—each customer or various accounts run by a customer—that is handled by that market participant. As noted, a market participant might be a broker, it might be an approved electronic communication network, or it might be a stock exchange, commodity exchange, futures exchange, bourse, or auction system.

Another task charged to the backend systems which function in the prior art, and which function in association with the present invention, is that of processing buy orders and sell orders for each buy transaction and for each sell transaction which that market participant undertakes to perform.

Still further, the backend system is responsible for order execution, whereby each buy transaction and each sell transaction which the market participant undertakes to perform will be executed.

The backend system is also responsible for data feed handling, whereby streaming data concerning any orders or quotes for any selected security is disseminated on request to any trader, as discussed hereafter.

Finally, any backend system described herein will also be responsible for system management, for purposes of maintaining security and operation of the respective backend system of that market participant.

A communication protocol is required in prior art systems, as well as in the present system. In the prior art systems, the communication protocol for proprietary front end 12 is one which is used to securely transmit data from a proprietary front end 12 to the backend system 18, and in the reverse direction. Usually, such proprietary protocol is built on top of TCP/IP sockets, most likely using some form of data encryption.

For prior art systems of the sort shown in FIG. 2, where Internet communication is employed in association with web-based front end, a typical communication protocol is HTTP or HTTPS.

Figure 4:
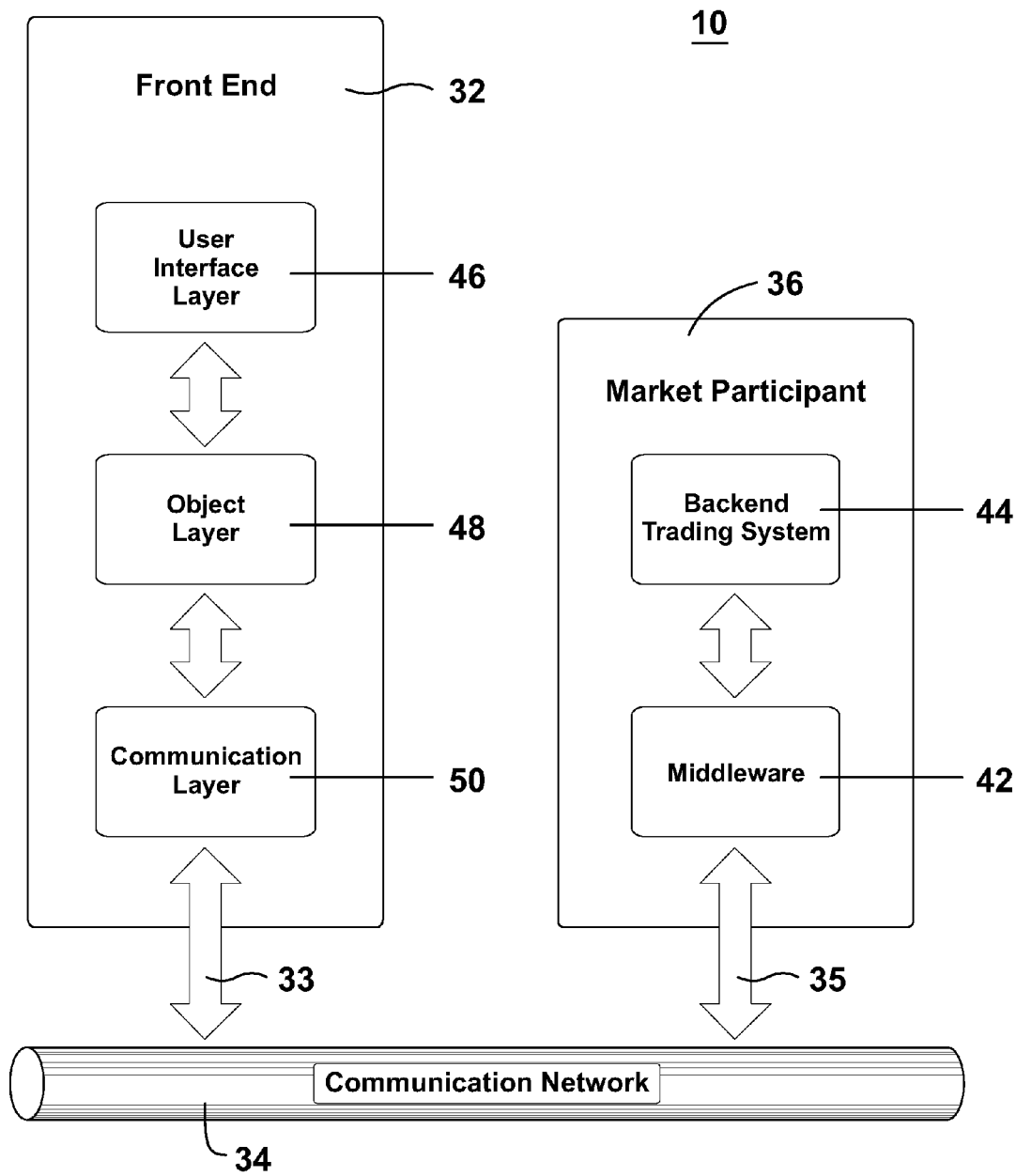
FIG. 4 shows a logical architecture for the front end functional unit.

A middleware component is employed, as shown at 16 and 28 in FIGS. 1 and 2, or as will be shown in FIG. 4 which is discussed hereafter. The purposes for the middleware are discussed hereafter.

There is appended hereto a Trading Glossary, which is provided so as to assist the reader in understanding certain trading terms, and terms relating to market, in various manifestations. All of the terms mentioned in the appended Trading Glossary are not necessarily employed herein; but when such terms are employed, and their meaning is unclear from the context, then reference should be made to the appended Trading Glossary.

Also, throughout the discussion which follows, and as shown in many of the Figures of drawings which are described, the names of real securities and of real stock exchanges and other market participants, Electronic Communication Network (ECN) trading systems, and the like, may be noted. The use of such names and identities is not intended to suggest any endorsement or connection with, or position in, any such security, stock exchange, or ECN, by the inventor or anyone associated with him.

Markets exist to bring buyers and sellers together to efficiently exchange goods and services. In a public marketplace, buyers and sellers make transactions directly or via intermediaries. At a basic level, a market requires the sellers price and terms to sell a given quantity of product. The market participants also need to know the prices that buyers are willing to pay for an item. Often, the price per unit decreases if a larger quantity of product is under negotiation. When the buyers and sellers agree in price and quantity, a transaction or trade can occur.

In the securities market, the bid price represents the highest price any buyer is willing to pay for a quantity of a security at a given time. The ask price is the lowest price that any seller or dealer is willing to sell a given security or commodity for. When the bid or ask price is in an acceptable range, trading activity in a given security will usually become more active.

Supply and demand prices vary throughout a trading session and the bid and the ask are typically at differing prices.

Information about the activity of a market is disseminated (usually in real-time) in electronic format through data feeds. A quote is a type of data feed containing information about the buy and sell prices for the securities traded on the market. Separate data feeds are available for trades, news, and other useful information.

Buy and sell quotes on marketable products are disseminated in varying detail. In financial markets like the stock markets, basic quote information on securities is readily available over the internet. A basic quote on a security details the last trade price, the bid and ask price, and the change from the previous close. Often, the size of the bid and the ask, the trading day's high price and low price, the volume of the last trade, and the overall session volume is also disclosed.

A more detailed quote is also available. The detailed quotes disseminated by the NASDAQ stock market are called "NASDAQ Level II", or simply "Level II" quotes. This type of quote is of interest to more active traders, because it allows them to track the activity of market makers that they believe to be price trendsetters. It also allows those with the capability to buy and sell their positions quickly when it becomes apparent from Level II information that the momentum of the markets has turned against them. With a Level II display, the identity of market makers and ECNs is disclosed and order information on either side of the bid and ask are visible. However, not all exchanges or markets provide order or quote information that allows a trader to view this detailed type of quote for all securities.

Still more detailed are market book quotes, which are order and quote information provided by some Electronic Communications Networks (ECNs) such as Island ECN and Archipelago, and stock exchange such as the Toronto Stock Exchange (TSE), which can display buy and sell orders individually listed on the ECN's or an exchange. The market books lists buy and sell orders, the number of shares in each order, and the prices offered. Orders are listed according to price and in time priority, so orders displayed close to the bid and ask on the list will be executed before orders further away in the list.

Not every quote feed from a stock exchange, stock market, electronic communications network, or quote dissemination service supplies a suitable data feed capable of providing information on the quantity of a security available at each price level during a given instant in time. Exchanges sometimes provide restricted or subscription-based access to similar information, however, some market participants prefer to keep their market book details confidential.

Depending on the opportunity and technology available, more than one market or network may exist to facilitate trading in a given security or commodity. When more than one market exists for a given product, there is a tendency to link the market information together to compare quote information and trading activity. Technology and computer networks make possible the linkage of the data feed (quotes, trades, news, etc) and order-placement facilities of different markets. As a result of this linkage, bid and ask prices tend to mirror each other, as financial intermediaries such as arbitrageurs trade products between markets when price discrepancies arise.

There has been a trend in recent years to trade stocks and options in more than one market or exchange. Exchanges like the NYSE and stock markets like NASDAQ have made strategic alliances with overseas exchanges to promote trading activity and facilitate listing active securities in other countries. In the US, options on a given security are often quoted and traded in multiple options exchanges.

Quote data on securities is often presented in alphanumeric text format. When working with a basic quote, and more than one security is being monitored or traded, the quote data is often displayed in multiple rows and columns of text similar to a spreadsheet. Each row represents a different security, while columns show attributes such as the securities' symbol, bid, ask, last trade price, change from previous closing price, the volume, low price, and high price of the current trading session.

The text based presentation is often difficult to interpret at a glance. Discerning patterns from the text based quote information of an individual stock or a group of stocks is also difficult. With experience, some traders develop buy and sell "indicators" which assist them in speculating on the direction of a given commodity or security.

The order placement process in many computer-based trading systems requires the user to interact with a form—which is a collection of graphical elements (e.g. text input area, label, button, etc) through which the user issues commands and/or keys data into the computer system. Once an order is placed, the status of the order and its relation to the market is not always spatially apparent. Similarly, desired changes to the resulting open order also take a forms-based approach, which often increases the time spent on the process as a result of the time necessary to refresh screens and download the revised data. The time taken to place a trade and to change an open order often requires that a trader shift attention to the mechanism of the user interface, rather than to maintain a focus on the market or the security in question, and hence obtain additional beneficial insight.

For securities, the minimum price variance (MPV) is the minimum amount by which the price of a security can change. The MPV is typically set by the primary marketplace for a given security or product. In investment terminology, the "bid" is the highest price a buyer is willing to pay for an investor's shares, while the "ask" is the lowest price at which a seller will sell shares. The difference between the two is called the spread. A smaller MPV will result in narrower spreads because there are more price points in buying and selling the securities.

Take, for example, a hypothetical stock with a bid price of 45¼ and an ask price of 45 5/16. The spread between the "bid" and the "ask" is 1/16 or 6.25 cents per share. In contrast, when stocks trade in penny increments, the number of price points per dollar is 100, meaning that the bid and ask prices can be closer together.

A smaller minimum price variance (MPV) will be possible as a result of the US exchanges and stock markets adopting a decimal format. Prior to decimalization, many US equities were traded and quoted at an MPV of 1/16 or 6.25 cents, meaning there are sixteen price points or "ticks" per dollar. Option prices over $3.00 have an MPV of 1/8, allowing eight price points per dollar. With decimalization, option prices are expected to trade in 5-cent increments under $3.00, and in 10 cent increments above $3.00.

It is an intent of the present invention to present quote information for any market in a graphical manner, and hence assist investors and traders in gauging the direction and changes to a security or asset's quote, price, and volume activity over an interval of time. It is also the intent of the present invention to allow traders and investors to view and review quote and order information in aggregate form, or across multiple markets, in an organized and meaningful manner.

It is also an intent of the present invention to assist traders and investors in selecting the proper quantity of an item to buy and sell, and to graphically place the order to a selected market. It is a further intent of the present invention to execute change orders in a given parameter of an open order in a simple graphical manner that does not distract the trader or investor from the dynamics of the quote display, while monitoring the investment.

Referring to FIG. 4, some similarities and some differences will be noted with respect to FIGS. 1 and 2.

In the first instance, the system which is indicated generally at 10, and which is the general architecture for the present invention, includes a front end 32. The front end 32 communicates through a communication network 34 to a market participant 36. Protocol exchanges at 33 and 35 will accommodate internet communications using varying protocols, as is well known. At the premises of the market participant 36, there may be a middleware component 42 installed, as well as that particular market participant's backend trading system 44.

Thus, the front end 32 may interface with diverse backend trading systems 44. Any market participant 36 may be such as a stock broker, an approved electronic communication network trading system (ECN), a stock exchange, a commodity exchange, a futures exchange, a bourse, or an auction house.

The ability for the front end 32 to communicate with diverse market participants 36 is possible because of the use of the middleware 42 which facilitates communication between the front end 32, at the PC of any trader or user, and the proprietary backend trading system 44 running on the heavily secured machines of the specific market participant 36.

As noted, the front end 32 does not communicate with the backend trading system 44 directly, but through middleware 42 if it is present, and also through the communication network 34, as well as interfaces 33 and 35 as may be necessary. The specifications of these interfaces will constitute a standard protocol which is based on eXtensible Markup Language (XML).

The middleware 42 will translate instructions and data, which are encoded in the standard protocol, and which come from the front end 32 into the native format understood by the actual backend trading system 44. Instructions and data coming from the backend trading system 44 are also converted to the standard protocol by the middleware 42, before it sends them back to the front end 32.

Thus, the front end 32 is shielded from the peculiarities of a backend trading system 44, which may be different for various market participants, and it allows the front end 32, and particularly the graphical display software and modes which are described hereafter, to be re-used in other applications with minimal modification.

One important benefit of the middleware 42 is that it enables the market participant 36 to supplement the base functionality of its existing backend trading system 44 with new, value-added functionality. Thus, a set or series of backend operations may be grouped into "virtual" operation. An example of this is an order amendment transaction, which will be described hereafter. In existing trading systems, an "order ammendment" transaction requires that the user go through a two-step procedure: first, the original order is cancelled; then, a new order is issued. With the middleware 42 in place, a single virtual operation—the order amendment operation—can be invoked by a trader. The middleware translates the single virtual operation into the appropriate series of trading instructions required by the backend trading system 44.

Of course, incorporating a series of operations into a single "virtual" operation is the responsibility of the respective market participant 36, and is transparent to the end user—the user or trader whose location includes a front end 32. The market participant 36 can offer the resulting "virtual" operation to its customers as a new type of transaction, and customers can make use of this new transaction just like any other type of transaction.

Turning to FIG. 4, the front end has a three-layer logical architecture, consisting of the user interface layer 46, an object layer 48, and a communication layer 50. This design gives the front end 32 the advantage of a clean, organized structure, wherein related software functions are grouped in independent layers, each layer communicating with the others using clearly defined programmatic interfaces.

The user interface layer 46 contains components that handle the graphics operations of the grid and other graphical objects. These include the construction of the grid (using either an object-based approach, or using a frame-by-frame animation approach); dynamic operations such as moving and highlighting the cells of the grid; and interactive operations like responding to user actions, e.g. adjusting the price intervals on the vertical axis when the user clicks on the appropriate graphical element (e.g. a button). These matters are discussed hereafter, with reference to FIG. 5.

The object layer 48 groups together components that perform business logic, and components that implement utility functions. The components in this layer: (1) validate users' actions (performed on objects belonging to the user interface layer 46); (2) translate users' actions into commands—if applicable—to be sent to the back-end trading system via the communication layer 50; and (3) process return values, notification messages, or any other data sent by the backend trading system (through the communication layer 50). The object layer 48 serves as an abstraction layer that shields the user interface layer 46 from the implementation of the lower level communication layer 50.

The communication layer 50 consists of components that act as communication "gateways" between the front end and the backend trading system. This layer essentially translates programmatic requests (which are in the native format of the operating system and application platform of the front end) coming from the object layer. That translation may be into Simple Object Access Protocol (SOAP) messages, but any suitable option for facilitating communication may be chosen. It is to be noted that although SOAP is the primary protocol for front end 32 to middleware 42 communication, other suitable protocols—such as Winsock—can also be employed.

The communication layer 50 is designed to accommodate the "plug-and-play" addition and removal of communication components, each component implementing a specific type of communication protocol (e.g. Winsock, SOAP) for interfacing with the backend trading system 44.

It will now be seen that the front end 32 is an important feature of the present invention, as it provides a graphically intuitive, fast, user-friendly application that any trader will use in order to get stock or other security quotes, manage their account with their respective brokerage firm or other market participant, buy and sell securities and stocks, track the status of those transactions, and track their current position vis-a-vis any selected security, their cash position, and so on.

Typically, the front end 32 operates on a Windows platform, but not necessarily. Other platforms may also be employed, including Linux, and other proprietary platforms.

As will be discussed hereafter, the graphical display employs GUI objects to display security data in a dynamic fashion, very intuitively, and allows the trader to buy or sell securities with simple mouse clicks by interacting with the grid-based graphical interface, and by dragging and dropping GUI objects.

Figure 5:
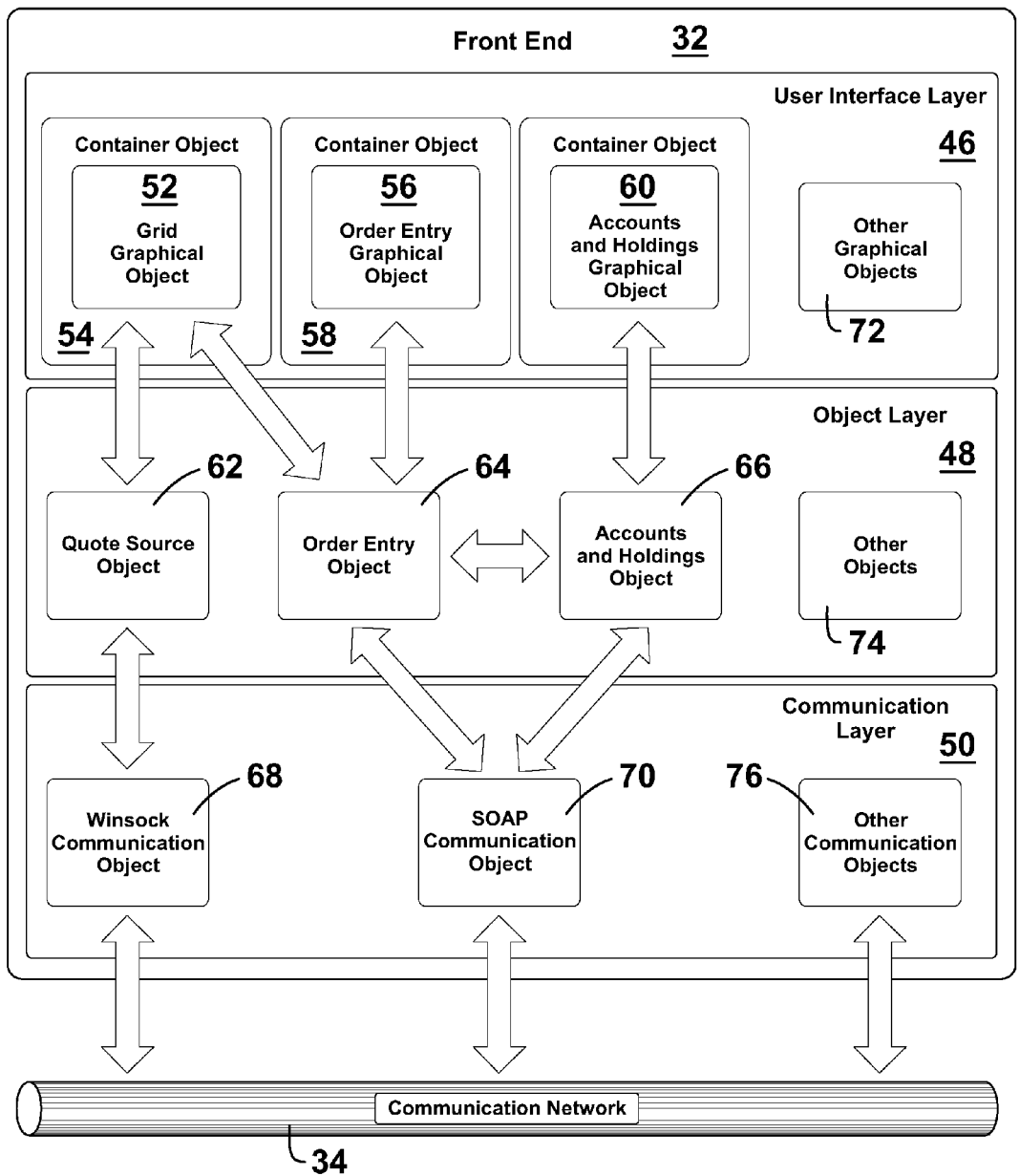
FIG. 5 is a block diagram of the internal architecture of the front end of a system in keeping with the present invention.

Turning now to FIG. 5, the internal architecture of the front end 32, and the main program therein, is shown in terms of the functional blocks which are operable at the front end 32.

The front end 32 consists of a main executable program—which acts as the overall "controller" of the front end—and several software building blocks called "components" or "objects". In a Microsoft Windows implementation of the front end, the main program is a Component Object Model (COM)-aware Win32 executable, and the software components are COM components. However, in an implementation of the front end for another operating system and application platform, the actual technologies used may be different, but the architecture will remain the same.

Unlike some monolithic Windows applications, which put together all functionality in a single package, the front end of the present invention leverages the power, ease of use, and the flexibility of using Microsoft's COM component technology. COM allows the front end to organize functionality into multiple, independent, reusable software building blocks called "components" or "objects". Although there is a difference between these two terms—a component is made up of one or more objects—the two terms are used interchangeably herein. Each of these components or objects encapsulates distinct software functionality, and interacts with other components through clearly defined programmatic interfaces.

The front end 32 is similar to conventional Microsoft Windows applications in that it adheres to the visual (e.g. menu structure, status bars, buttons, etc.) and behavioral (e.g. right-click behavior, resize behavior, etc.) standards for Windows-based applications. Thus, adherence to these standards by the front end of the present invention significantly eases the learning curve associated with mastering the application's features.

The front end's main executable program controls and manages the lifetimes of the application's various constituent objects—from object creation to object destruction. Furthermore the main program coordinates the operation of the objects, by passing messages between itself and the objects.

The core of the front end however, is in the set of software objects implementing the bulk of the application's functionality. These software objects fall into two categories: (1) graphical objects, and (2) non-graphical objects. Both types of objects encapsulate software functionality, but the graphical objects also display a visual interface. In Microsoft terminology, these graphical objects are called ActiveX custom controls, while the non-graphical objects are called ActiveX components.

The software objects are grouped together, according to functionality, into "layers". As noted above, there are three layers: (1) the user interface layer 46, (2) the object layer 48, and (3) the communication layer 50.

The most important software object is the grid graphical object 52. It displays Level II quotes in a two-dimensional matrix of multi-colored cells, which it constructs dynamically. The grid graphical object receives its data in real-time (or close to real-time) from a quote server (not shown) which resides on the backend trading system 44; the data however, passes through the object layer 48 and the communication layer 50 first. The grid graphical object 52 also implements the graphical placement and modification of orders using a "drag-and-drop" mechanism.

The grid graphical object is hosted inside a container object 54, to facilitate the easy grouping of multiple instances of the grid graphical object, discussed hereafter. The container object 54 is a graphical user interface (GUI) element with the capability to "contain" other graphical objects. An example of a container object is a tab-based dialog object common in Microsoft Windows-based applications.

The order entry graphical object 56 is a compound object (i.e. object made up of several smaller objects) which users of the front end utilize to post an order (and all its associated parameters). The order entry graphical object 56 is also hosted inside a container object 58.

The accounts and holdings graphical object 60 is another compound object that displays summary and detailed information about an account. This information includes the account balance, order status, account summary, etc.

Each of the three graphical objects described has a counterpart object in the object layer 48. The grid graphical object 52 has a quote source object counterpart 62, which encapsulates the logic necessary for requesting and receiving Level II data from the back-end trading system The order entry graphical object 56 has an order entry object counterpart 64, which implements the logic and business rules necessary for posting orders to the backend trading system, via the middleware 42. The accounts and holdings graphical object 60 has an accounts and holdings object counterpart 66, which implements the logic necessary for requesting, receiving, and updating account information from the back-end trading system.

The communication layer 50 has one or more objects that implement the logic involved in translating requests and commands coming from the upper layers of the front end 32 into the format expected by the middleware 42. This format conforms to a standard protocol, which is based on XML. The communication objects also translate the data coming from the backend trading system 44, through the middleware 42, into the format expected by the objects in the upper layers of the front end 32. In FIG. 5, there are two communication objects: the Winsock communication object 68, which implements the logic for remote communication using the Winsock protocol, and the SOAP communication object 70, which implements the logic necessary for remote communication using the SOAP protocol.

Other objects 72, 74, 76 may be found on each of the respective user interface layer 46, object layer 48, and communication layer 50, as may be determined by a skilled programmer who is familiar with the present invention.

Figure 3:
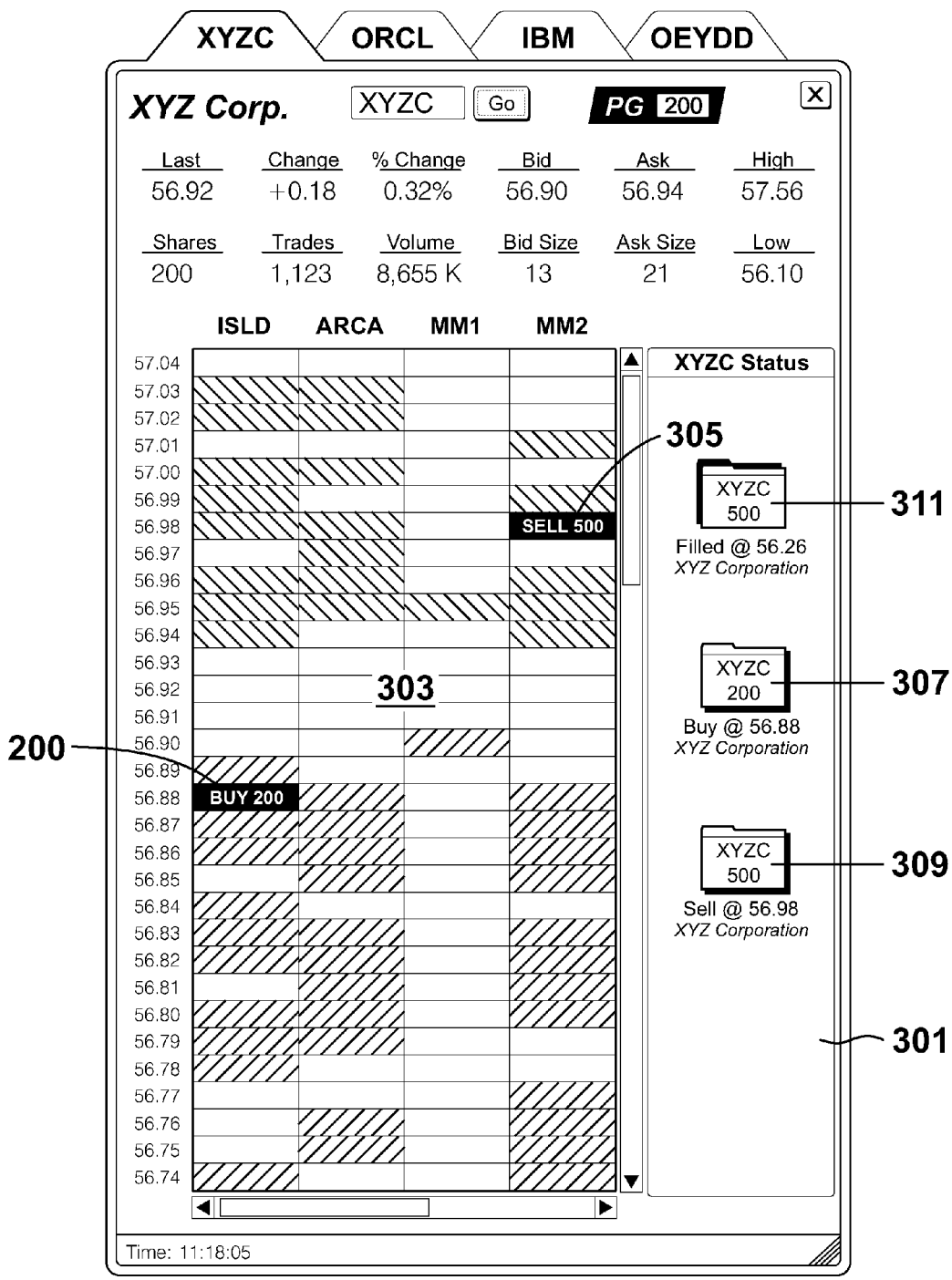
FIG. 3 shows typical data displayed on a grid, in keeping with the present invention.
Figure 55:
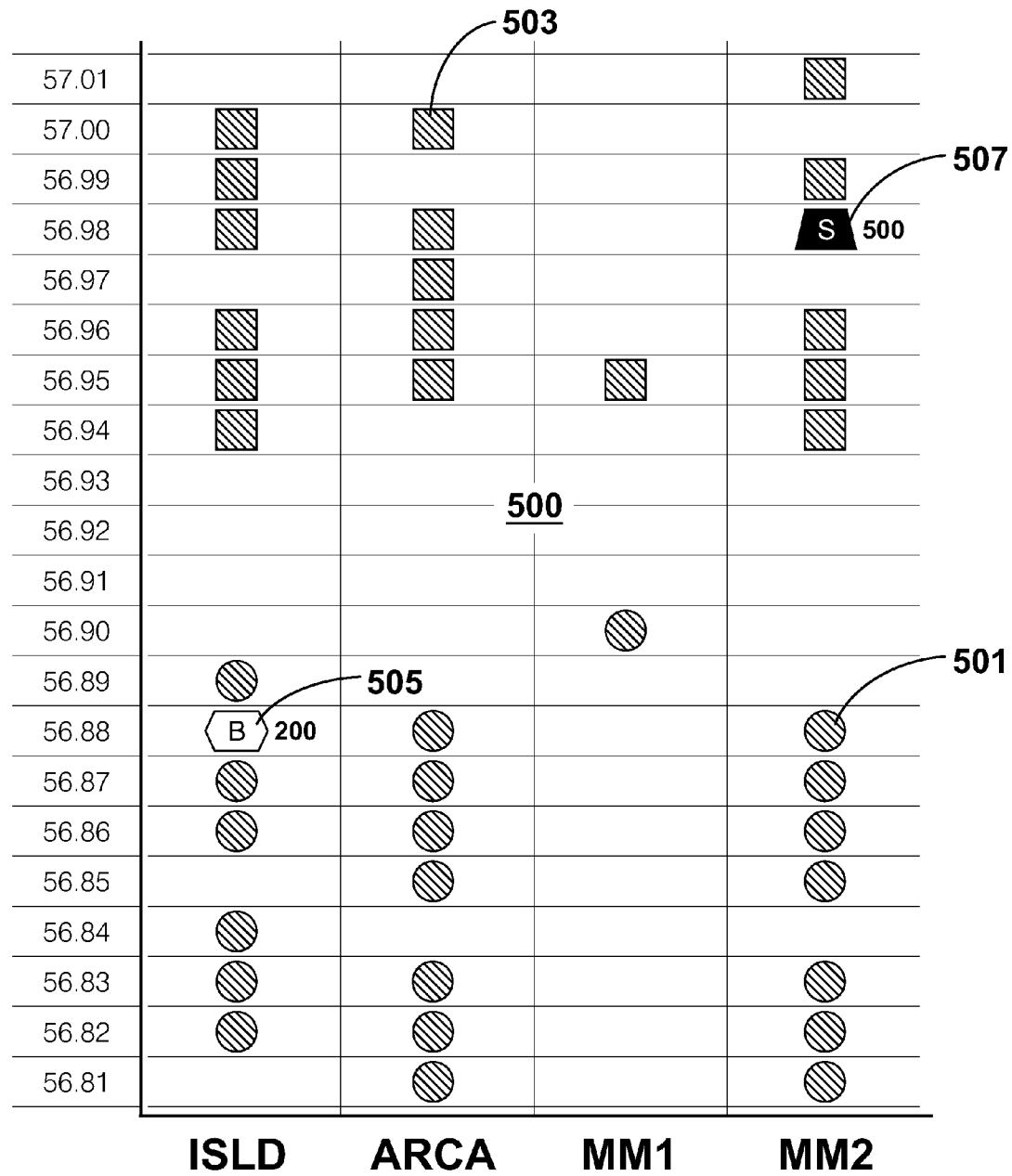
FIG. 55 illustrates details of a further visual manifestation of the software object.

Before turning to a discussion of the graphical display which is presented by the present invention, as shown in FIGS. 3 to 55, and so as to better understand the purposes and objects of the present invention, its operation, and its functions, several other Figures are presented—FIGS. 6 through 9 and are now discussed in terms of the present invention and the discussion which has gone on before. These discussions are, of course, for purposes of clarity and explanation, and are not intended to be limiting.

Figure 6:
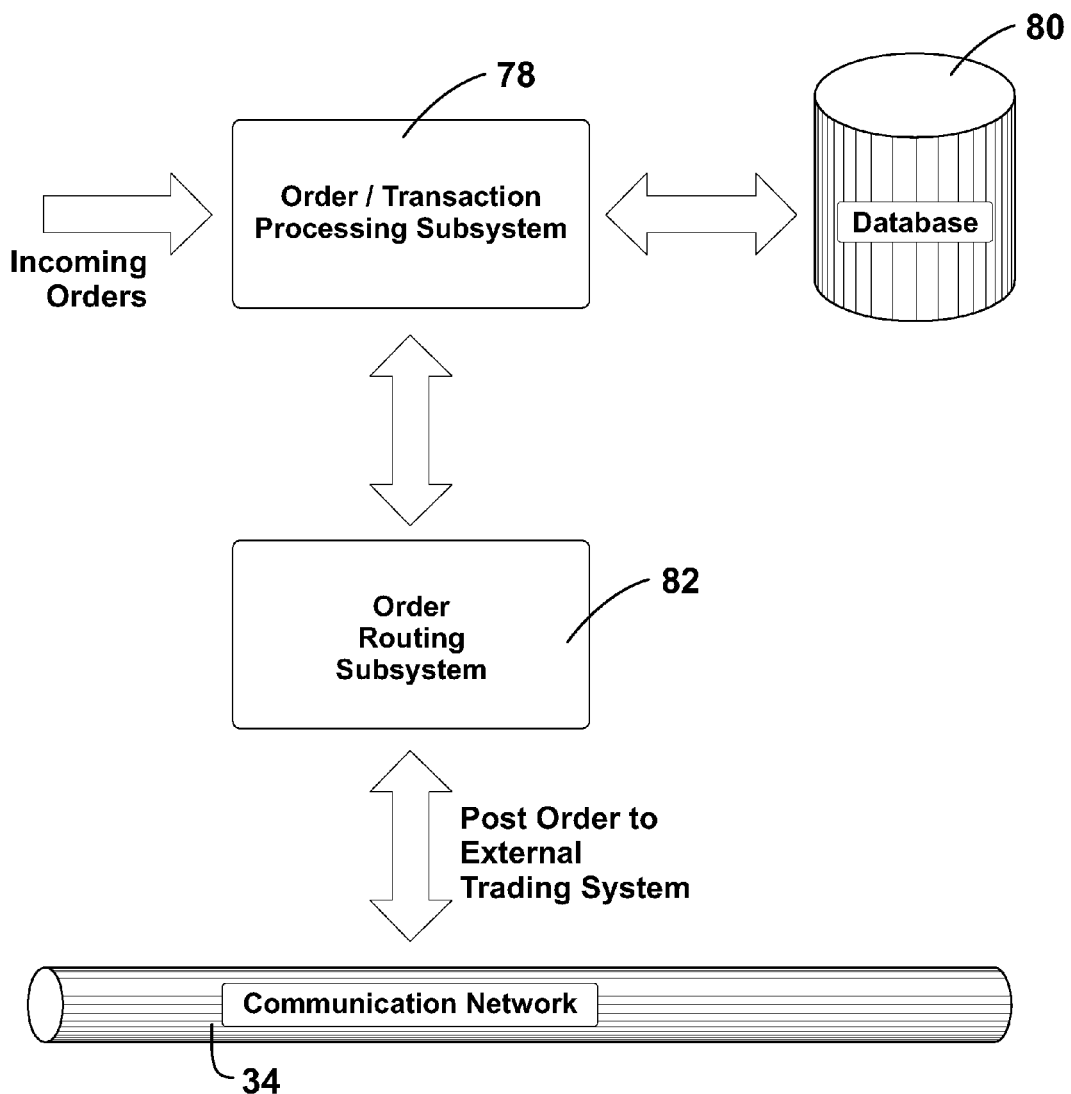
FIG. 6 is a block diagram of the order/transaction processing subsystem and order routing subsystem, in keeping with the present invention.

Turning first to FIG. 6, there is shown a representation of the order/transaction processing and order routing subsystems of a prototypical backend trading system. Of course, it will be understood that backend systems are highly proprietary, and thus the components and functionality of the system which is described herein, by way of example only, may not match the components and functionality of actual systems used by market participants.

The order/transaction processing subsystem 78 receives orders sent from the front end and records them in the transactions database 80. The subsystem applies appropriate business rules to validate the order and the parameters (such as terms) associated with it.

The order routing subsystem 82 utilizes suitable algorithms and business rules to select the best route for the orders it has received and validated. The best route always directs the order to the market participant (a Market Maker or ECN) with the best execution price.

If the user of the front end specifies a route for his/her order, the order routing subsystem 82 will use that route to execute the order. However if the user chooses the automatic routing option in the front end, the order routing subsystem 82 will choose the best route for his/her order.

The order routing subsystem 82 communicates with a local order execution subsystem, (if implemented by the backend) and external trading systems to retrieve and compare execution prices available for an order. The subsystem then uses the price data received to decide where to route orders. The local order execution subsystem is discussed hereafter, with reference to FIG. 8.

Figure 7:
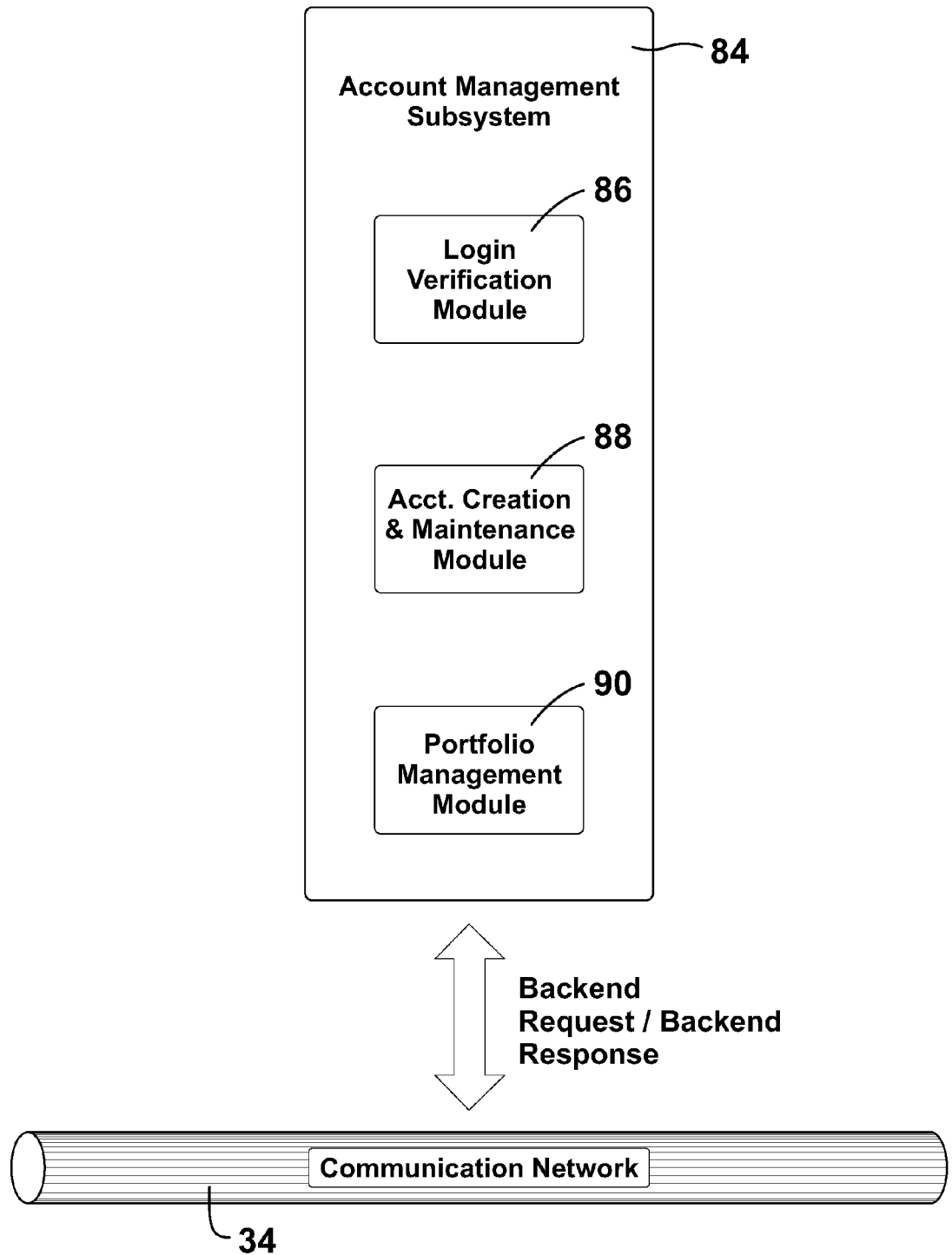
FIG. 7 is a block diagram of the account management subsystem.

FIG. 7 shows an account management subsystem 84, whose purpose is to handle the creation, monitoring and management of online trading accounts. Before a trader can do online trading transactions, he/she must open an online trading account with an online brokerage firm. There are several types of accounts, depending on the owner of the account (individual or institutional), the purpose for opening the account, and other factors. The account management subsystem 84 manages information pertaining to these accounts and their associated portfolios. It also handles password authentication during the initial login phase.

The account management subsystem 84 consists of three modules: (1) a login verification module 86, which handles authentication of users logging in to the backend system; (2) an account creation & maintenance module 88, which handles the creation, deletion, and management of online trading accounts; and (3) a portfolio management module 90, which handles the portfolios associated with the accounts managed by the account creation & maintenance module 88.

Figure 8:
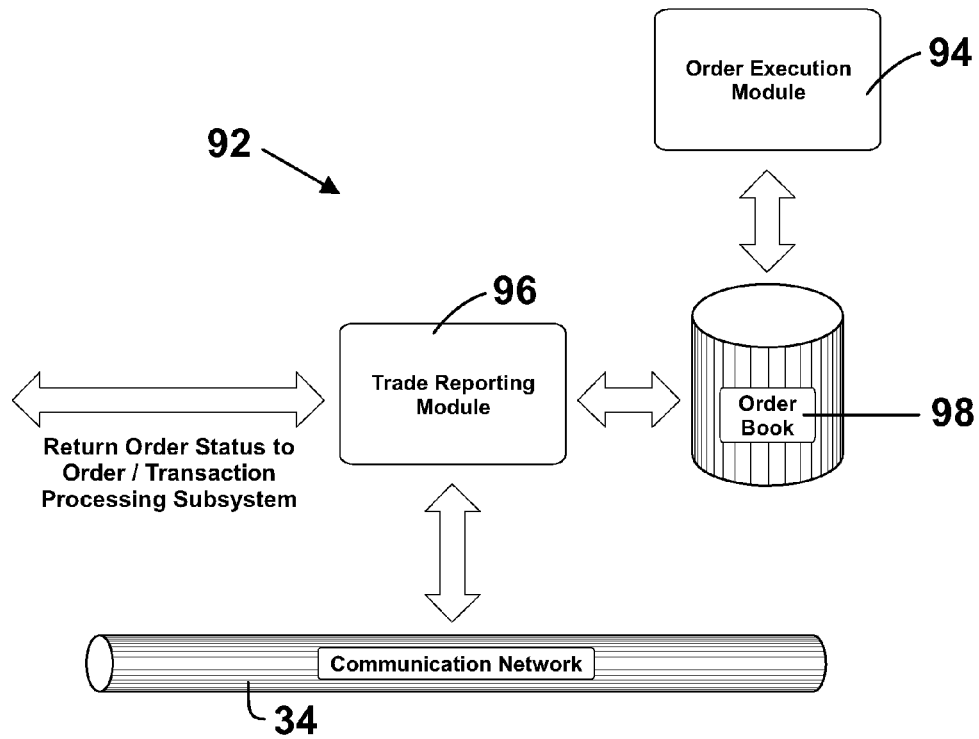
FIG. 8 is a block diagram of the order execution subsystem.

FIG. 8 is a representation of an optional order execution subsystem 92 of a prototypical backend trading system. For Electronic Communications Networks (ECNs), an order execution subsystem 92 is a requisite component, but not for online brokerage firms, which delegate their order execution services to external trading systems.

The order execution subsystem 92 consists of two modules: an order execution module 94 and a trade reporting module 96.

The order execution module 94 handles the automated matching of orders entered in an order book 98. It uses appropriate business rules and matching algorithms to give orders the best price possible at the time of execution. It also implements logic for handling orders with associated special parameters like all or none orders, date/time-dependent orders, etc. This module also handles the cancellation of previously entered orders.

The trade reporting module 96 manages the historical database of all trades executed by the order execution module 94. This module handles requests coming from the other subsystems for trade and execution information.

Figure 9:
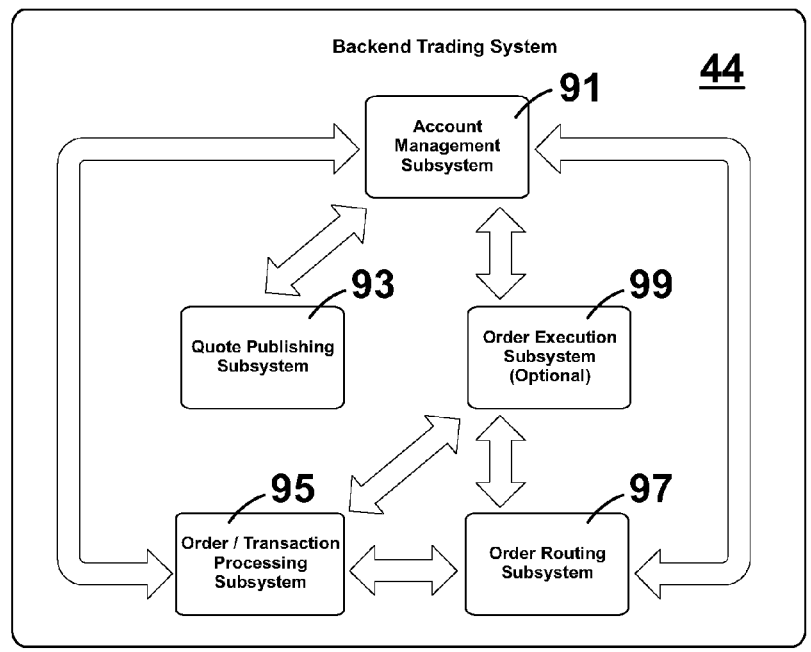
FIG. 9 is a block diagram of a prototypical back-end trading system.

With reference to FIG. 9, a prototypical backend trading system is shown by its functional blocks.

It will be recalled from discussion above with reference to FIG. 4, for example, that the front end 32 is capable of interfacing with diverse backend trading systems 44. This includes any system that can: (1) manage online trading accounts, (2) publish quotes, (3) receive orders, (4) execute orders, and (5) provide feedback to the trader on the status of his/her orders. The middleware 42 makes this capability possible.

Although the backend trading system 44 can be any of the following: an auction system, a currency trading system, or a commodity trading system; the present invention is particularly directed towards securities trading. Thus, this description focuses on a specific type of backend trading system 44. The many similarities between a securities trading system and the other backend trading systems mentioned allow the present invention to be ported from one backend trading system to another, with relative ease.

This discussion with reference to FIG. 9 defines, in general terms, what a prototypical "backend trading system" is—its architecture, the processes involved within the system, and the data that is passed back and forth between the front end 32 and the backend trading system 44.

A backend trading system 44 is a computerized system operated either by an online brokerage firm or an Electronic Communications Network (ECN). It typically consists of the following subsystems: (1) account management subsystem 91, (2) quote publishing subsystem 93, (3) order/transaction processing subsystem 95, (4) order routing subsystem 97, and (5) order execution subsystem 99.

Furthermore, the implementation of the backend trading system also depends on the type of company that runs it. Online brokerage firms usually implement components 91, 93, 95, 97, but not 99; ECNs on the other hand implement all five components. All backend trading systems 44 however, ultimately link up with a stock market's or stock exchange's computerized trading system.

The account management subsystem 91 handles the creation, maintenance and monitoring of online trading accounts. It stores and manages information on the account's owner, its privileges, limitations, balance, its portfolio, and other related information. The account management subsystem 91 also handles the validation of user passwords when users initially log in to the back-end trading system.

The quote publishing subsystem 93 (which may also be referred to as a stock quote server), broadcasts quotes to subscribers. There are two types of quotes: a basic quote which contain information on a stock's last price, the current bid and offer price for the stock, the change in price from the last trade, opening and closing price, highest and lowest price (for the current trading day), and the volume of stocks traded; the other type of quote is the detailed quote, which contains a listing of the prices quoted by different market participants. The detailed quote can also be categorized into two types: one that comes direct from a stock market like NASDAQ, whose implementation of the detailed quote is called "Level II", and one that comes from ECNs or stock exchanges. NASDAQ Level II is a tabulation of the bid and offer prices quoted by NASDAQ Market Makers and ECNs. The detailed quote from ECNs or stock exchanges and contains a snapshot of their market books (the queue containing all individual orders submitted to the ECN by its customers, the entries of which are ordered/arranged according to certain business rules).

The order/transaction processing subsystem 95 receives and validates orders coming from the broker's customers. After validating an order, it applies appropriate business rules (which vary depending on the broker) to the order. These business rules may include, among others, checking the account status of the owner of the order, checking the type and terms associated with the order, etc. Finally, the order/transaction processing subsystem 95 closely coordinates with the order routing subsystem 97 in deciding whether to register or "enter" the order into the local market book 98 (if the backend trading system has it), or to route it to an external trading system, e.g. NASDAQ or an ECN.

The order routing subsystem 97 uses appropriate business rules and algorithms to select the optimal route for orders accepted and validated by the order/transaction processing subsystem 95. The optimal route directs the order to the best order execution system—the one with the best price, whether it be local (if the backend trading system implements an order execution subsystem 99) or remote (if the backend trading system does not implement an order execution subsystem 99, or it is not the optimal one).

The order execution subsystem 99 matches buy orders with corresponding sell orders. It continuously examines entries in the local order book 98, and then applies certain algorithms and business rules to decide which "buy" orders it will match against corresponding "sell" orders. This subsystem is tightly linked with the order routing subsystem because the National Association of Security Dealers (NASD) rules dictate that backend trading systems 44 must find the best price possible for all orders it accepts. This subsystem is implemented only by ECNs. Online brokerage firms typically delegate their order execution services to an external trading system like an ECN, or to a NASDAQ Market Maker.

As noted, a particular purpose of the present invention is to provide a graphical user interface which may be used by any trader. Typical graphical displays are discussed with respect to screen snap shots shown in FIGS. 3, and 10 to 55, described hereafter.

The front end software of the present invention comprises the grid graphical object, several display panels, and several GUI objects. The most important component of the front end software is the grid graphical object.

Thus, a principal function of the GUI front end is to provide a grid representation of market conditions with respect to any security or group of securities, as discussed hereafter, effectively in real-time. The GUI front end also provides a number of display panels and GUI objects for dynamically displaying trading data, and updating the trading data being displayed. A plurality of grids may be shown, as noted hereafter, in side-by-side arrangement, as well as in tabs where one grid is hidden behind another in typical fashion well known particularly to programmers and users of Windows software.

Figure 10:
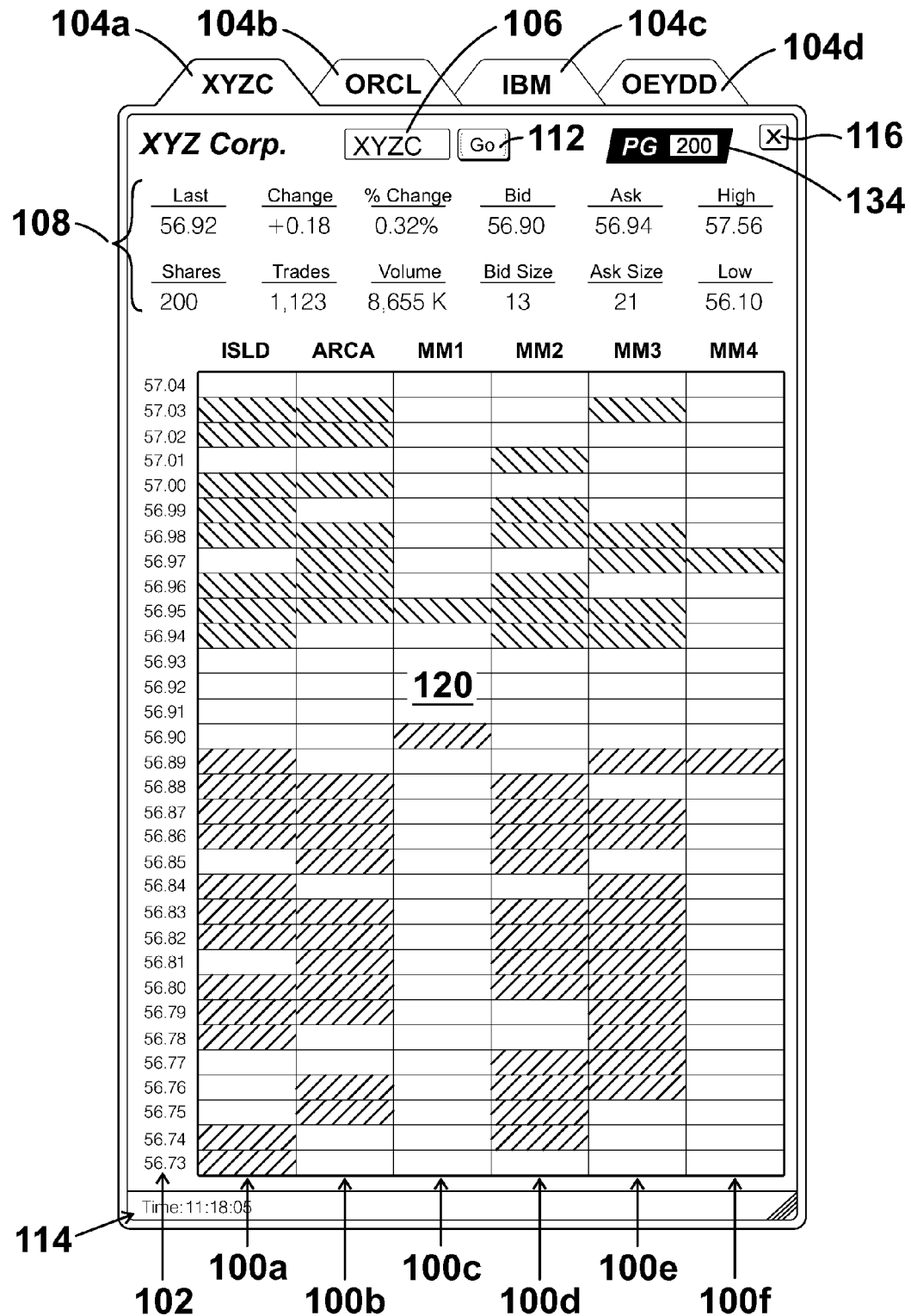
FIG. 10 shows a typical grid representation of data displayed at a trader's graphical user interface computer display.

A typical grid is shown in FIG. 10. Here, data for a plurality of market makers are shown in columns 100a ... 100f (being understood, of course, that the number of columns may vary as may be elected by the user, or as dictated by the software, all as described hereafter). A price axis is shown at 102; in this case, the prices are shown varying in one unit intervals (typically, one cent intervals). Of the tabs 104a ... 104d, each is indicative of a separate grid for a separate security. Tab 104a has been chosen, so that data concerning a hypothetical security identified as XYZ Corp. is shown. Its stock market symbol is shown at text box 106. In a grouping of displayed boxes shown generally at 108, specific data is shown concerning the hypothetical corporation. In particular, the price of the last trade at 56.92 is shown, being up 0.18 or 0.32%. The current bid price for this security is 56.90, and the current ask price is 56.94. The highest trade for the particular trading session in progress was at 57.56; the lowest trade was at 56.10.

The last trade was for 200 shares; and there have been 1,123 trades during the current trading session in progress, for a volume of 8,655,000 shares. The bid size and ask size boxes indicate the number of lots (each being 100 shares) being offered for purchase, or the number of lots being offered for sale, respectively, at the current bid and ask prices.

An icon labeled "PG" is shown at 134, and is described hereafter.

What is important to note is that there are a number of rows or price bins which are shown at various prices, and across various columns. It is important to note that in FIG. 10, and throughout all of the Figures being discussed herein, active or selected cells for various market makers or other criteria as may be determined for each column, at various prices as shown in the rows thereof, are indicative of either buy or sell quotes or orders. The bid prices—that is to say, each buy order or quote from any market participant which is being tracked on the grid, is at a specific price. As noted hereafter, there may be more than one buy order or quote at the same price, for any one market participant or market maker. In any event, all of the buy order or quote prices are shown with a particular hatching in the Figures—upwards to the right. That hatching is indicative of a specific color when the grid is, in fact, shown on the computer screen of a trader, the color being at the election of that trader.

The ask prices are shown with a different hatching—upward to the left—and of course it will be understood that such hatching is indicative of another color which is mutually distinctive from the first color used for bid prices.

Any of columns 100a ... 100f can be moved to a different location by selecting the column header and dragging it. They may also be automatically arranged according to some particular criterion, such as the most active market. Other columnar data, particularly aggregate data, are described hereafter.

Text box 106 permits entry of a symbol for any given security, after which the button 112 is clicked.

It is possible to adapt the grid display shown in FIG. 10 (and others) for use on Personal Digital Assistant devices or other portable platforms which are capable of displaying graphical information in keeping with the requirements of the present invention.

Buttons may be provided to zoom in or out on the price axis 102; a status bar is shown at 114, and a close button is shown at 116.

Figure 11:
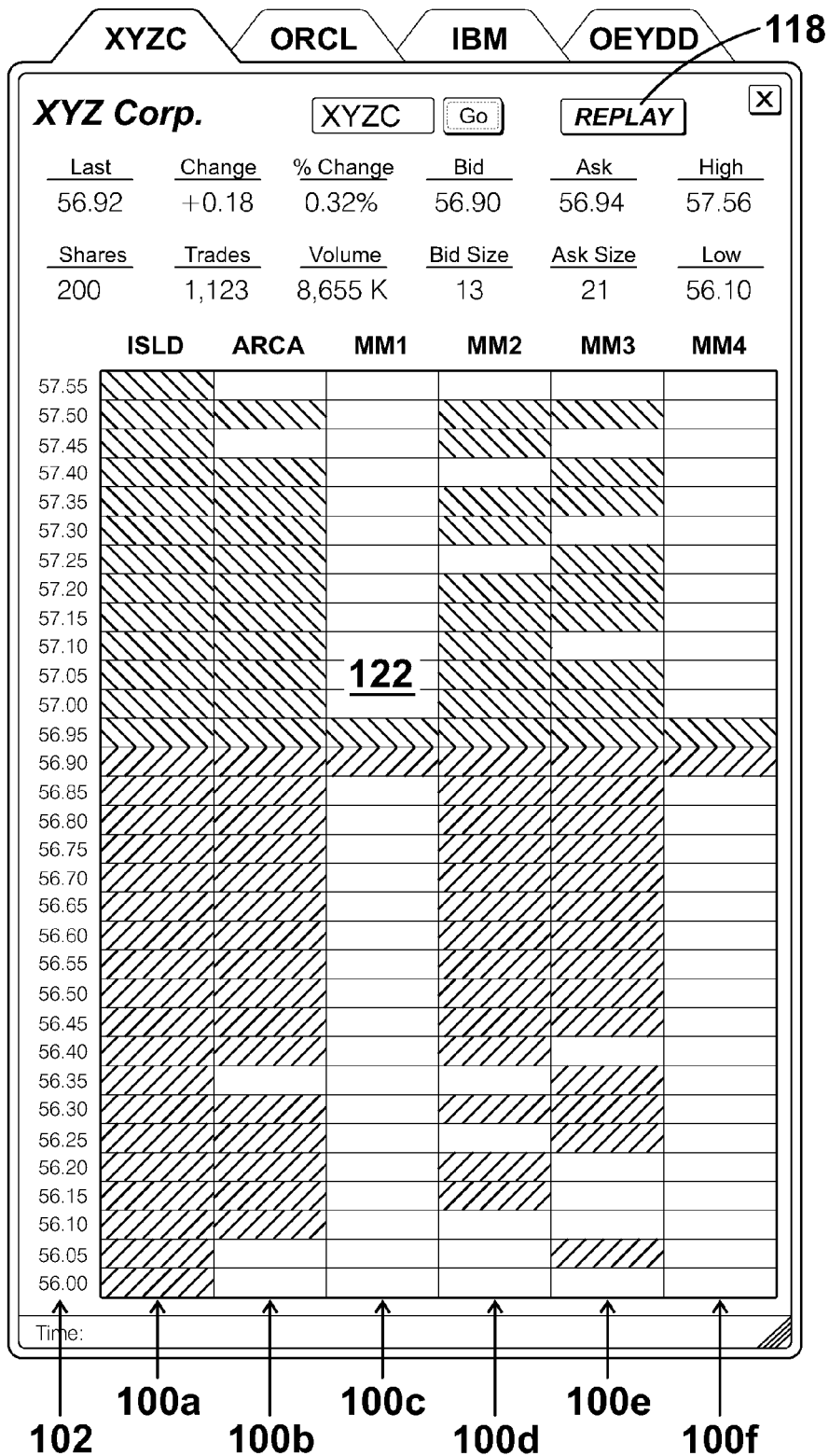
FIG. 11 is a view similar to FIG. 10, but with the price data being shown in larger intervals.

FIG. 11 is similar to that of FIG. 10, showing somewhat different data, because the price axis 102 shows each price bin separated from adjacent price bins by increments of 0.05. Thus, while the price range shown in FIG. 10 is from 56.73 up to 57.04, the price range shown in FIG. 11 for the same security is from 56.00 to 57.55.

It will be noted that each price bin or cell in column 100a in FIG. 11 is filled. That is because there is at least one bid or ask order within each increment shown on the price axis in FIG. 11. For example, while there is no activity shown at prices 56.90 up to 56.93 on the price axis 102 shown in FIG. 10, there is activity shown at 56.94 and 56.95, and thus there is ask activity shown in the price bin at 56.95 in column 100a as shown in FIG. 11. On particularly active days, market volatility may require that the trader sees a wider price range than prices that are merely separated by the security's MPV (minimum price variance). In FIG. 10, the price for XYZ Corp. may vary in one unit intervals; thus, each price bin shown in FIG. 11 may hold a multiple of the security's MPV.

The details of the dynamic changes are discussed hereafter, with reference to FIG. 53.

A replay button 118 is indicated in FIG. 11. This replay button can activate an historical data animation which will be displayed graphically on the grid, as described hereafter. Thus, quote and order information for a particular time interval can be reviewed, and accelerated if desired. The replay button 118 will speed up activity so as to gauge the market direction or momentum more accurately. It will allow a trade to compare activity from one period to another; and it will also permit a trader to review market activity that was missed.

Figure 12:
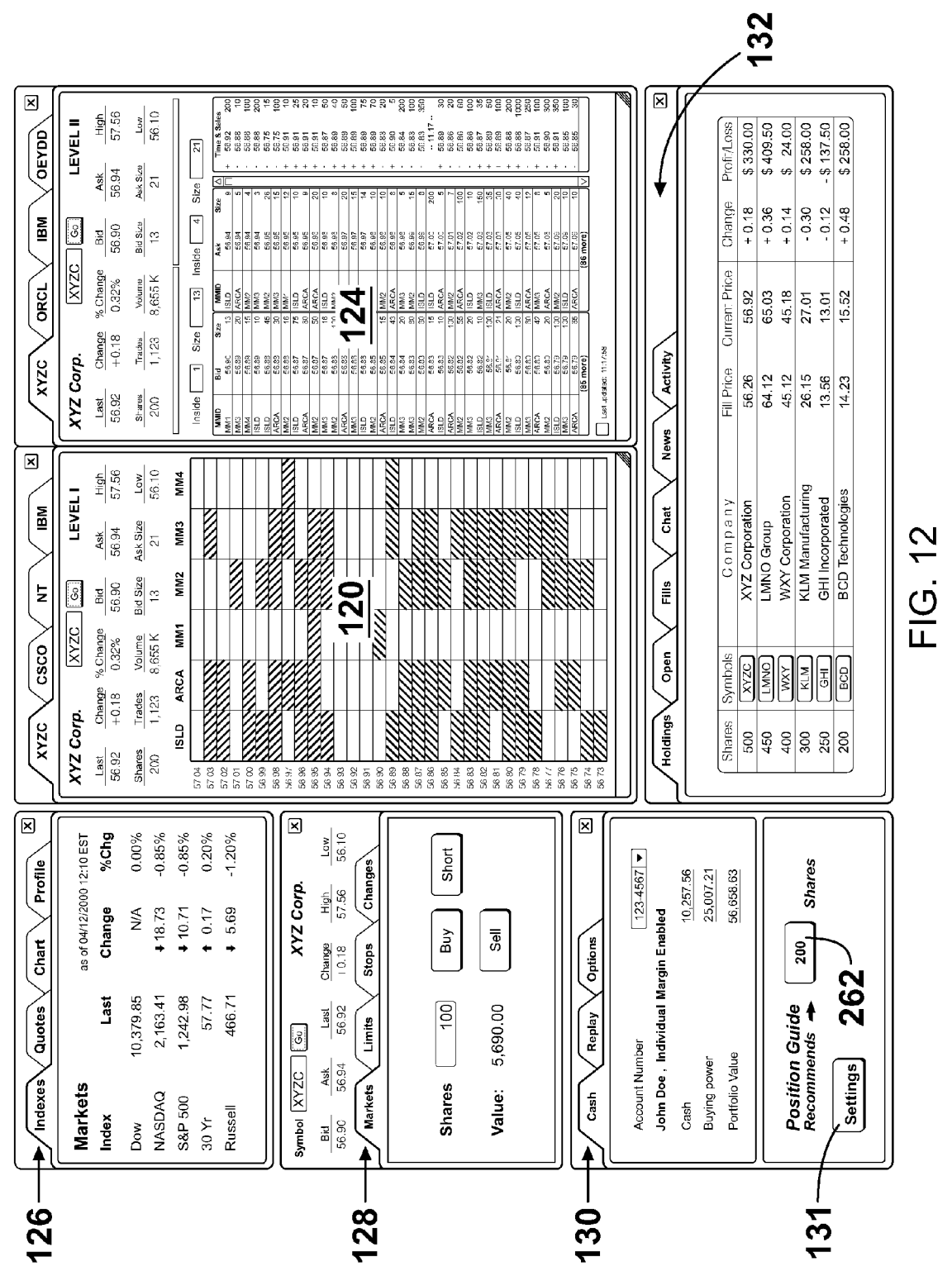
Figure 13:
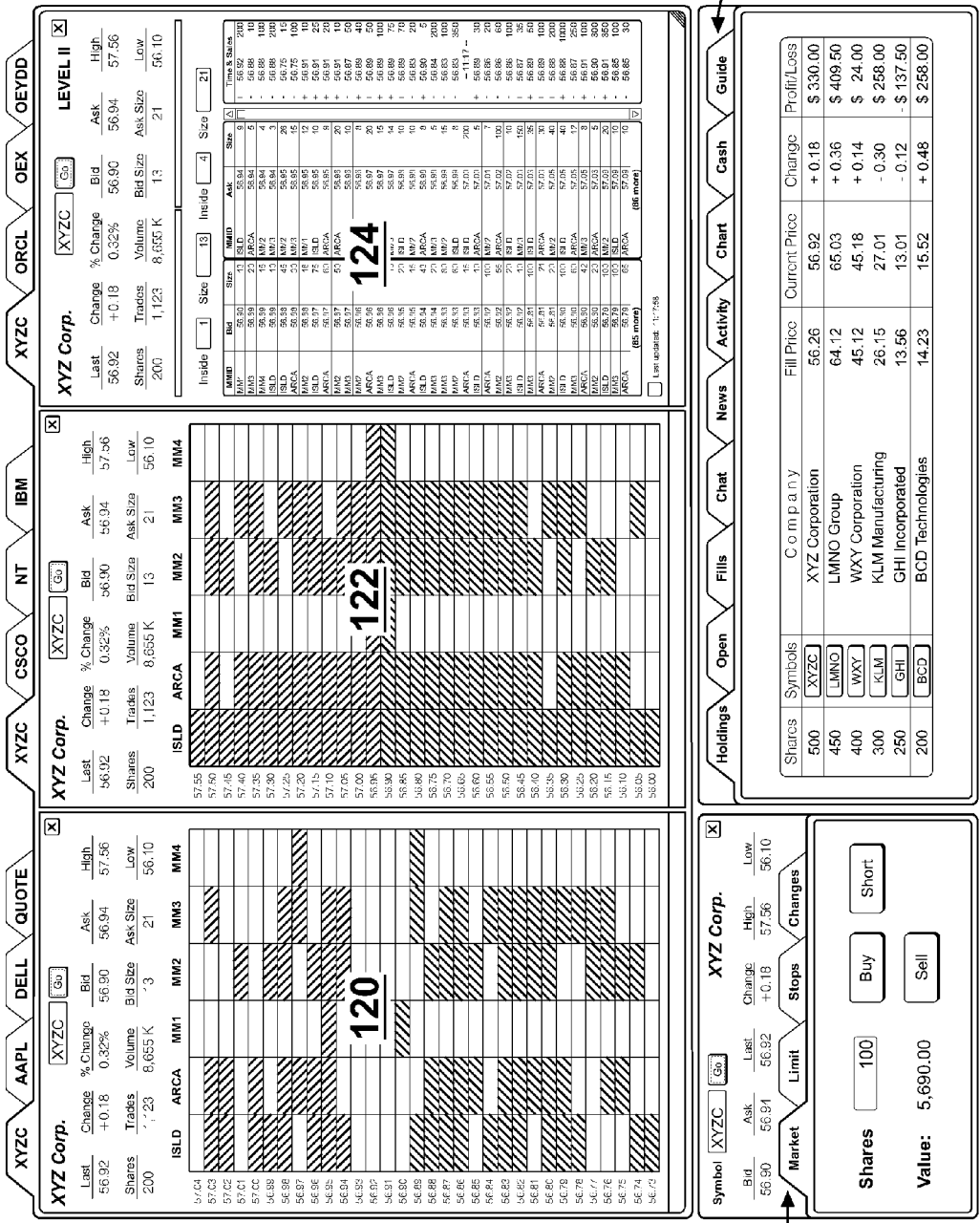
FIG. 13 is a view similar to FIG. 12, but showing additional data being displayed in a different manner.
Figure 42:
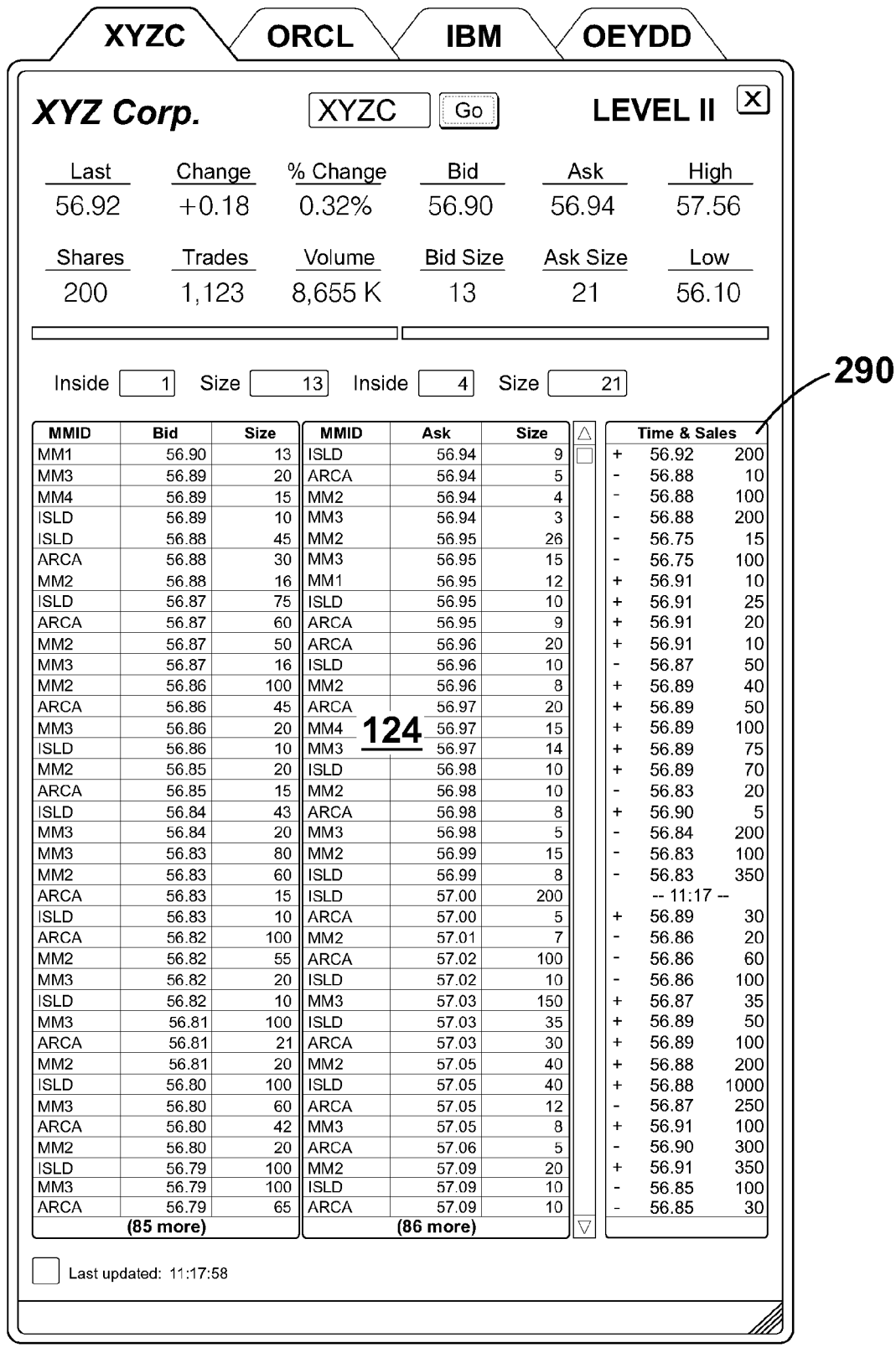
FIG. 42 is a typical display showing a NASDAQ Level II data being displayed.

FIG. 12 shows a typical screen shot having a number of specific display panels down the left hand side and across the bottom, together with two grids 120 and 124, which replicate data shown in FIGS. 10 and 42, respectively. FIG. 13 shows three grids 120, 122, 124 which replicate the data shown in FIGS. 10, 11, and 42, respectively.

Also shown in FIG. 12 are a number of other tab sets 126, 128, 130, and 132. There is also a Position Guide settings button 131 shown in FIG. 12.

It will be noted that tab set 128 is also shown in FIG. 13, but in a different location than in FIG. 12.

The various tab sets permit the trade to set up and enter orders, monitor open orders, view filled orders, view market statistics, monitor a cash position, recommend shares to purchase, interact with other traders, and follow market developments, all as described hereafter.

Of course, tabs can be moved within tab sets and between tab sets; and may be renamed. Also, as is known in a Windows environment, tab pages can be positioned at any coordinate on the screen, and may dock and undock with other windows, in keeping with Microsoft Windows conventions.

The Position Guide will recommend a suitable quantity of shares to buy or sell, as shown at display area 262, according to factors such as cash on hand and portfolio value, as described hereafter. A NASDAQ Level II grid 124 is shown, as described hereafter with respect to FIG. 42.

Obviously, the overall look and feel of the user interface may be controlled by a user preference configuration capability. Accordingly, the number of grids that are displayed, the maximum number of windows, the color and design or applications in, as well as other parameters which are relevant to the overall look and feel of the application can be selected, according to the user's preferences and experience.

Figure 14:
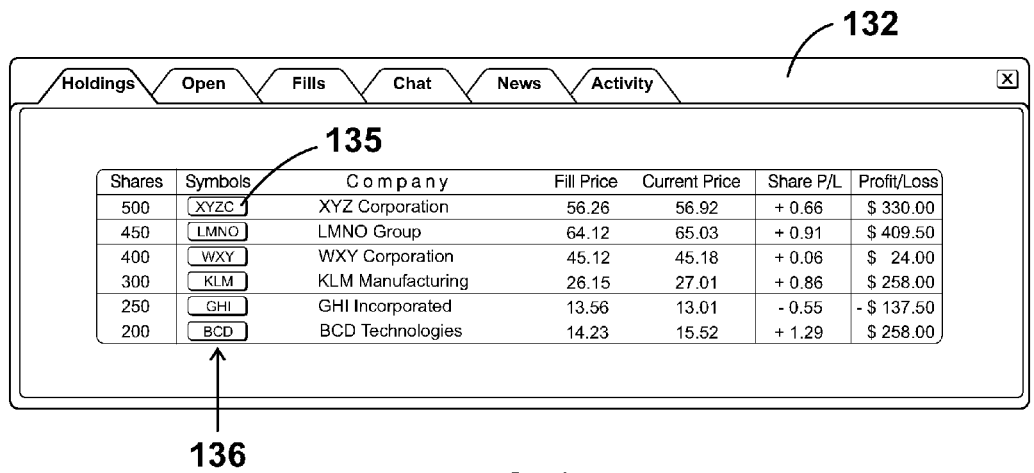
FIG. 14 shows a detailed view of a holdings tab chosen from FIG. 12 or 13, in greater detail.
Figure 15:
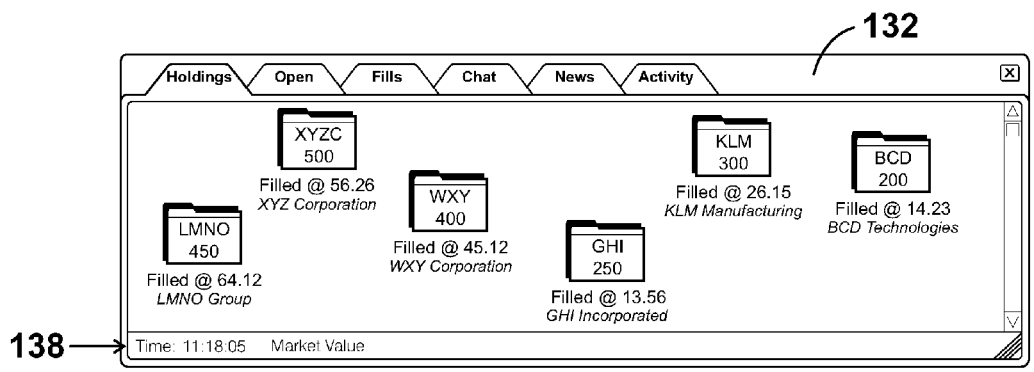
FIG. 15 shows much the same data as in FIG. 14, but in icon format.

A holdings tab from tab set 132 is shown in greater detail in FIGS. 14 and 15. In FIG. 14, the data is shown in tabular manner; in FIG. 15, it is shown with separate icons for each holding.

The significance is that an icon 135 under the symbols column 136 in the tabular format of FIG. 14 can be dragged into its associated grid for a sale or so as to be covered. Likewise, any of the icons shown in FIG. 15 can be dragged and dropped onto the respective grid.

Examination of FIG. 14 shows that 500 shares of XYZ Corporation are owned; that they were purchased at 56.26 and that the current price is 56.92, up 0.66, for a profit of 330.00. Dollars are shown, but other units might easily be used as well.

From FIG. 15, similar data is shown, but in somewhat less detail.

On the other hand, the icons shown in FIG. 15 may be colored so as to show the type of security or type of order that exists. For example, colors may be used to represent a short order, another color used to represent an option, or a margin purchase, or to indicate profit or loss on individual positions. Each icon may further have data associated with it, which would be revealed by holding a cursor over the icon. The status bar 138 may also display the data, as well as the current market price for the security, if elected.

FIG. 16 illustrates a market order entry tab 127, chosen from tab set 128. This is a form based representation; and it will be noted that there are buy, sell, and short buttons 140, 142, 144, respectively, which can be pressed so as to route an order to a given market. That market may be as shown at 146. Similarly, as can be particularly seen from FIGS. 12 and 13, a buy, sell, or short button 140, 142, or 144 can be dragged onto the grid 120, for example, for the order to be routed to the selected market—in this case, ISLD.

A similar tab is shown in FIG. 17, also selected from the tab set 128; but in this case, it is the limit order tab 148 which has been selected. A further button, the terms button 150, is shown under the limit order tab 148, which permits the trader to specify order execution terms.

Another tab, tab 152 from the tab set 128, is shown in FIG. 18. This is the stops tab or stop order entry tab.

This stops tab 152 has similar properties to that of tab 148, except that it is equipped with four other buttons 154, 156, 158, 160 which are labeled as stop buy, stop buy limit, stop loss, and stop loss limit buttons, respectively. An order input can be in terms of shares or an order reference number, so that a filled order can have a corresponding stop order associated with it. Stop orders trigger when a lot has traded at the stop price. When a stop limit order has been entered, a distinction may be shown between the limit price and the stop price, on the respective grid display.

Yet another tab in the tab set 128 is a change order tab 162, shown in FIG. 19. This tab is employed so as to change the parameters of an open order that is, an order that has already been placed. Here, the order reference number 166 is shown, so as to identify the order which is already in place. The new shares and new price are shown at 168 and 170, with the submit button 172 effecting the change order. Terms may be set by employing button 174.

Changes may be made, of course, in respect of the volume or the price, or even the route through which the order will be placed.

Figure 20:
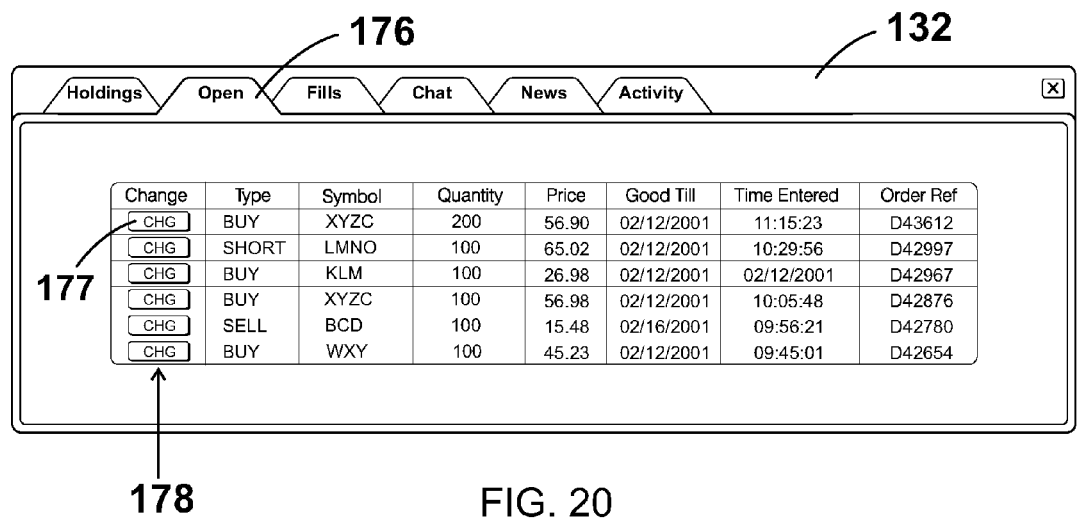
FIG. 20 shows a representation of an open order tab, chosen from FIG. 12 or 13.
Figure 21:
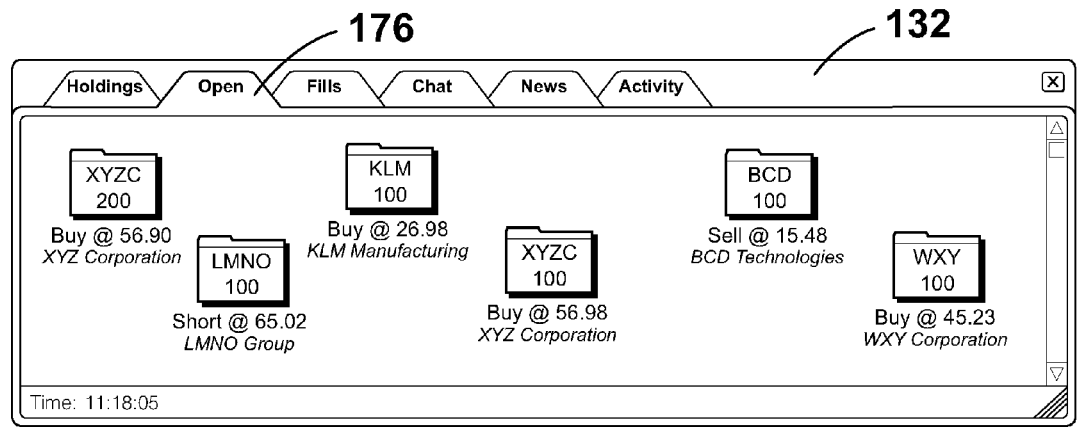
FIG. 21 shows much the same data as in FIG. 20, but in icon format.
Figures 22, 23:
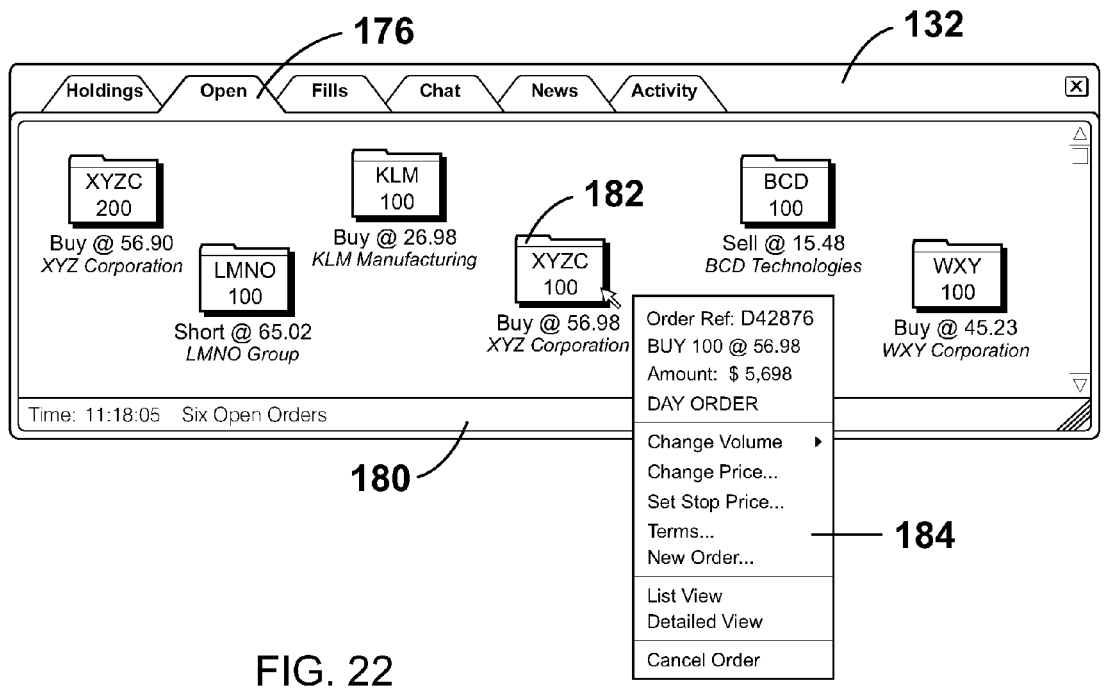
FIG. 22 is a view similar to FIG. 21, but showing a representation of a right click menu associated with an icon.
FIG. 23 shows a representation of a fill orders tab, chosen from FIG. 12 or 13.

FIG. 20, shows another tab from the tab set 132, namely the open tab 176. FIG. 21 shows similar data, except in icon form; and FIG. 22 shows the same data from FIG. 21 with a further drop-down right click menu.

As described above with respect to FIGS. 14 and 15, there is in this case a change column 178 shown in FIG. 20, which permits order parameters to be changed and which allows the order and the underlying security to be displayed on the grid of FIG. 10 or 11, for example. The change icon 177 can be dragged onto the grid to a specific price bin, so as to effect a price change or to submit the order to a different market.

Again, different colors may be employed to show the type of order buy, sell, short, etc.

The same data is shown in FIG. 21, but in icon form.

Referring to FIG. 22, the status bar 180 indicates that there are six open orders; and in this case, a right click on icon 182 has opened a drop down menu 184, which permits open order parameters and terms to be changed or cancelled.

Referring to FIG. 23, another tab 186 from the tab set 132 is shown. This tab 186 reveals data concerning orders that have been filled. Such orders may have been buy, sell, or short—see, for example, FIG. 20—and the data provided in FIG. 23 shows the price and time, and quantity, at which the order was filled or at least partially filled.

FIG. 24 shows further detail from the tab set 130, in this case being details concerning option orders or other derivatives that may have been placed. Thus, such option orders or other derivatives have their own dedicated order entry tab, with all of the necessary information being entered such as at 190 where a derivative being bought, has additional criteria being chosen as indicated. The submit button 192 will effect the transaction.

Obviously, the submit button 192 may be dragged to a suitable grid so as to enter the order, as will be evident from a review of FIG. 12, for example.

A further drop-down menu may be provided so as to select different market participants, for routing of the specific transaction being effected.

Figure 25:
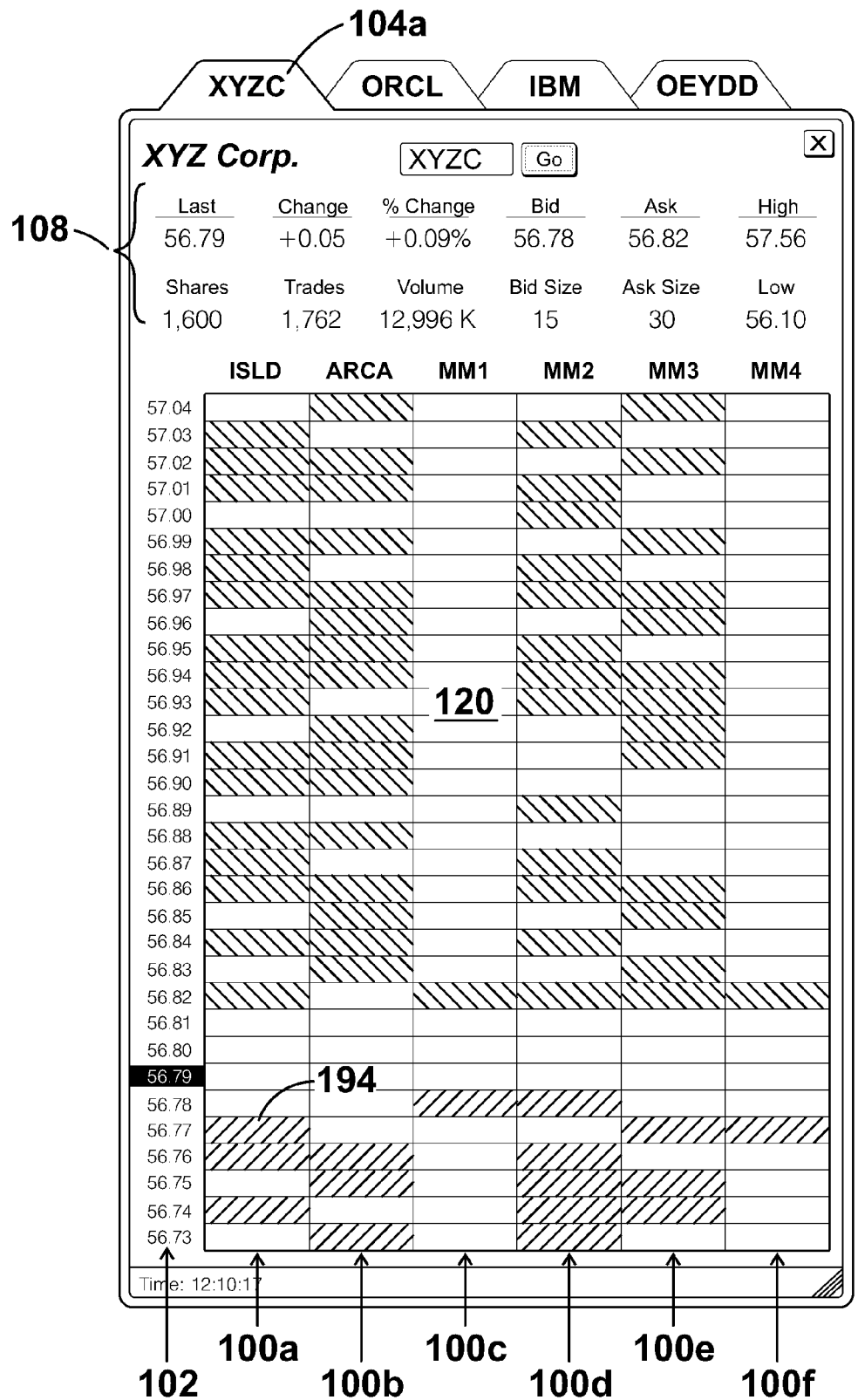
FIG. 25 is a view similar to FIG. 10, but showing a situation with falling prices on a fixed price axis.
Figure 26:
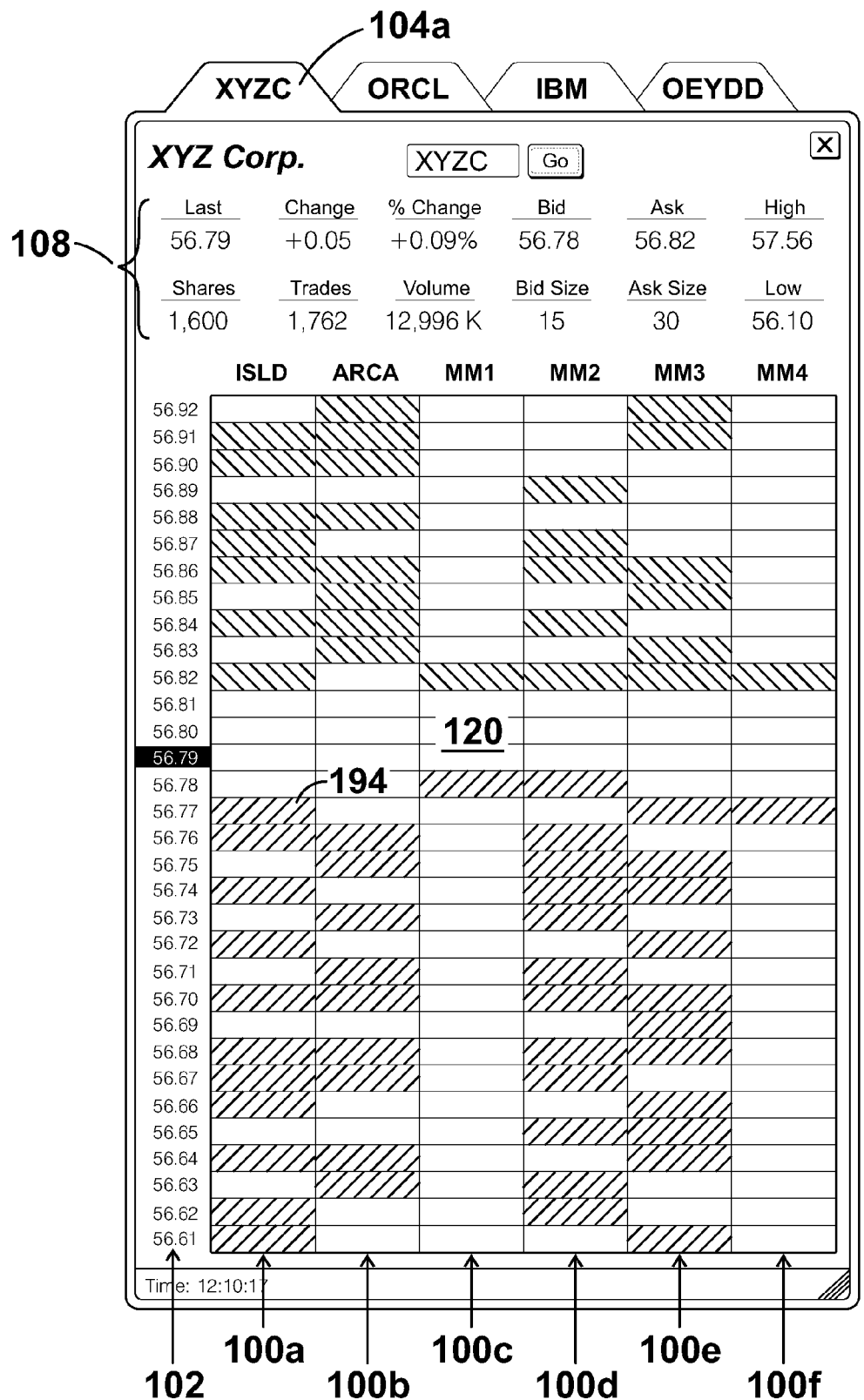
FIG. 26 shows similar data to that of FIG. 25, but with the falling price being centered on the price axis.

Turning now to a discussion of FIGS. 25 and 26, a typical representation is shown in the case of a falling market.

It will be noted that FIG. 25 is similar to FIG. 10. However, in FIG. 25, the price of XYZ Corp. has dropped from 56.92 to 56.79. As a result, the security is trading down some 13 rows from 56.92. The last trade of 56.79 is highlighted on the price axis 102. The bid and ask of the market participants have fallen to the lower portion of the grid 120, since the price axis is fixed for the 0.01 row increment. If the security trades at or below 56.73, the lowest visible row, the price axis 102 will adjust the displayed price range down to maintain the trading activity in the visible portion of the grid.

The price axis 102 may adjust to trading activity automatically or manually. In automatic mode, it will maintain trading activity substantially centered in the middle of the grid by adjusting the displayed price range of the price axis continuously. A smoothing function may be used to prevent the price axis from adjusting itself too quickly in an active market. In manual mode, the user resets the trading activity to the center of the price axis 102. A buy order cell—such as cell 200 on FIG. 28—on a fixed price axis 102 will remain stationary as the trading activity moves towards it and eventually fills the order.

When a security is first shown on the grid 120, the user may elect to position the price axis 102 according to the session high, low, opening, or last trade prices. Alternatively, the price axis 102 can be centered to the closing price of the previous session, or a technical indicator such as the 50 day moving average.

FIG. 26 is similar to FIG. 25, except that the price axis 102 has been centered on the grid 120. A buy order cell 200 on FIG. 28 on a centered price axis will appear to climb higher towards the trading activity as the price of the security falls, until eventually the order is filled. A right click menu on the price axis 102 can select how the price axis reacts to price variations in the security.

Figure 27:
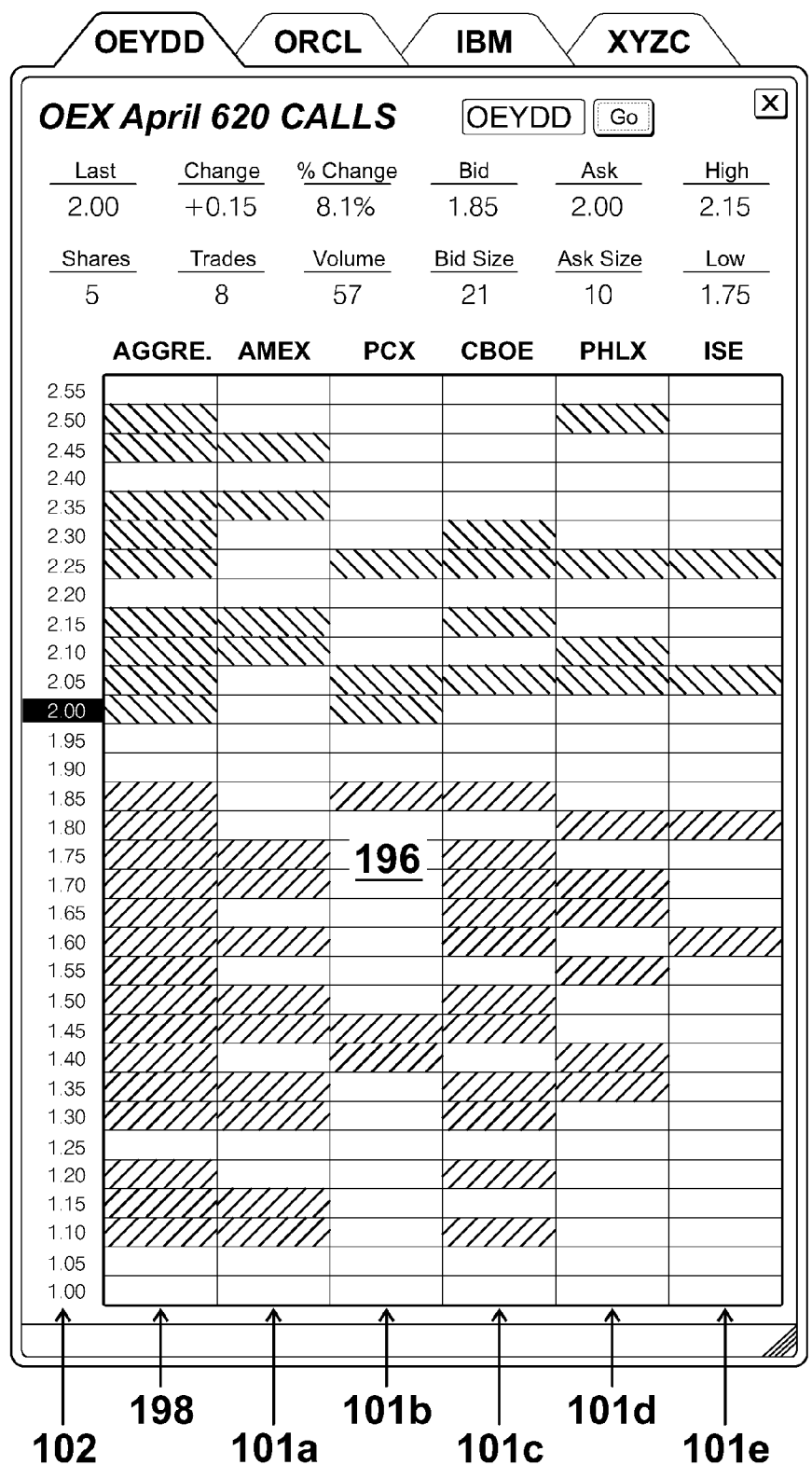
FIG. 27 is a representation of prices for an option series, with one column showing an aggregate price.

Turning now to FIG. 27, there is shown a grid representation in which an aggregate price column of an option series is illustrated. Here, the grid 196 shows an option series representation for a particular call option of an option eligible index.

In this case, the price axis 102 is in 0.05 increments as is suitable for an option priced under 3.00. There is also an aggregate column 198 which displays the aggregate quote from one or more market participants with all available buyer and seller prices and combined order size. Orders placed in the aggregate column may be routed automatically to the market that contains the best price or fastest executions.

Some users may not be interested in viewing quote activity for individual market participants, as shown in columns 101a . . . 100e, and may choose to view and enter orders only in the aggregate column 198. Options symbol are entered into the grid 196 directly, or via the options entry tab 188 (see FIG. 24).

Figure 28:
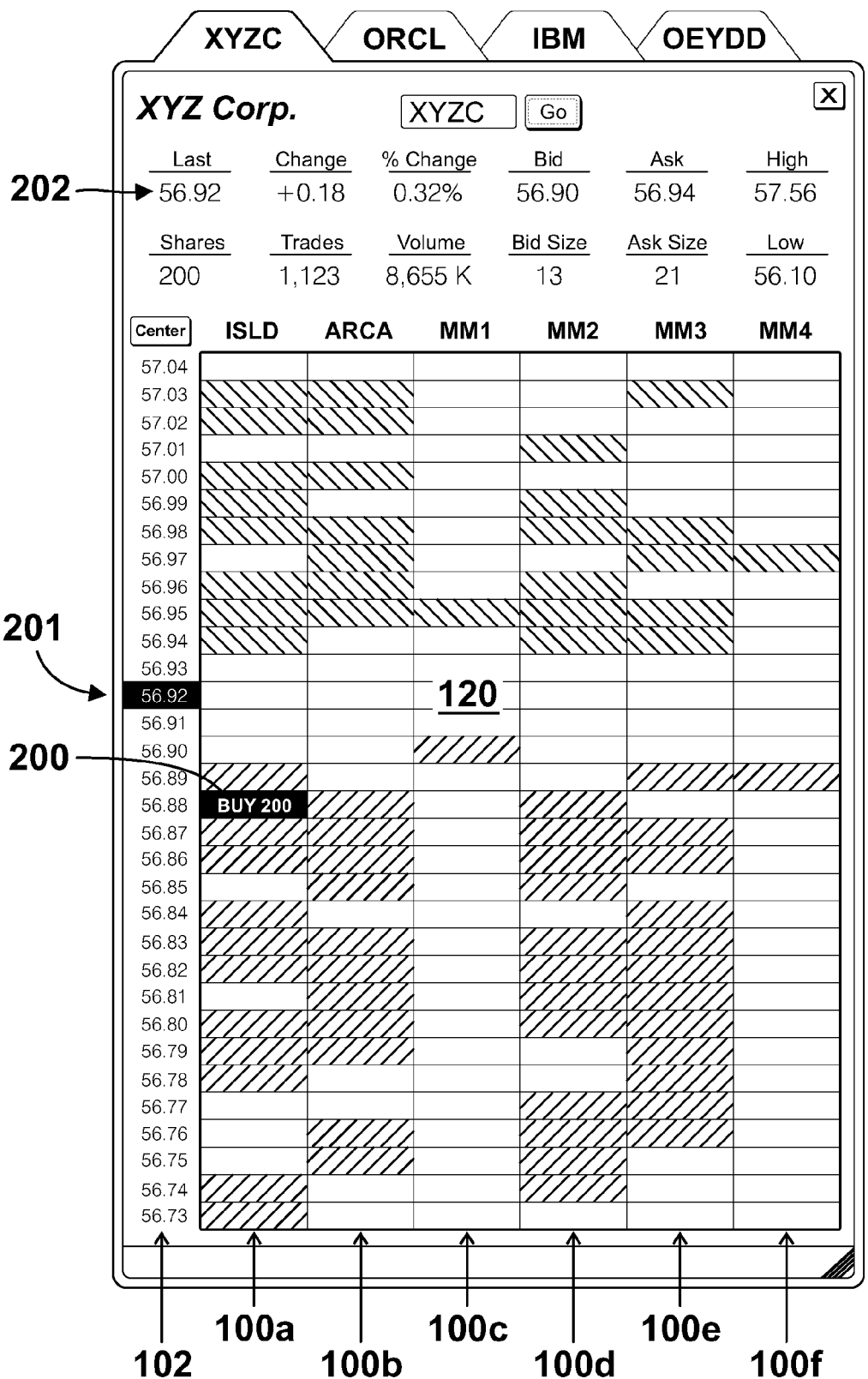
FIG. 28 shows a typical price data display having a limit buy order.

Turning now to FIG. 28, a representation of a limit buy order is shown. The data shown on the grid 120 of FIG. 28 are the same as those shown in FIG. 10.

FIG. 28 demonstrates how a buy order cell 200 is located on the grid 120. The buy order for 200 shares of XYZC is a limit order placed at 56.88. This is 0.04 below the last trade price on XYZC, as shown at 202, 201. The market where the order is placed is Island ECN, as noted in the header for column 100a. To distinguish an order from the background quotes, a contrasting texture or color is used. The text inside the order also helps identify the type of order and shares being sold. In a similar manner, a limit sell order may be placed in a suitable market and in the upper portion of the grid representing seller quotes.

The order is placed on the grid 120 in a number of ways. First, the order will be entered automatically into a suitable grid if it is submitted from an order entry tab such as that shown in FIG. 17. Second, the order can be entered by dragging and dropping from the Position Guide icon 134, which recommends the amount of shares to purchase as well. Third, the order can be dragged and dropped from the holdings tab, as seen in FIGS. 14 and 15, or a similar status tab.

The orders can be posted to the grid direct from the appropriate entry method, either through the order entry tabs or the Position Guide, with validation to follow; or the orders can be posted after validation from the exchange or market. In the latter case, a delay may occur between the time the order is entered and the time it is validated. In this case, the buy order cell 200 may indicate a non-valid status until the backend system validates the order.

Figure 29:
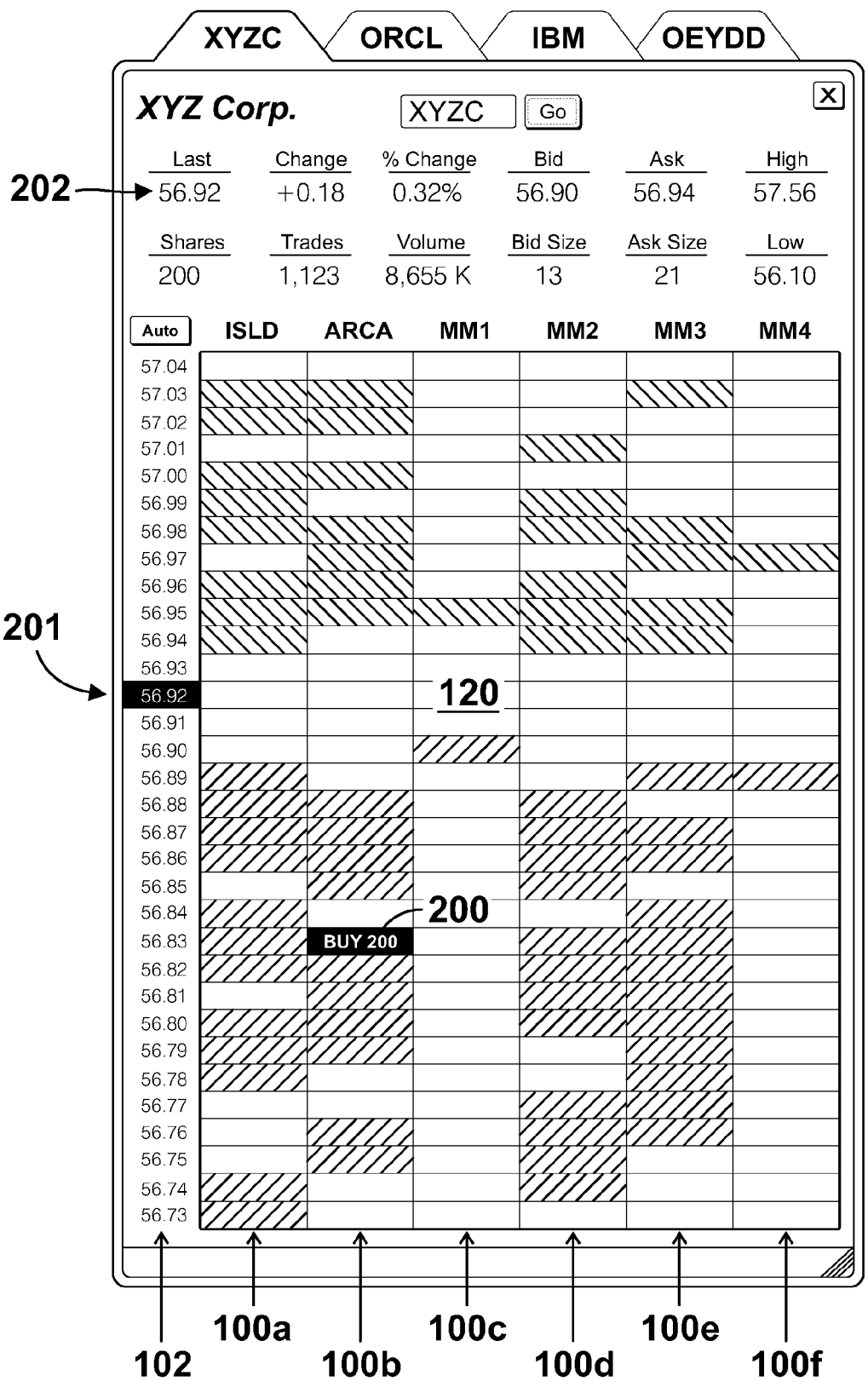
FIG. 29 is similar to FIG. 28 with the limit buy order having been moved to another market participant.

FIG. 29 is similar to FIG. 28, except in this case the buy order cell 200 has been routed from one market to a different market at a different price. The original order has been routed to Archipelago ECN in column 100b, and the buy price has been reduced to 56.83. This apparent order change occurs when a selected buy order cell 200 is dragged or routed by the computer's pointing device, such as a mouse or a keyboard cursor arrow, such that the selected buy order cell 200 moves left, right, up, or down, along the grid. The practical effect, from an exchange or market makers perspective, may be to cancel one order, and enter another in a different market, or to change (CFO) one open order to reflect an adjusted price, volume, or other order parameters or terms. This routing of orders between markets, and changing prices graphically, is at the heart of the grid's function.

Figure 30:
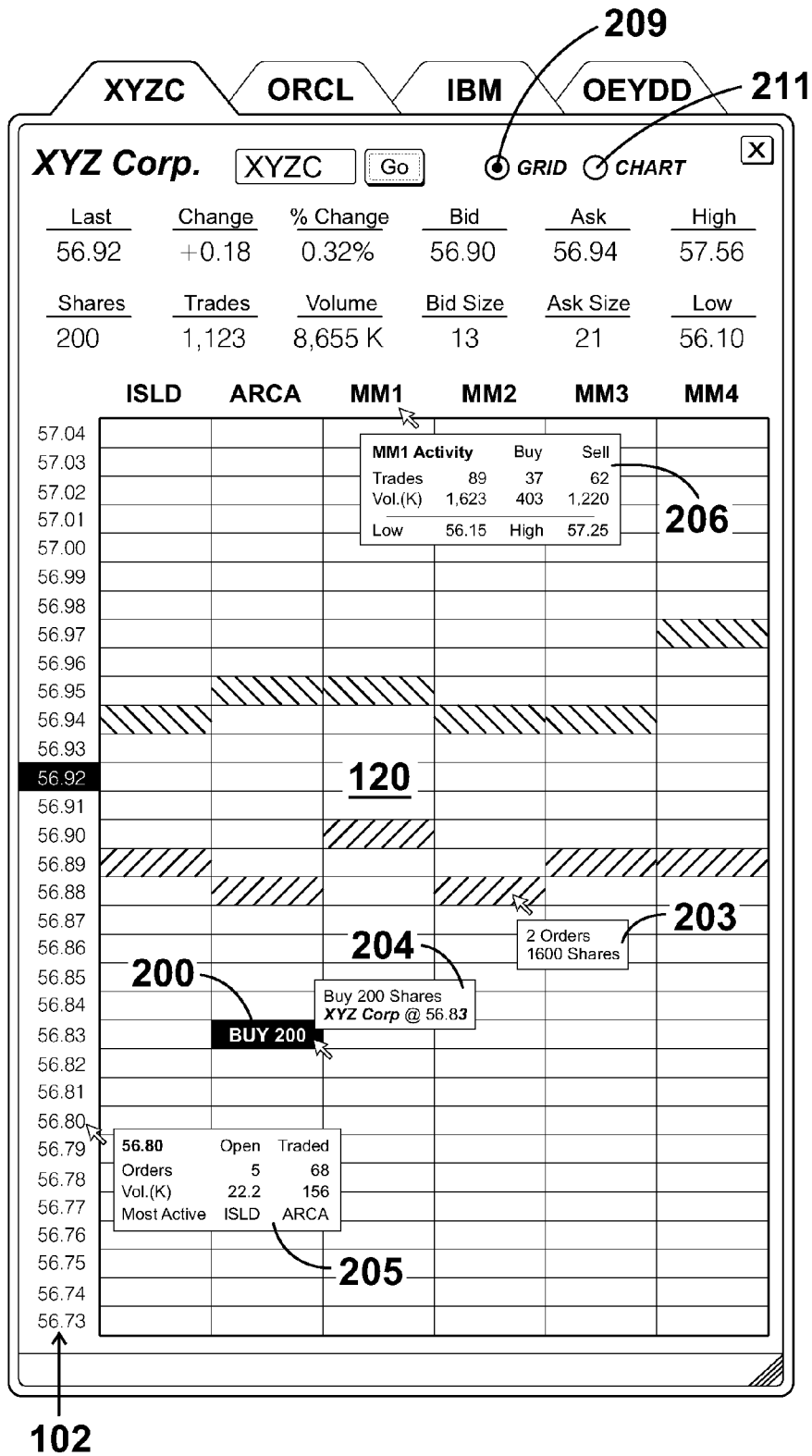
FIG. 30 shows data from FIG. 29, but only displaying bid and ask quotes for each active market and with a limit buy order being shown.

FIG. 30 is similar to FIG. 10. However, in FIG. 30, only the bid and ask for each market participant is displayed. The buy order cell 200 from FIG. 29 remains visible. Some users may prefer this view, selected from the grid preferences menu, as it removes movement outside the market and makes open orders stand out.

FIG. 30 also shows an example of a mouse over effect showing a price axis popup box 205, a quote popup box 203, order popup box 204, and a market participant popup box 206, so as to result in the display of other relevant information. At the top of this view, a radio button 209,211 shows that the tab page can toggle between a grid display of XYZC and a chart of the security.

Figure 31:
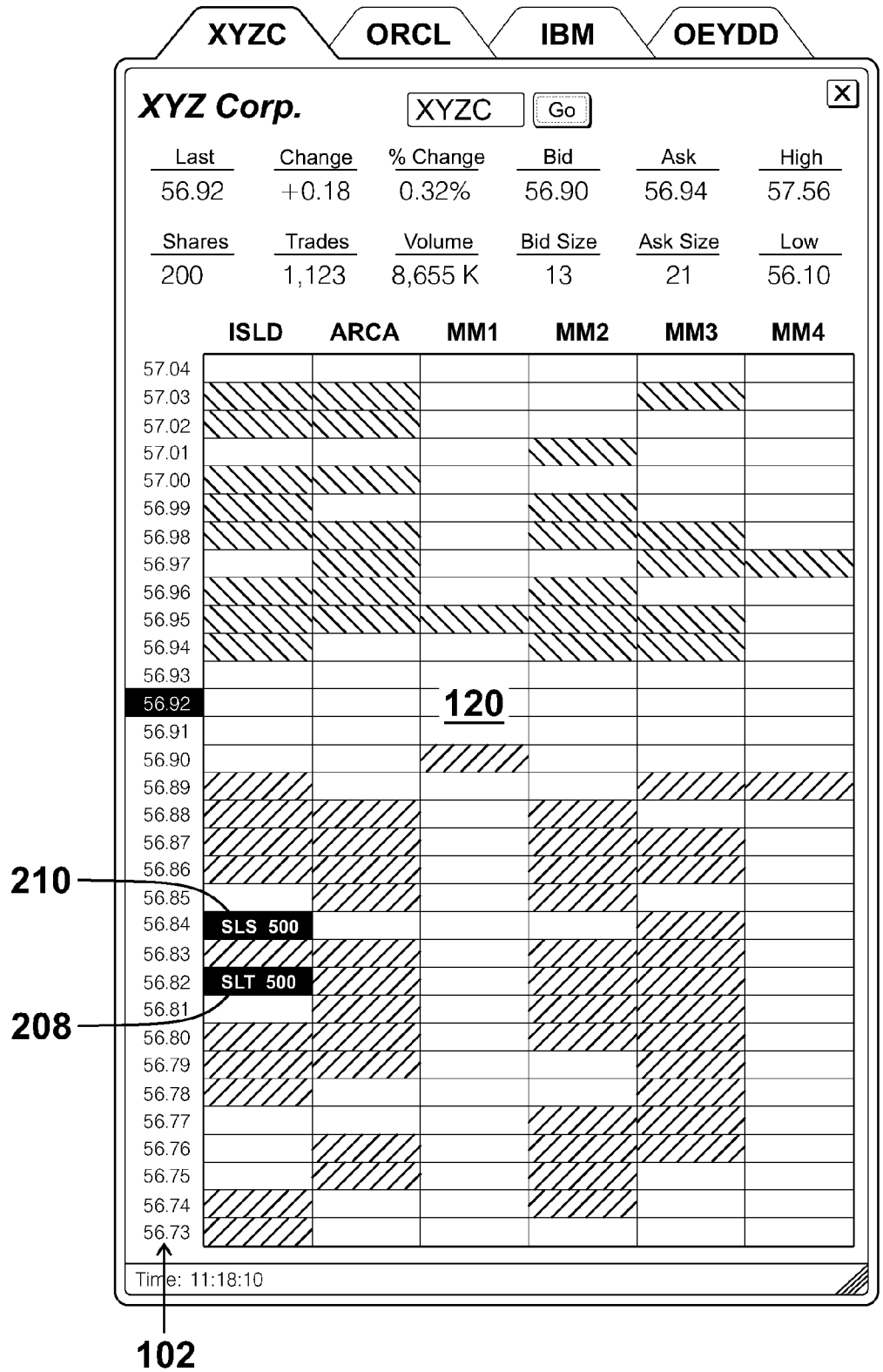
FIG. 31 is a similar view to that of FIG. 29, but showing a stop loss limit order.

FIG. 31 shows a stop loss limit order 208 and 210. In this example, the stop price 208 is 56.82. When one lot of the security has traded at or below the stop price, the associated limit sell order 210 becomes active. Both parameters, the stop price and the limit sell price, can be changed by dragging its associated cell. Text inside the order cells help identify the order type, quantity, and function.

Figure 32:
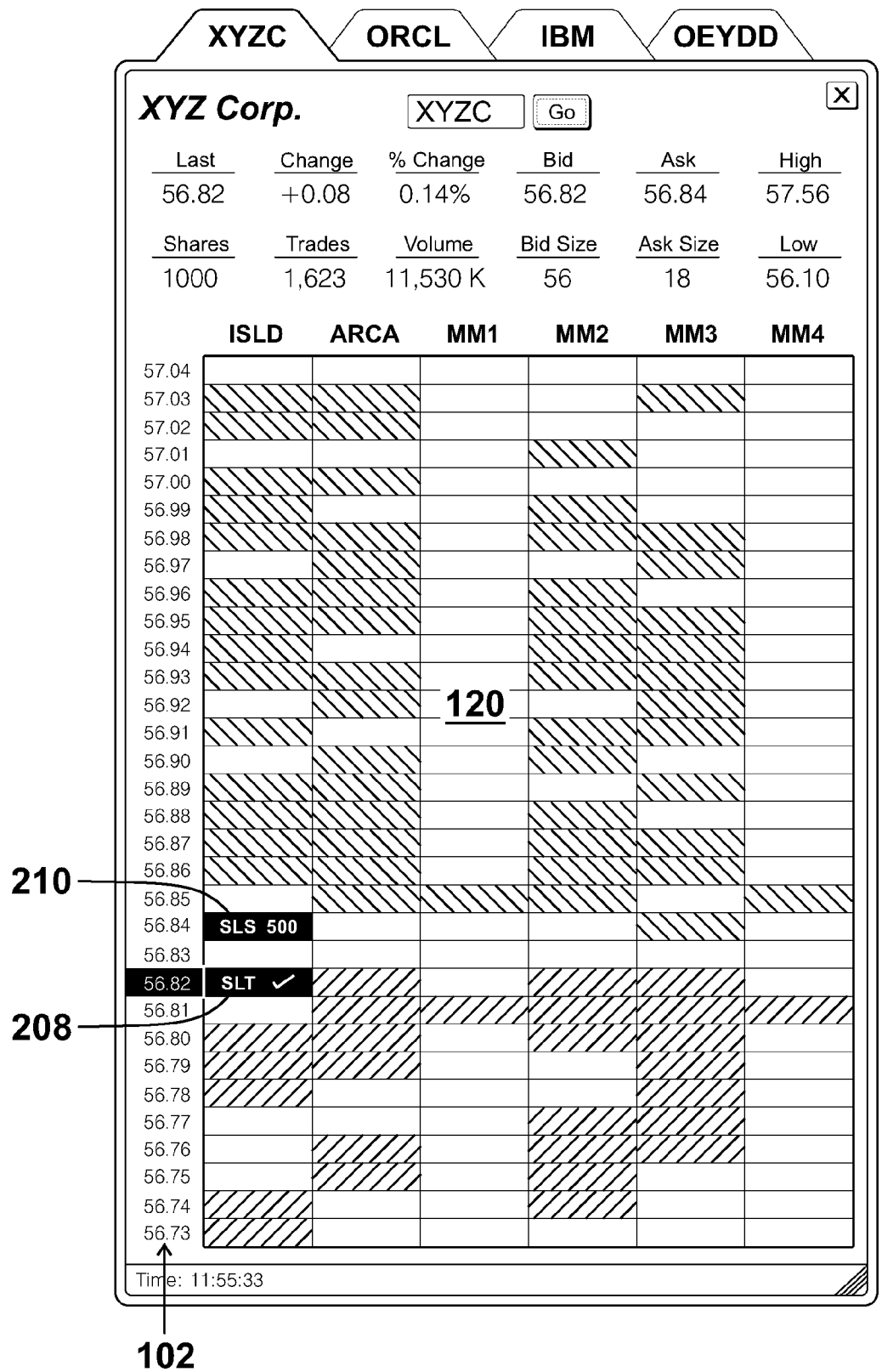
FIG. 32 shows a display of a stop loss limit order after the stop price has been triggered and the limit sell order is in effect.

FIG. 32 is a representation of FIG. 31, once the stop price has been reached and triggered. In this view, the stop price 208 of 56.82 remains on the grid 120 to show that the stop price has been triggered and the limit sell order 210 is now an open order. The limit price may be changed while the order is open. In this manner, more complex order types may be displayed.

Referring now to FIG. 3, similar data to that which is shown on FIGS. 28, 29, and 31, is shown. However, in this case, an icon area 301 is included at the right of the grid, showing the status of orders or holdings that are related to XYZ Corporation. The icon area 301 may be considered to be a parking area, in that orders are parked in order that the trader may drag them onto or off the grid 303. One advantage of the icon area 301 is that an order can be dragged off the grid 303, even though the grid may have been cancelled, and held in the icon area 301 so that it can be dragged back onto the grid later as a new order, without having to set up the trade all over again.

A further feature of the icon area 301 is that multiple orders with respect to the same security may be established. Here, it is seen that there is an intention to buy 200 shares of XYZ Corporation at 56.88, shown at cell buy order 200 just as it is shown in FIG. 28. There is also an intent to sell 500 shares of XYZ Corporation through market participant MM2 at 56.98, as shown at cell 305. The status of those cells 200 and 305 are shown at icons 307 and 309, respectively, in the icon area 301. However, it will also be noted that icon 311 shows that previously there were 500 shares of XYZ Corporation purchased at 56.26.

An advantage of the icon area 301 is that icons relative to the specific security may be displayed, whereas the holdings tab as seen in FIGS. 14 and 15 contains information as to all securities which are under consideration. Thus, using a display set up as shown in FIG. 3, the trader can concentrate on a single security, if that is the trader's wish.

Figure 33:
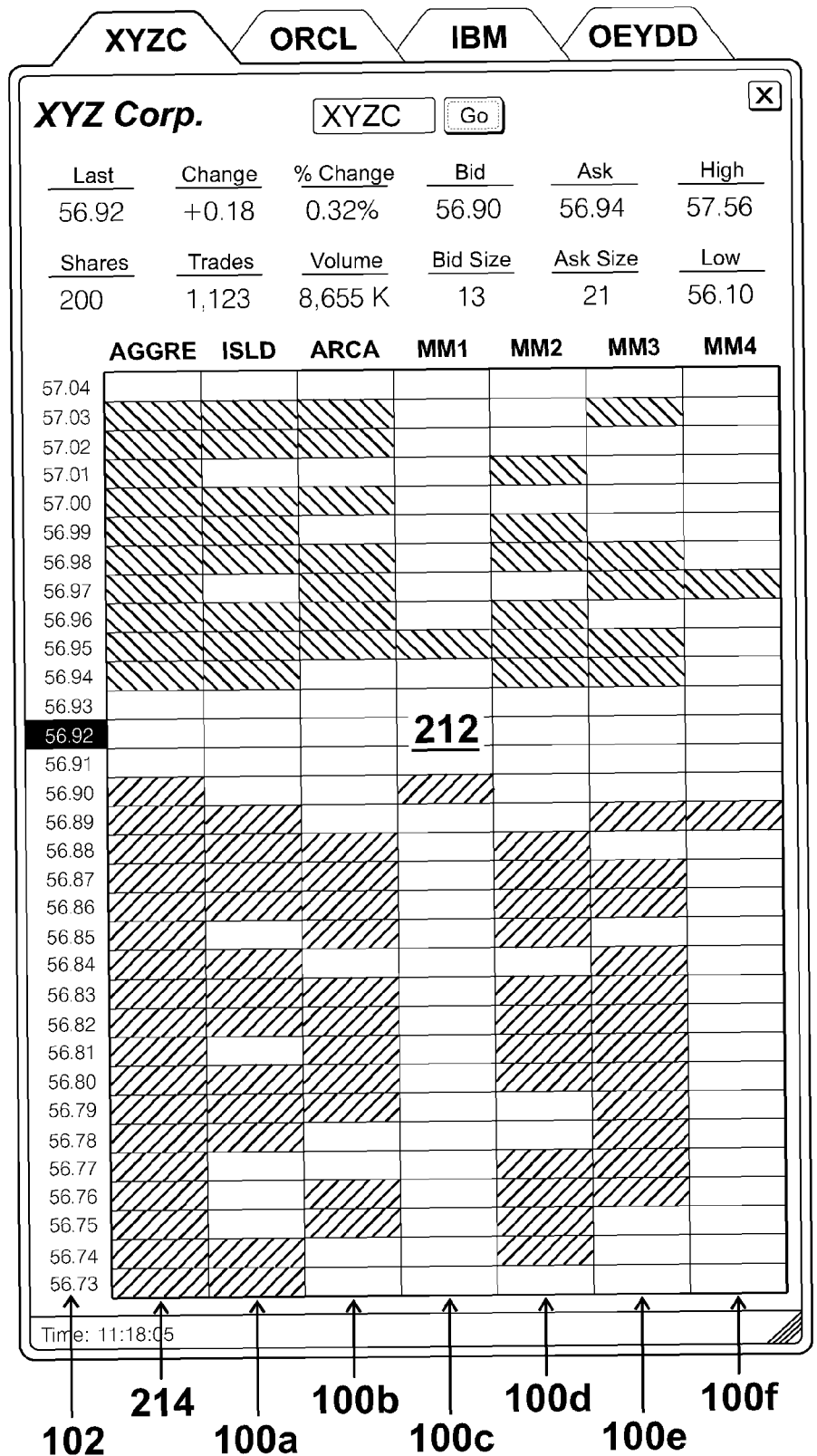
FIG. 33 shows similar data to that of FIG. 31, but with a column showing aggregate data being displayed.

FIG. 33 is somewhat similar to FIG. 27, and in this case it shows a grid 212 for a security XYZ Corp., which trades in multiple markets, being represented by an aggregate column 214. The aggregate column combines quotes and order data from multiple market participants 100a . . . 100f into a single column. The aggregate column 214 may represent, for example, aggregate quote data from those market participants available to the trader's brokerage firm to trade on and to submit orders to. The grid's price axis 102 may also be split into two price series to show different price ranges for the same security.

Figure 34:
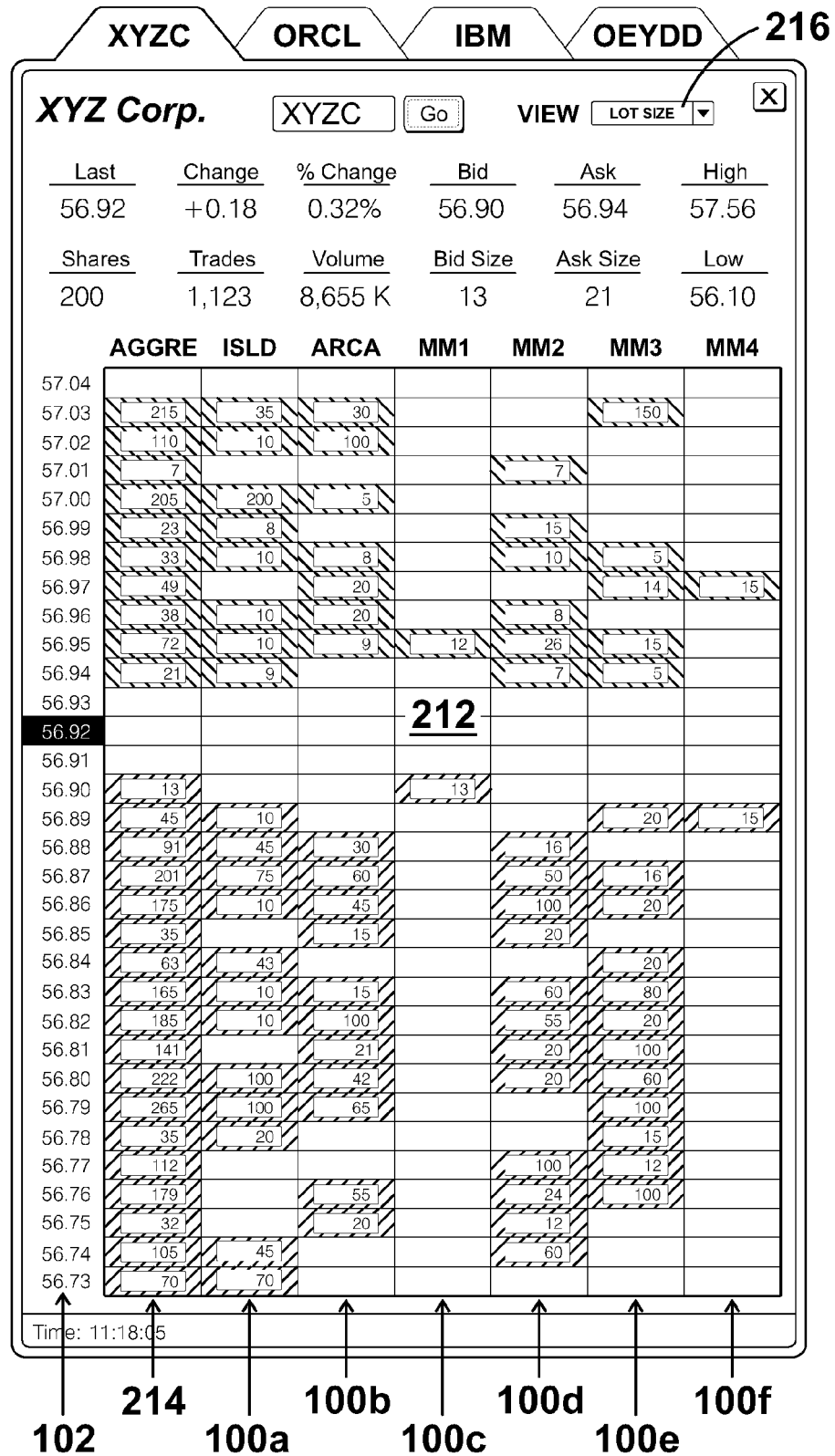
FIG. 34 shows the same data as FIG. 33, but with the lot size for each selected cell being shown.

FIG. 34 is a representation of FIG. 33, having the same data, but with each cell which contains a market quote having a text display of a cell property—in this case, the text label refers to the total lot size of the cell. A drop down menu 216 is presented at the top of the page tab for selecting the property. In the preferred embodiment, the text shown on each cell can be total lot size, number of orders, dollar value, share quantity open or share quantity traded inside the cell. Similarly, the total lot size, orders, trade value, or share quantity filled or executed at each cell can be shown over a period of time. In the latter case, the length of time specified may be from the beginning of the current session, during the past hour, or a user selected time interval. The aggregate column 214 may also contain text summary data. In addition to a text inside the cell, colors and color gradients can be used to display the same parameter or an alternative parameter of each cell or order.

Figure 35:
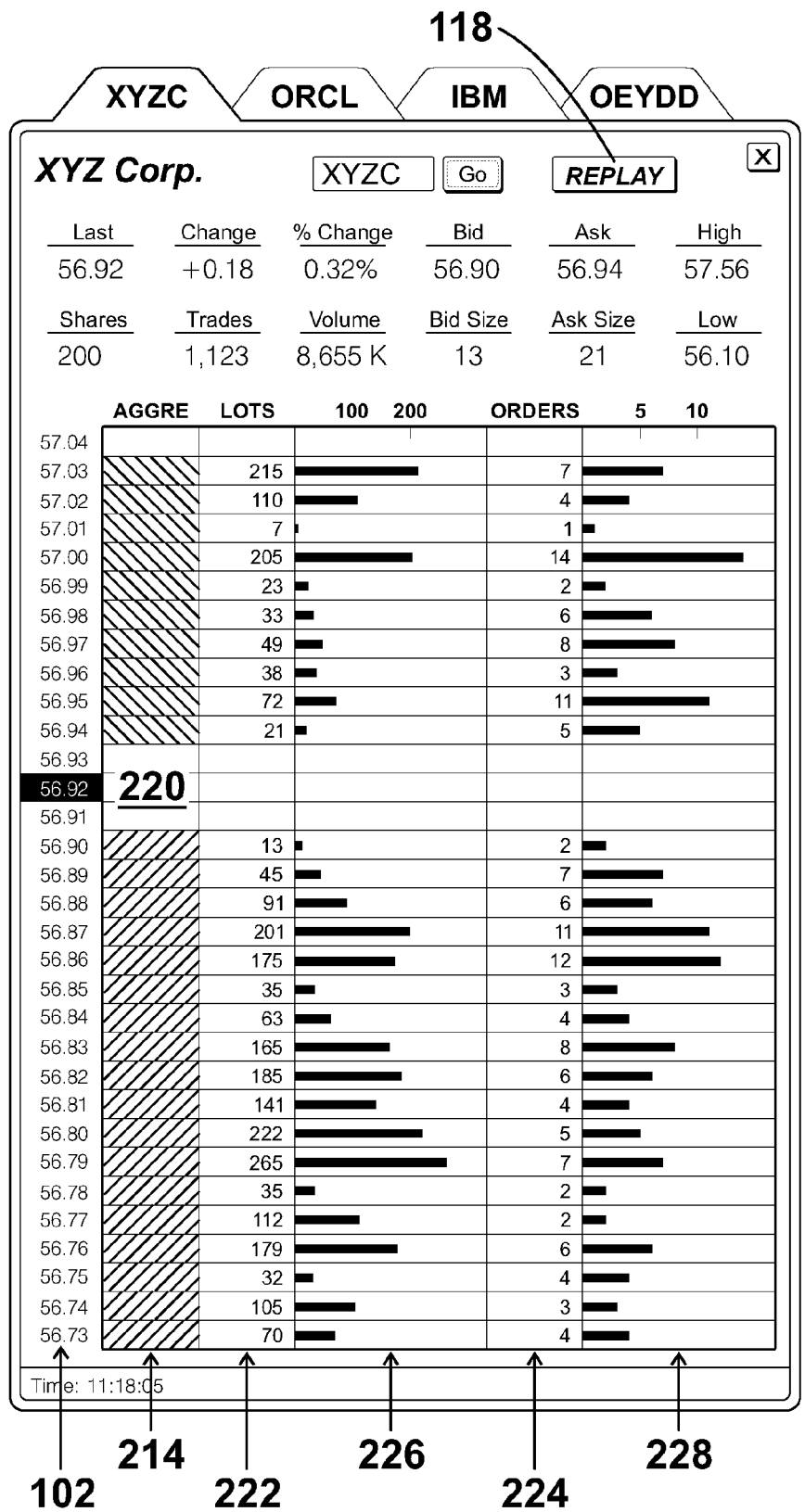
FIG. 35 shows data for the aggregate column only of FIG. 34, but with additional graphical representation of lot size and orders.

Turning now to FIG. 35, a grid 220 is shown, which uses the concept of the aggregate column 214 to show a one column view of one or more market participants. The remaining columns 222 and 224 are used to show lot size and order quantity for each price increment. A graphical representation of lot size and order quantity is shown next to the text data at 226 and 228, respectively. A replay button 118 is shown, which can animate historical data in a graphical presentation. A right click menu is available over the column name to allow the user to select a data display from specific markets rather than an aggregate representation. For example, the grid 220 and column 214 can represent data only from Island ECN and display the corresponding text 222, 224 and graphical representation 226, 228 of lot size and order quantity, respectively.

Figure 36:
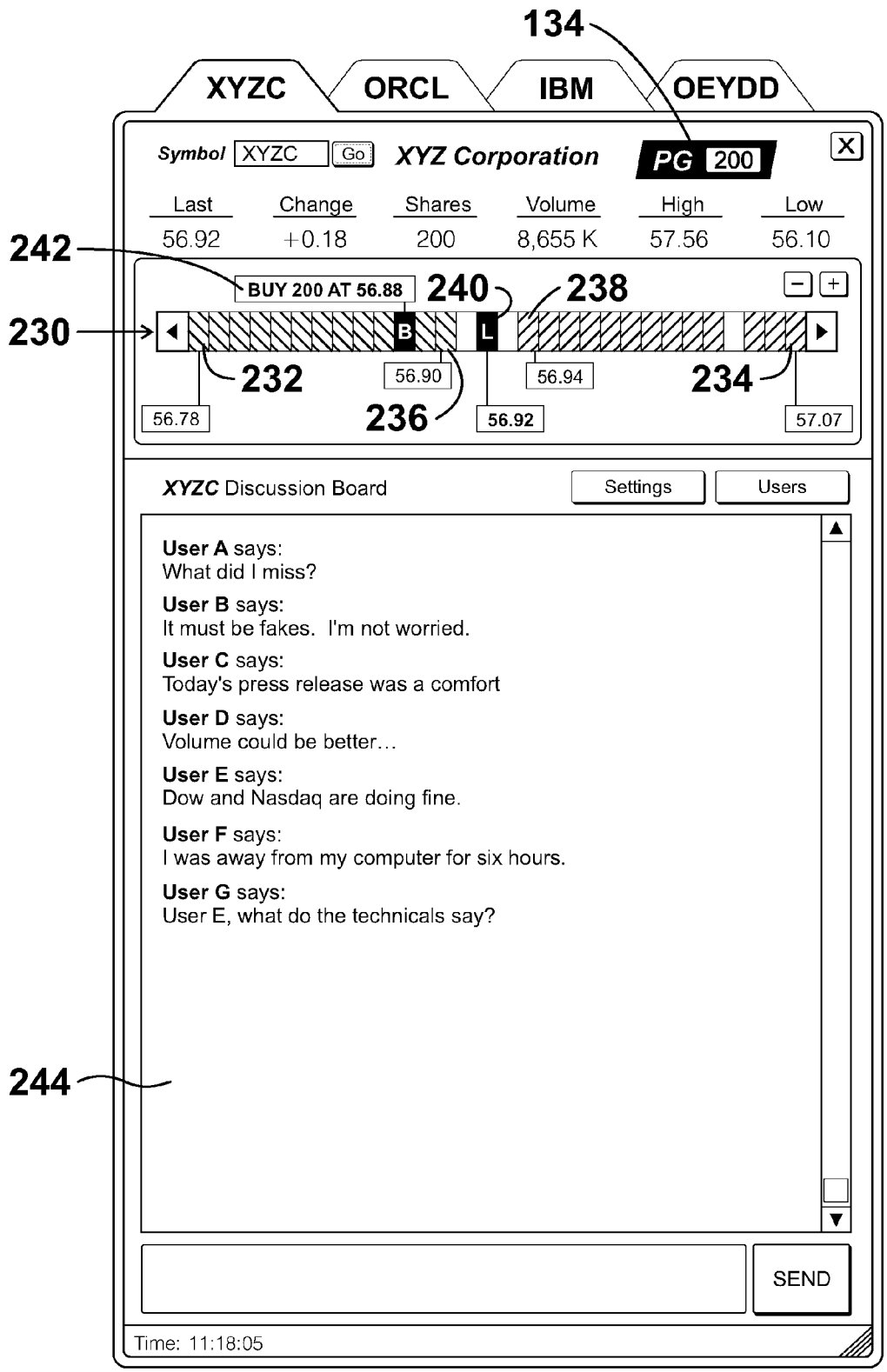
FIG. 36 shows the data from FIG. 35 being shown horizontally, together with a chat screen for a chat session which is occurring.

FIG. 36 shows the market column or aggregate column 214 of FIG. 35 rotated 90 degrees, and now presented horizontally at grid 230. Price increments run along the x-axis from left to right. The rightmost cell contains the highest price value. The size of each price bin may be increased to view a larger price range for the security. Direction buttons at each end of the grid 230 allow the grid's price axis to be scrolled left or right. The cell values at the endpoints 232, 234, the bid and ask 236 and 238, and the last trade 240, are all indicated and linked to their representative cell. Open orders are also shown, in this case at 242, above the grid 230.

A Position Guide icon 134 allows orders to be dragged and dropped onto any cell that is displayed on the grid 230. In this type of grid display, the bid is shown on the left, and the ask is shown on the right. There is less room to display text inside each cell in this implementation of the grid 230. As a result, buy orders 242, the last trade 240, or a sell order, may be represented by the single letters "A", "L", and "S" within each cell. These cell types may also be represented by specific colors as well.

Under the grid 230, a chat application 244 allows discussion of a selected security or topic. The integration of the chat application 244 on the same tab page allows a security to be monitored closely while a chat discussion is ongoing.

Figure 37:
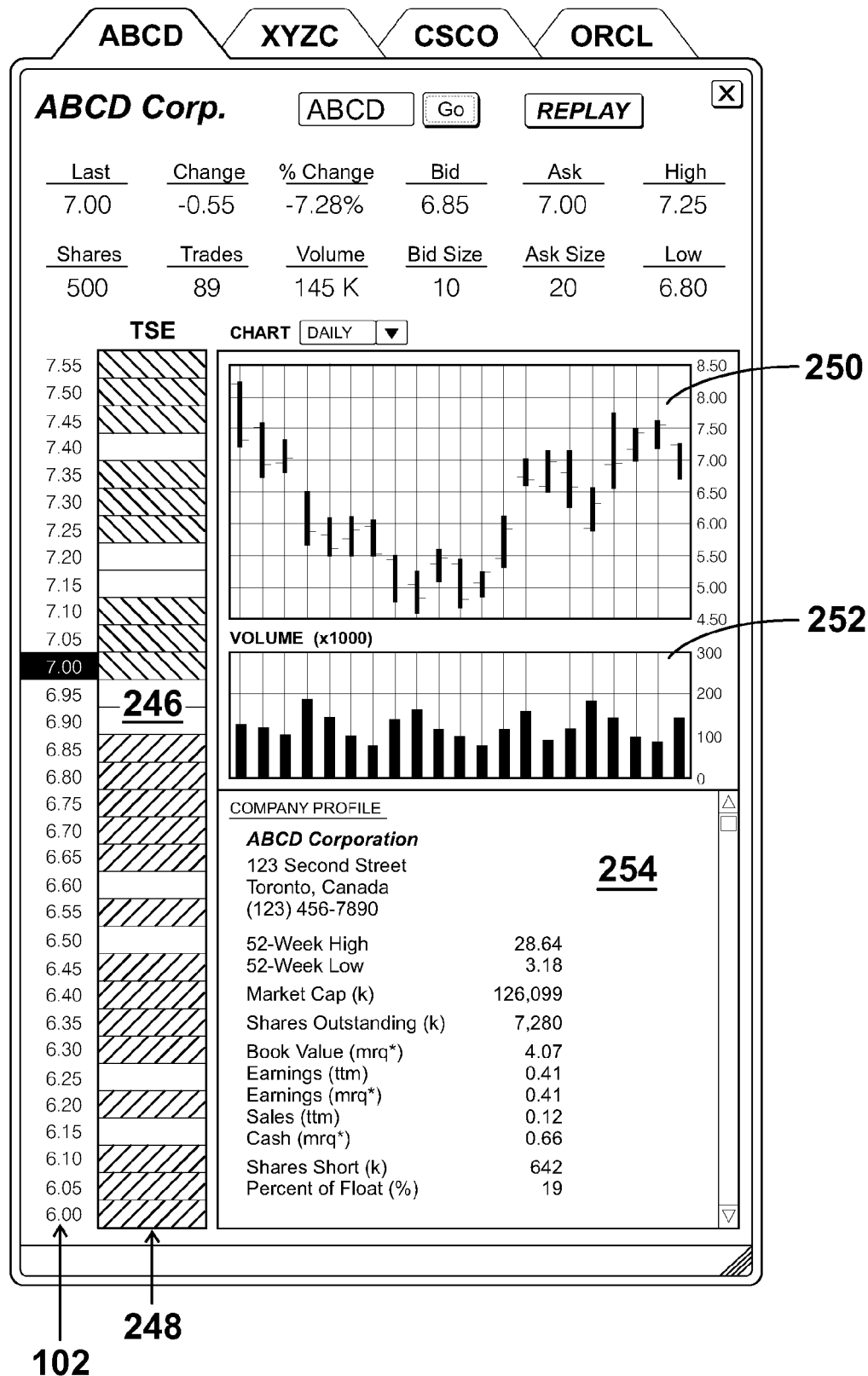
FIG. 37 provides information for a single column quote data together with associated company chart and profile information.

FIG. 37 shows a single column representation of a grid 246. Single column representations are appropriate whenever listed securities trade and are quoted in only one market such as the Toronto Stock Exchange. Those quotes are shown in column 248. The remaining space on the tab page is taken up by charts 250, 252 and a fundamental profile data 254 on the security. A drop down menu allows the chart type and time interval to be selected.

Figure 38:
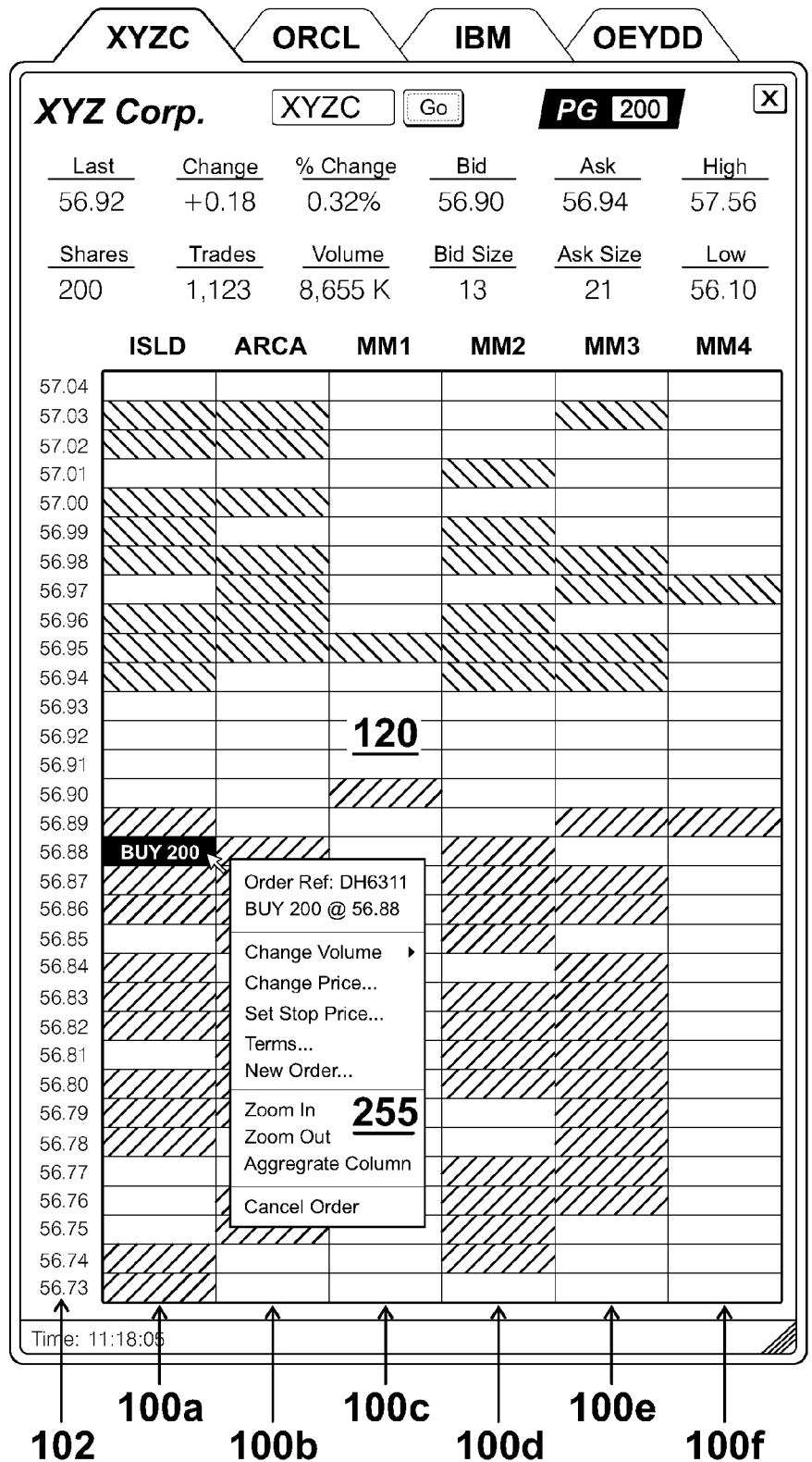
FIG. 38 shows the same data as in FIG. 28, but with a right click menu having been activated for a selected buy cell.

FIG. 38 is similar to FIG. 28, with a representation of a right click menu 255 on the buy order. The right-click menu 255 is location and context sensitive, and allows the user to view order statistics, change order parameters, adjust price bin size, set preferences, display an aggregate column, and undo a change. The right-click menu 255 also allow the user to access the Position Guide icon 134 and the replay feature on the grid interface.

FIG. 39 is a representation of the replay settings tab 256. The replay feature, accessible by the selecting replay button 118 provides a graphical playback of historical data and trading activity on a grid. If the historical time interval being reviewed is large, the playback speed can be accelerated. For example, if the historical interval being reviewed was originally 60 minutes long, as can be seen by comparing the times for the start and end of the interval to be displayed as set at 258 and 260, the user can adjust the playback time period to view this interval at 10 times normal speed which would result in the animation lasting six minutes. Similarly, the animation interval can be fixed for a defined time at 119, for example, 2 minutes, without regard to how long the original historical time interval was. The replay application, accessed through replay button 118, uses actual historical quote data to run the animation. The replay feature works only if there is available archived (historical) quote and order data from the user's computer or from any suitable server. If the historical data or necessary file on the security is not resident on the user's computer, it may be downloaded from a suitable server. The user can elect to store historical data locally through the record function, which will store data on the user's computer's memory or storage means.

FIG. 40 is a representation of the Position Guide settings panel 110. The Position Guide icon 134 recommends a quantity of each security to buy or short, based on input from the user on the amount of funds to be invested in each type of security, and the percentage of buying power or portfolio value available to be invested in any trade. Recommendations are rounded up or down to a standard lot size or contract size, as shown at display area 262. The recommended quantity to be purchased, sold, or shorted can be dragged and dropped from the Position Guide icon 134 (see FIG. 36 for example) to any cell on the grid, for the corresponding security. The Position Guide icon 134 is made available directly on the tab page of each grid by electing to show the Position Guide icon 134 on each tab page.

Advanced settings button 264 on the Position Guide settings panel 110 give access to timing tools so that trades that appear technically sound will bias the Position Guide to recommend a higher quantity of the security than trades that appear to have poor or no technical merit. The Position Guide allows the trader to enter limit orders with one or more parameters based on the Position Guide's recommendations.

Figure 41:
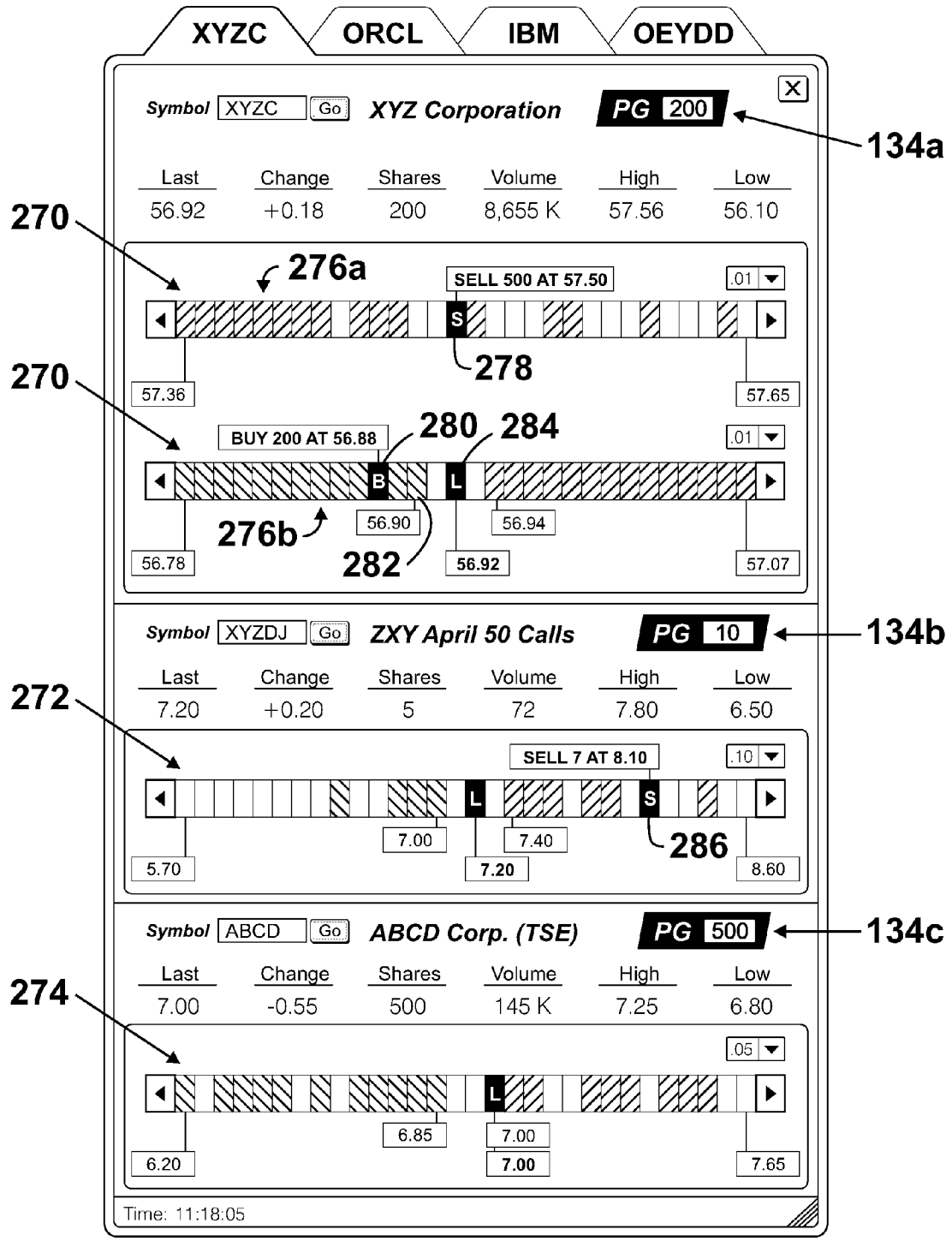
FIG. 41 is an optional display where data for three securities is shown being displayed horizontally.

FIG. 41 shows horizontal grids 270, 272, 274 for three securities. Each security has its own horizontal grid 270, 272, 274 and Position Guide icons 134a, 134b, 134c, respectively. The top security, XYZ Corp, has two grid rows 276a, 276b associated with it. Each functions independently and provides a display of the security in its own respective price range. Order 278 to sell at 57.50, order 280 to buy at 56.88, ask information, and last trade information 284 can be indicated on both related grids 276a, 276b simultaneously if the price range associated with each grid overlap. Each grid allows the price bin to be adjusted independently of the other.

The middle security is an option series. The Position Guide icon 134b recommendation is based on contracts, not shares. Options above 3.00 trade in MPV of 0.10 increments. There is a sell order 286 at 8.10.

The bottom security, ABCD Corp, is being monitored by the user, and has no open orders associated with it.

Turning now to FIG. 42, there is shown conventional NASDAQ Level II display 124, as used by day traders in the US equity markets. Time and sales information is on the right side of the display at 290. Since the grid representation of trading and quote activity differs from the NASDAQ Level II view, traders new to the grid view may prefer to additionally monitor securities with NASDAQ Level II displays. To accommodate this need, the grid area of the tab pages can switch between NASDAQ Level II views and grid-based views of the trading activity.

FIG. 43 shows a representation of the special terms setting dialog box 300. Special terms dictate how the order must be filled. Setting special terms is a common feature of trading applications. Special terms for an open order may be accessed and changed from the right-click menu of an order cell on any grid, as shown at 255 in FIG. 38.

Figure 44:
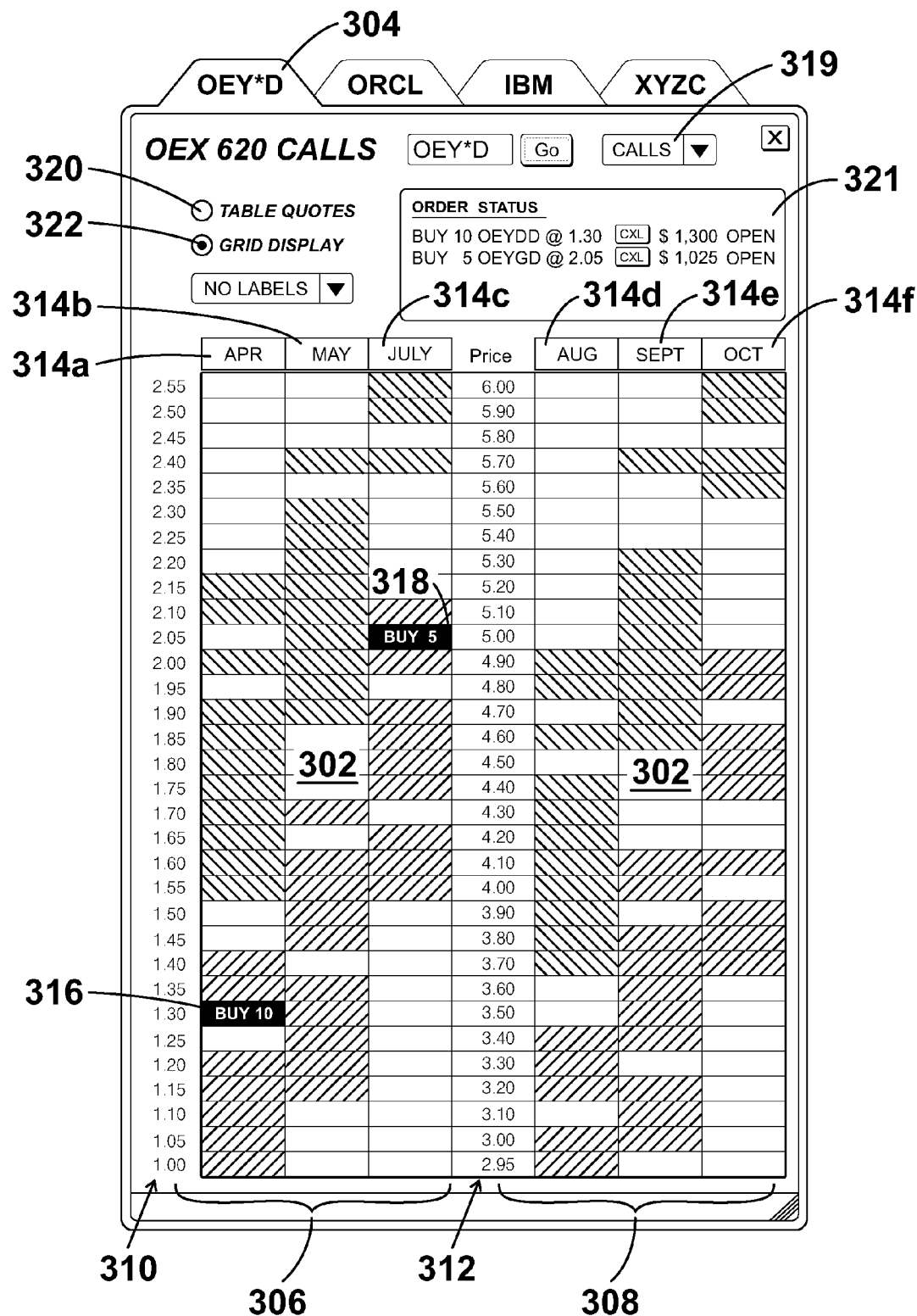
FIG. 44 shows a representation of an option chain for options concerning a particular security.

FIG. 44 shows a representation of an option chain on a grid 302. The tab name OEY*D, shown at 304, indicates an option chain. The grid arranges the data associated with the option chain to provide a representative display. There are two grid sections 306, 308, each with their associated price axis 310, 312, respectively. Bid and Ask prices are displayed for various months, in columns 314a . . . 314f, at different price levels. Two buy orders 316, 318 are indicated. The first buy order 316 is to buy 10 contracts of the OEX April 620 calls at 1.30. The second buy order 318 is to buy 5 contracts of the OEX July 620 calls at 2.05.

The grid drop down menu 319 allows data for puts, call, or both classes to be displayed. An order status area 321 allows the user to monitor the status of the open options orders. The option order prices can be changed, by dragging the order cell up or down its respective column. The radio buttons 320, 322 allow the option quote data to be displayed in a table style view or on the grid 302. Standard preferences may be applied such as showing contract size in each cell, as a text label. Options data may be filtered to display only the bid and ask of each month to reduce the level of detail. Visual and auditory alarms or notifications can be set to warn the user of a change of status or trading activity.

Each column contains aggregate data combined from all available options markets. However, a single market, such as the CBOE, may be viewed on the grid 302 as well.

Figure 45:
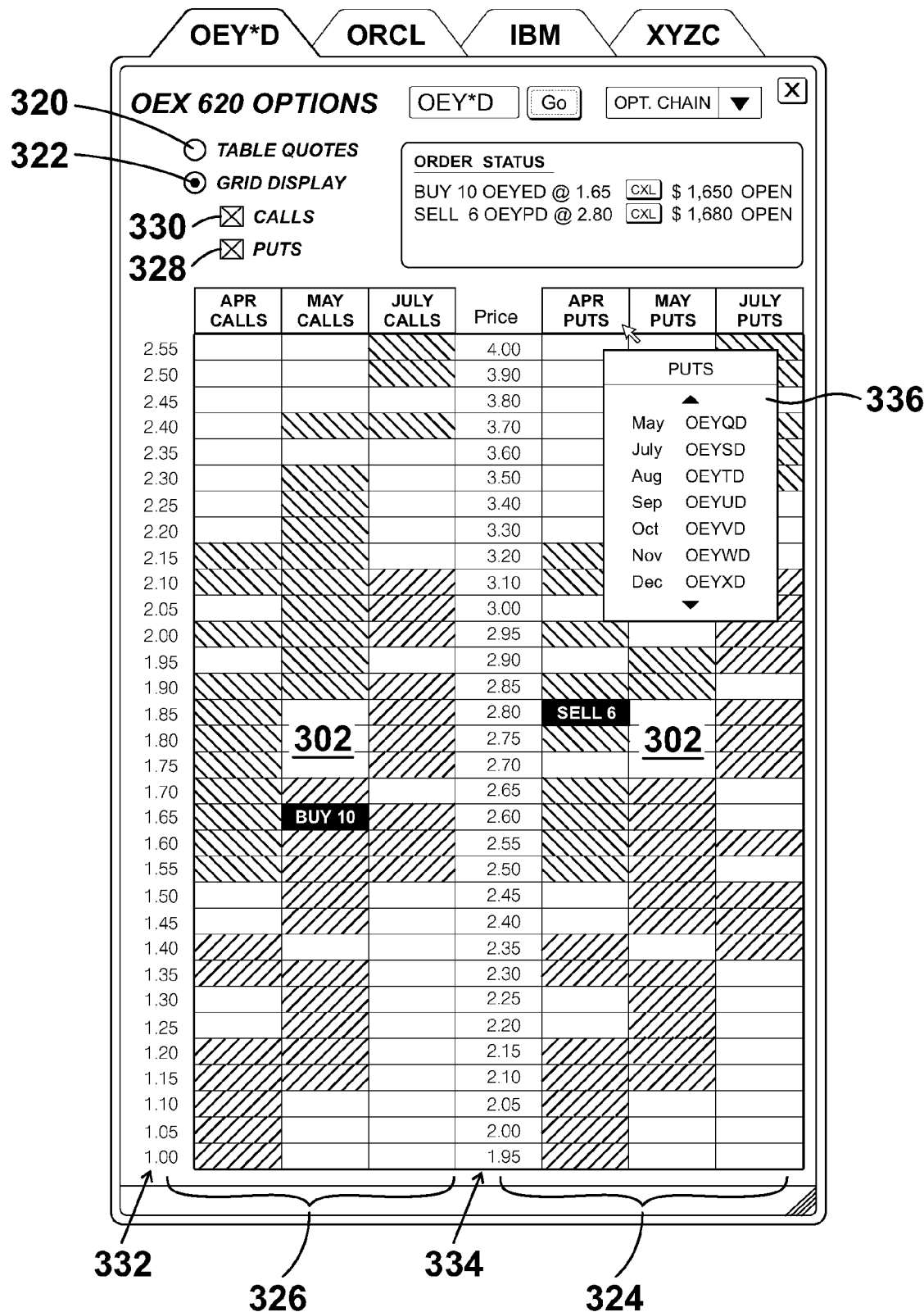
FIG. 45 is an alternative showing a data similar to FIG. 44, with a right click menu of column display choices being shown for displayed put data.

FIG. 45 shows an alternative representation of the option chain of FIG. 44. Both Puts 324 and Calls 326 grid sections are displayed in this view. The selection of which class to display is via the put and call check boxes 328, 330 under the grid display radio button 322. The price axes 332, 334 are independent of each other, to optimize the display of relevant quote and order data.

Changes can be made to the initial layout of the option chain. For example, the month displayed in each put and call column is selected via a right-click selection on the column name, as shown at 336.

Figure 46:
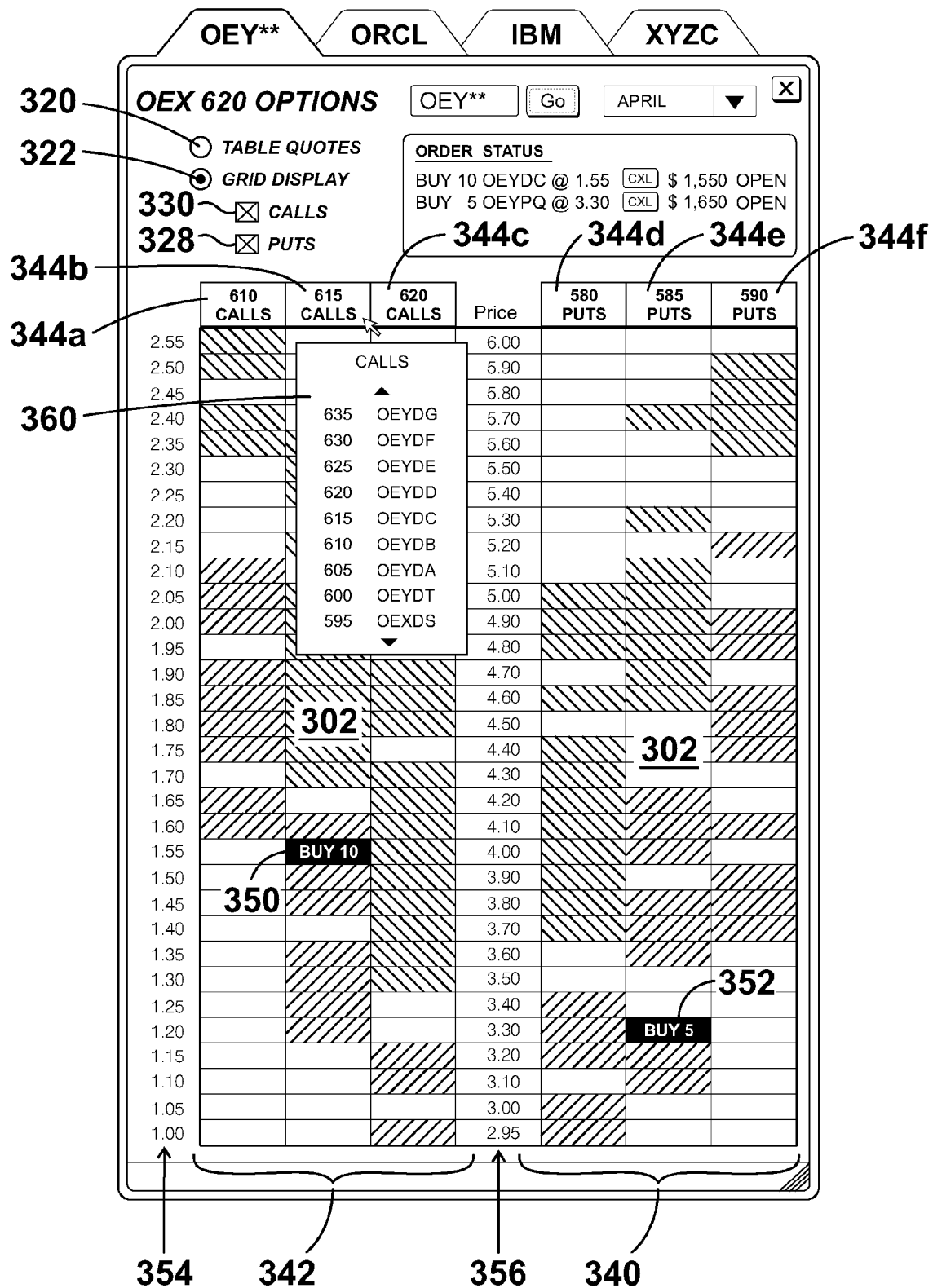
FIG. 46 is an alternative showing a data similar to FIG. 44, with a right click menu of column display choices being shown for displayed call data.

FIG. 46 shows yet another alternative representation of the option chain of FIG. 44. Both Puts and Calls grid sections are displayed in this view at 340 and 342, respectively. Each column 344a . . . 344f represents a different strike price for the month of April. Two limit buy orders 350, 352 are indicated: the first buy order 350 is for 10 contracts of the OEX April 615 calls at 1.55; the second buy order 352 is for 5 contracts of the OEX April 585 puts at 3.30. The price axes 354, 356 for each option class are independent of each other. A right-click on the column heading allows the strike price to be changed, as shown at 360.

Figure 47:
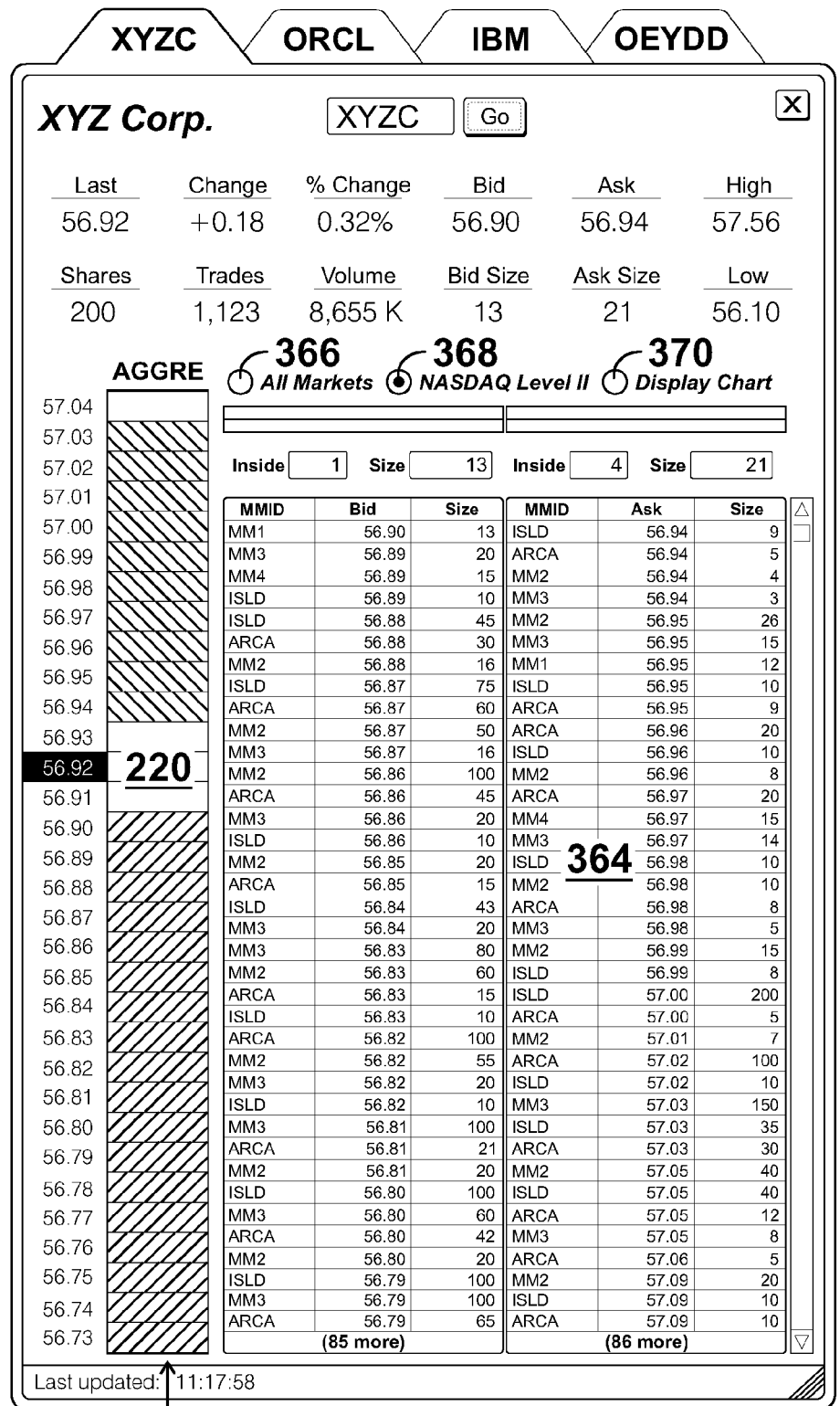
FIG. 47 shows data similar to that of FIG. 35, together with NASDAQ Level II data.

FIG. 47 is a representation of an aggregate grid column 214 of quote data and a corresponding NASDAQ Level II type display 364. Orders are entered or adjusted on the aggregate column 214 according to market developments reflected in the Level II type display 364. Although one grid column 214 is displayed to represent the aggregate data, the user may elect to show a second grid column to monitor a preferred market maker, exchange, ECN, or market participant as referred to herein.

The radio buttons 366, 368, 370 shown in FIG. 47 allow the trader to alternate views from a multiple column grid, for example, as shown in FIG. 10, to a split grid and Level II view, as shown in FIG. 47, to a grid and Chart view, as shown in FIG. 37. A further view may include a grid and a chat discussion on the security, as shown in FIG. 36, or news updates.

Figure 48:
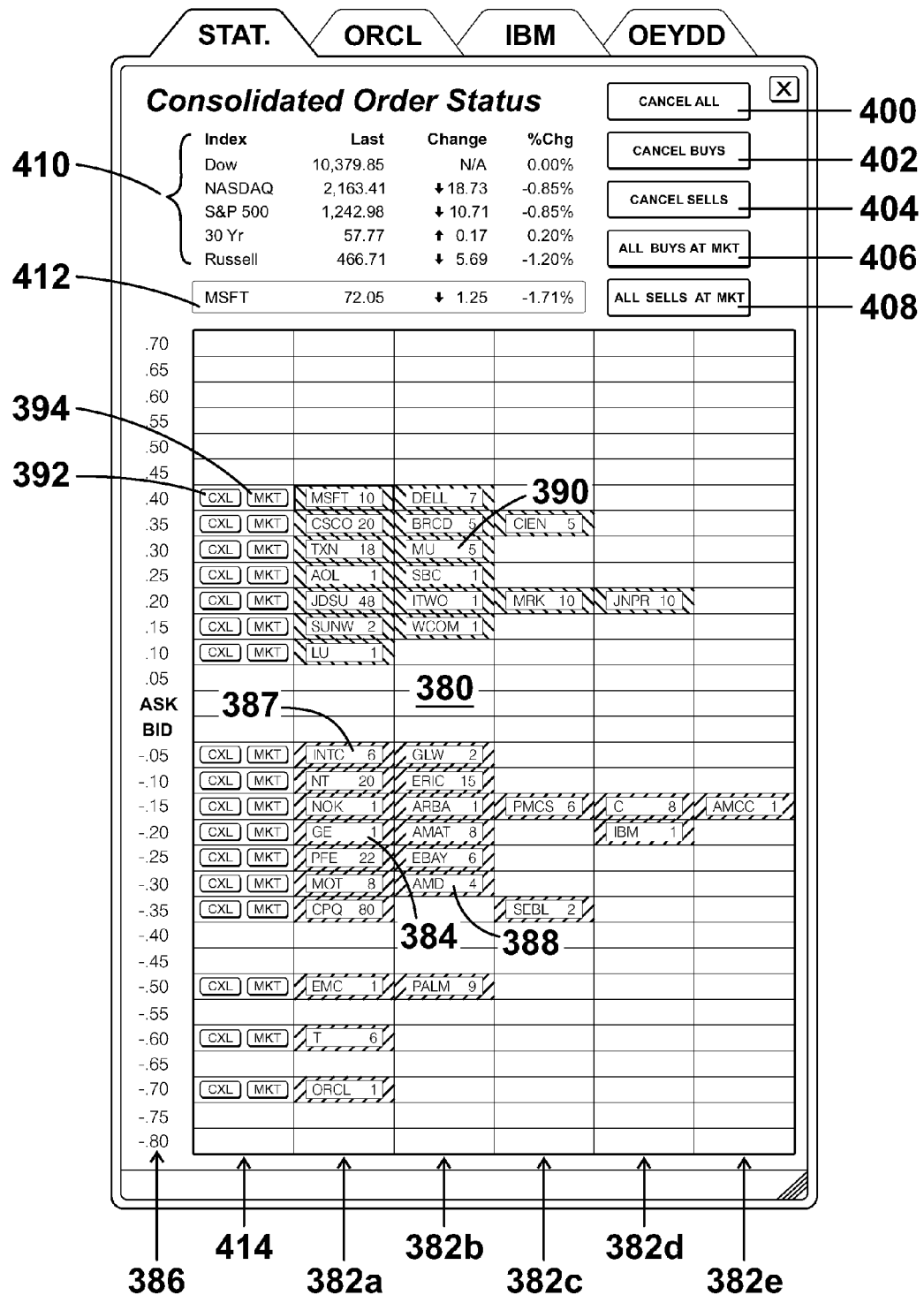
FIG. 48 shows a display having multiple buy and sell orders with their relative position to the bid and ask prices, together with actuating buttons for each price representation.

Turning now to FIG. 48, there is shown a consolidated view 380 of all open orders in a user's account. To obtain this view, the front end system 32 determines whether each open order is on the bid side or the ask side of the underlying security. Then, the front end system 32 plots the relative distance of each order from the security's bid or ask price. The price difference between the bid or ask price and the open limit order is plotted on a common grid and a relative price axis. It results in a cluster of orders around the normalized bid and ask reference points.

For example, GE in column 382a at 384 is an open limit order to buy one lot. The value on the price axis 386 is −0.20, which means that the user's buy order is about 0.20 away from the current bid of GE. If the bin increment was 0.01 instead of 0.05, a more exact calculation of the price gap would be possible. Orders can be dragged and dropped closer or further away from the trading activity, which will effect a change in the price of an open order. If an order is dragged to the opposite side of the market, the system assumes the order has changed to a market order and informs the backend accordingly.

There are two purposes for the columns 382a . . . 382e. The first is to allow multiple orders to overlap at a given price point or price bin. The left to right placement of orders when multiple orders reside in one bin, is determined by the orders closest to the bid or ask price. These orders are placed on the leftmost column. A second ranking variable may be the value of the trade, or the time interval since the order was submitted.

The second purpose for the columns 382a . . . 382e is to allow open orders to be dragged left or right, away from the main cluster of orders so individual stocks or groups of stocks can be segregated and monitored in relation to the central order cluster. For example, semiconductor sector stocks such as INTC (order 387), AMD (order 388), and MU (order 390) may be dragged along the row to the right edge of the grid so the relative performance of those open orders may be monitored for signs of a deteriorating market or an upcoming rally.

The first column 414 contains two user-defined buttons 392, 394 in each cell. In this instance, the buttons are a cancel button, CXL, and a change limit order to market button, MKT, respectively. Pressing either button changes all orders in the relevant row to the designated command.

At the top of the tab page is a column of five larger buttons 400, 402, 404, 406, and 408. When a market event such as a Federal Reserve Board meeting produces breaking news, the user can elect to cancel all open orders at 400, cancel all open buy orders at 402 or open sell orders at 404; or change all open limit buy and limit sell orders, at 406 and 408, respectively, to market orders. Major market moves may be determined by monitoring a defined group of indexes and stocks on the upper portion of the grid, at 410.

When a pointing device such as a mouse is used to select an order cell, the last price, change, and percentage change are displayed above the grid. The security headings 410 are user selectable. In FIG. 48, the stock selected is Microsoft, and its quote data is visible below the value for the Russell 2000 Index at 412.

Each order may be cancelled or have its terms changed by a right click on the selected order cell and choosing the command from the resulting menu.

Figure 49:
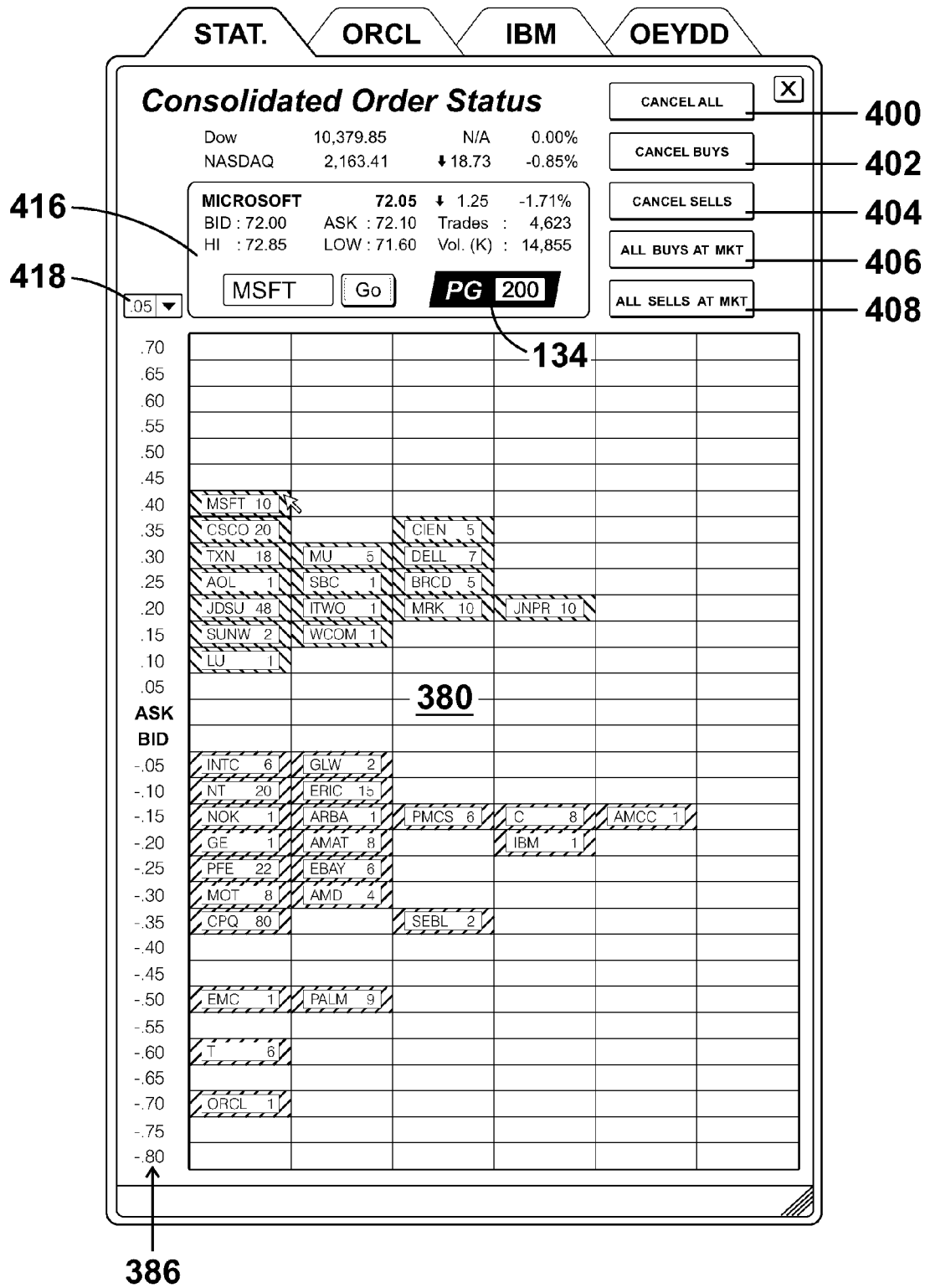
FIG. 49 shows an alternative mode of display to the data shown in FIG. 48.

FIG. 49 shows an alternative representation of a consolidated view of all open orders with the same data as shown in FIG. 48. The relative price axis 386 allows a user to gauge the relative distance of any order from that security's bid or ask price. The first column 414 from FIG. 48 is hidden from view. A Position Guide icon 134 and stock ticker input area 416 above the grid allow quote information to be shown and order quantity recommendations to be made. Dragging from the Position Guide icon 134 to the grid 380 allows the user to drop a buy, sell, or short order for the quoted security onto the grid. Placing the buy order on the BID price row, or below, of the grid designates it to be a limit buy order. Placing the sell order on the ASK price row, or above, of the grid designates it to be a limit sell or a limit short order. Placing a buy order above or on the ask price designates it as a market buy order; and placing a sell order on or below the bid price designates it as a market sell order. The row price bins may be adjusted using the drop down menu 418 near the relative price axis.

Figure 50:
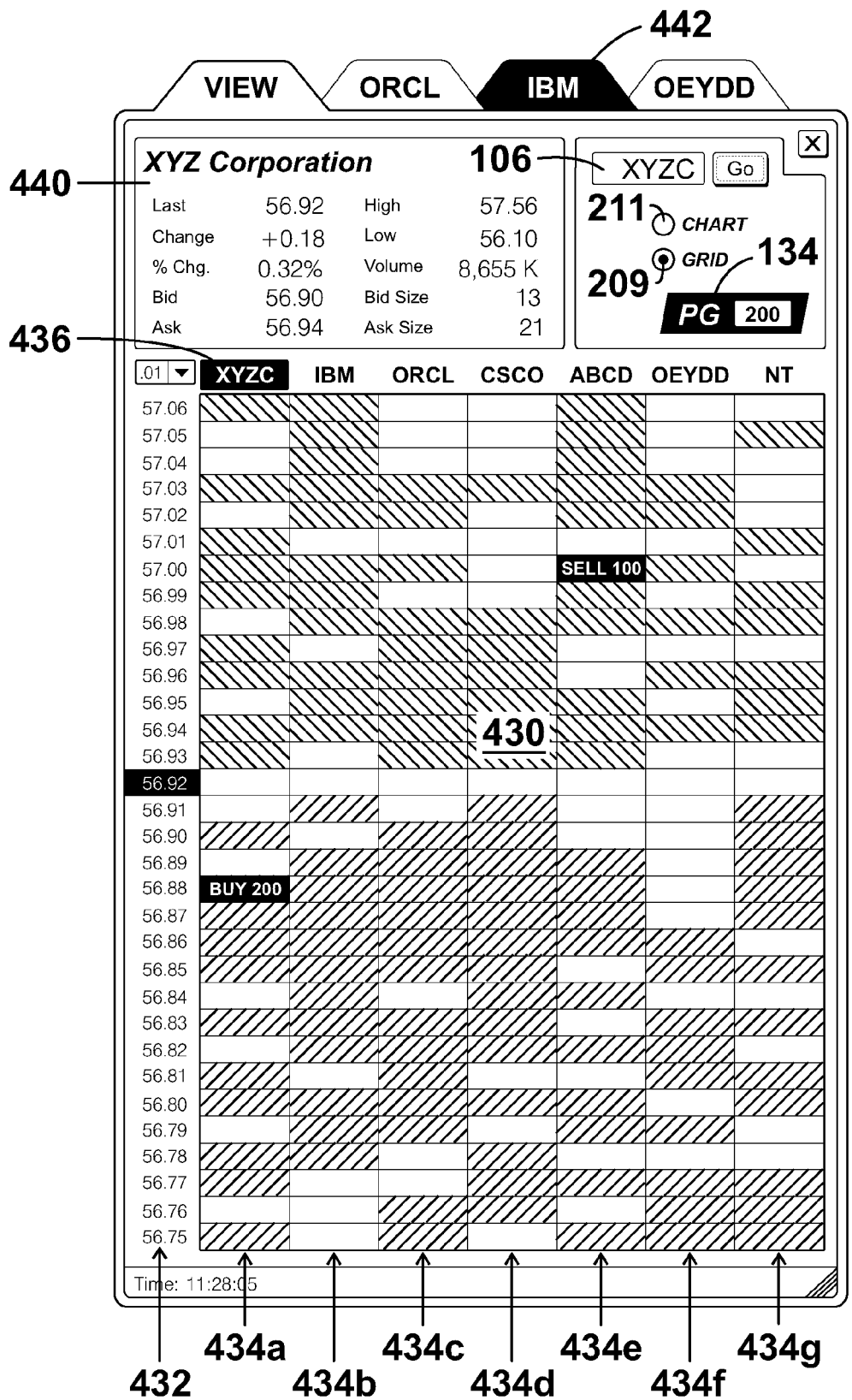
FIG. 50 shows a typical multiple security display with a quote display associated with a selected column, and a highlighted tab.

FIG. 50 is a representation of multiple securities quoted in one grid 430 with one price axis 432. The price axis 432 is adjusted in real time to reflect prices for the security assigned to a selected column 434a . . . 434g. In FIG. 50, XYZ Corp is the security of the selected column and the price axis matches trading activity in XYZ Corp. The column name of XYZC is highlighted at 436 to distinguish it as the price axis reference and as the selected column.

This representation of the grid 430 makes it convenient to monitor multiple options and equities in a single, simple presentation. It also assists in tracking options prices when the underlying equity changes. The price bin settings adjust to references a specific column displayed so they do not need to be constantly adjusted. The selected column may also be dragged to the left or left aligned automatically so that it is next to the price axis. The Position Guide icon 134 is active and relevant for the selected security.

The price axis can show absolute values or relative values.

The security of a selected column can be changed by entering a second symbol in the symbol text box 106. Summary information on the security 440 appears on the upper section of the tab page. The tab 442 for IBM is highlighted in the tab set. This is an indication that an event has occurred that requires the user's attention. Such events may be orders that are filled, a trade through an important price level, or a recent news release.

Figure 51:
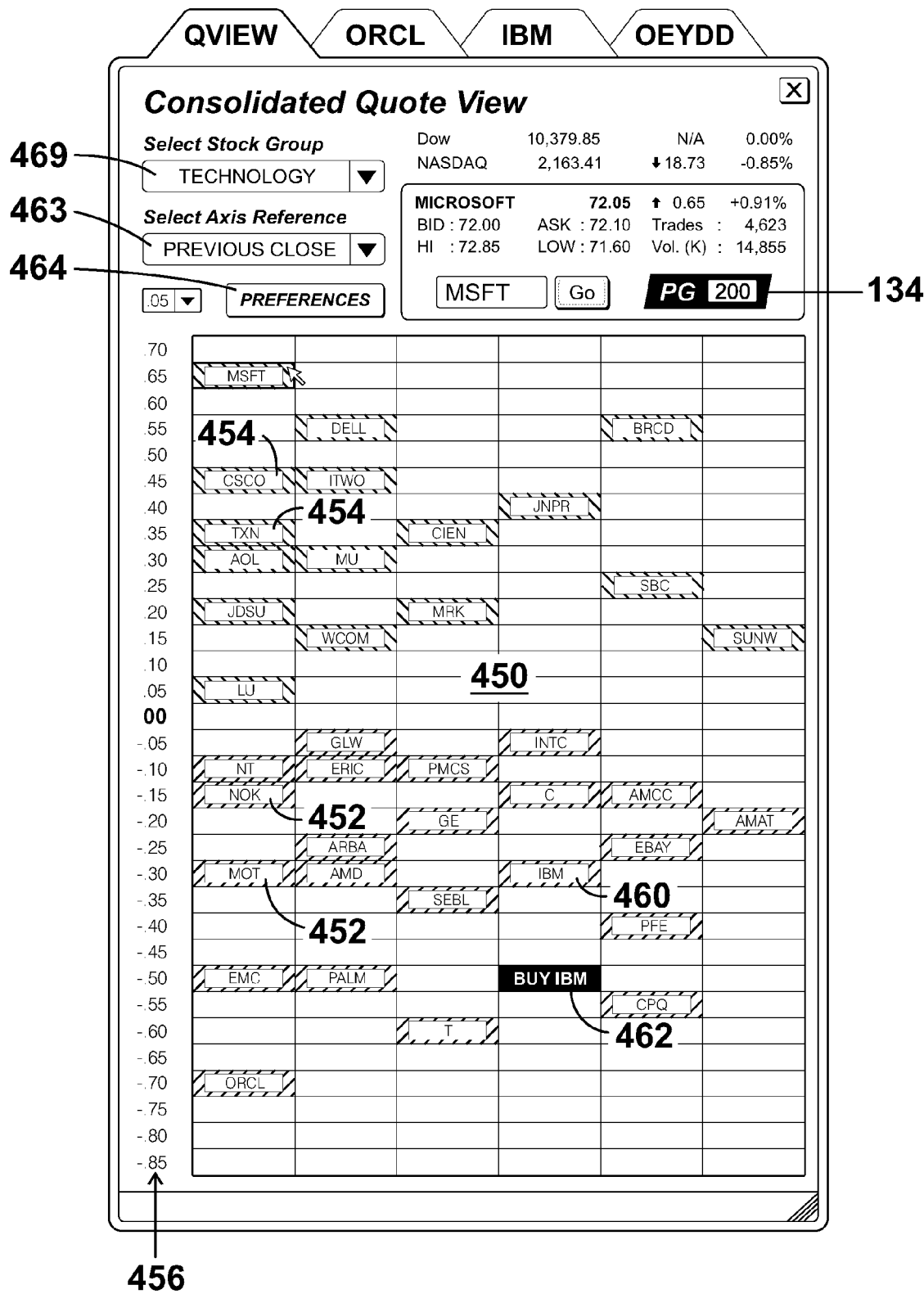
FIG. 51 shows a consolidated quote view for selected securities within a selected grouping.

FIG. 51 is a representation of a grid 450 consisting of both order cells 462 and quote cells 452, 454, and 460. Quote cells 452, 454 and 460 each represent a single security, and move on the grid 450 in real time in accordance with a derived difference calculation between two or more parameters. Order cells, for example IBM order cell 462, represent a limit order and can be dragged and dropped on the grid to adjust the order cell price in real time. Order cells are associated with a given security's quote cell. As the quote cell and the order cell move towards each other along the price axis, the order comes closer to being filled. When the order cell and the quote cell are on the same price axis segment, the order has the highest probability of being filled, as it is at the last trade price.

A selected grouping of stocks chosen from drop down menu 469, may be shown in this grid 450 representation. The stock group may be an index, industry sector stocks, a user defined list of securities, or a grouping selected on the basis of some technical criteria. The relative price axis 456 can show the difference value between two selected criteria. If a relative price axis 456 is used, the axis can be referenced to the bid, ask, last trade, high, low, open, prior closing price values, or a technical indicator associated with the underlying security, as selected in drop down menu 463. For example, a security close to its 50 day moving average can have the relative price axis 456 referenced to the 50 DMA value, and the user can monitor the security on the grid 450 to see if it holds the support level or falls under the moving average.

Two examples illustrate the use of this grid 450 representation. In the first example, assume that a specific value on the relative price axis 456 is derived from the difference between the prior closing price of a security and the last trade price during the current session. The grid 450 shows a quote cell 460 for IBM at negative 0.30 on the relative price axis 456. This is understood to mean that IBM's last trade in the current session is $0.30 below yesterday's closing price on IBM. The buy order 462 on IBM is seen to be $0.50 below yesterdays closing price, and $0.20 below the current last trade of IBM. If IBM falls, the quote cells will appear to fall towards the IBM buy cell 462. If IBM continues to fall through the buy order, the order will be filled and reported as such. If the user feels that IBM will fall significantly past the buy order, the user can drag the IBM buy order 462 down the column in order to lower the buy price for the IBM order as referenced along the relative price axis 456.

The benefit of using the relative price axis approach of FIGS. 48-49 and FIGS. 51-52 is that it allows different securities trading or quoted at different prices to be plotted and simultaneously visible on a common grid along with the user's associated open orders for each security in close proximity. An absolute price axis, for example the price axis 102, may be used to plot the last trade price or a quote price from multiple securities, however, securities trading or quoted in a wide price range and their respective open orders may not be simultaneously visible in the price range shown on such a common grid. FIG. 50 shows one approach that can be used to plot the prices of multiple securities on a common grid using an absolute price axis.

In the second example, assume that a specific value on the relative price axis is the difference between the value of the 50 day moving average (50 DMA) of a stock and its last trade price. In this case, if we look at IBM quote cell 460, we would interpret the grid as indicating that IBM is trading $0.30 below its 50 day moving average. The IBM buy order 462 represents a price point of $0.50 below IBM's 50 DMA. If IBM falls in price during the current trading session, the IBM quote cell 460 would fall on the grid towards the IBM buy order 462. If IBM continues to fall through the buy order 462, the order will be filled and reported as such. If the user feels that IBM will continue to fall further below the current buy price, the user can drag the buy order down the relative price axis in order to lower the buy price for the IBM order.

Orders can be entered directly from the tab page by selecting a quote cell. The Position Guide icon 134 will display a share recommendation for the selected security, which can be adjusted as desired, and dragged onto the grid to the desired position in relation to the quote cell. A preferences button 464 allows users to customize settings and display options, and to create complex formulae, for the derived price axis value 456.

It should be understood that the relative price axis 456 value is derived by a price difference between two technical indicators, for example a moving average or a prior session's closing price and the last trade price of the displayed quote cell for any given security. The two values needed to derive the difference signal can be based on a simple statistic such as the last trade price and the prior closing price. However, the two values can also be based on complex formulae involving multiple variables. With the use of multiple quote cells and groups of securities, general market trends would be more evident in this grid view than in a grid view of a single equity. A falling market would show the majority of quote cells falling on the grid. As noted earlier, the relative price axis 456 values can be locked in position, or float to show the most representative view of all cells.

Figure 52:
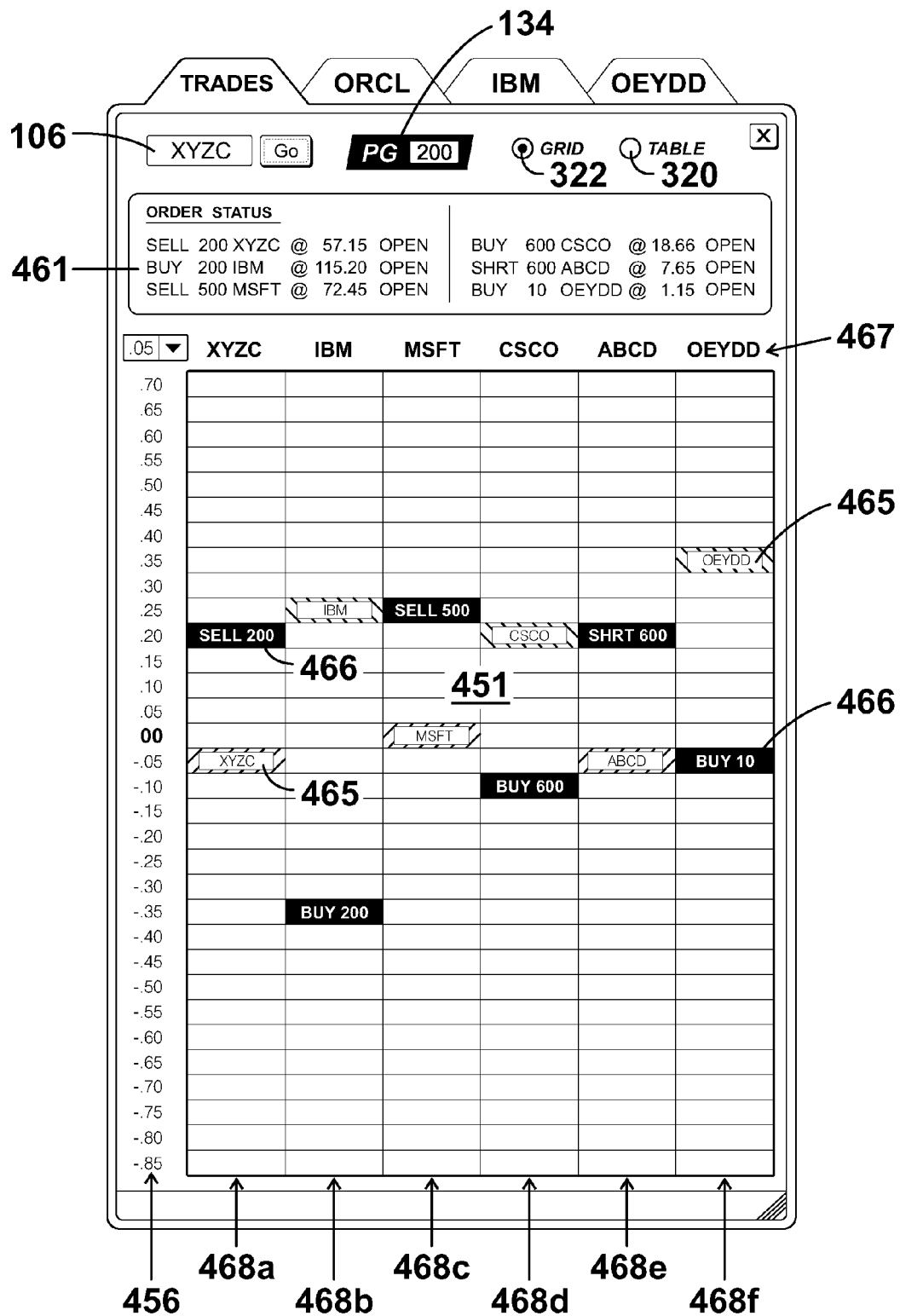
FIG. 52 provides similar data to FIG. 50, with each column being related to a specific security.

FIG. 52 represents a further, more orderly view of a grid with a relative price axis, wherein each column is associated with a unique security. The relative price axis 456 of FIG. 51 remains, as does the input methods (although not shown) to derive the difference value. An order status area 461 above the grid 451 allows fills to be reported for easy reference. Securities in a column can be changed by double clicking a column heading 467 or name, and entering an alternative ticker symbol in the text box 106.

Quote cells 465 and any order cells 466 for a specific security are located within a designated column 468a . . . 468f for that security. Each column can contain stocks, options, or other securities. Price quotes used to derive the relative price axis value can be combined from one or more market participants.

Figure 53A:
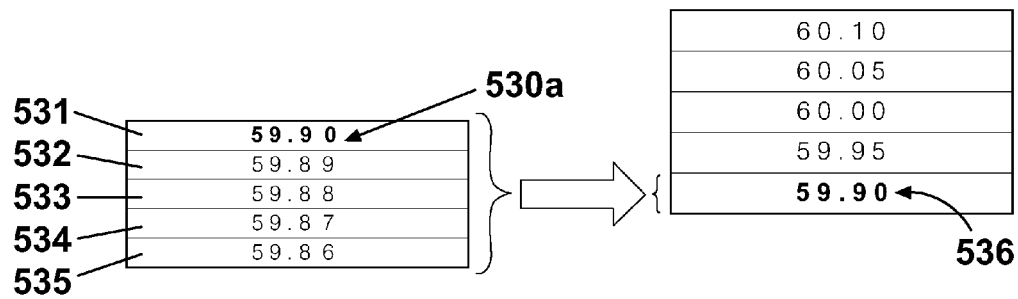
FIGS. 53a, 53b, and 53c show the manner in which price data may be mapped to any selected cell, where the price range represented by that cell may be changing.
Figure 53B:
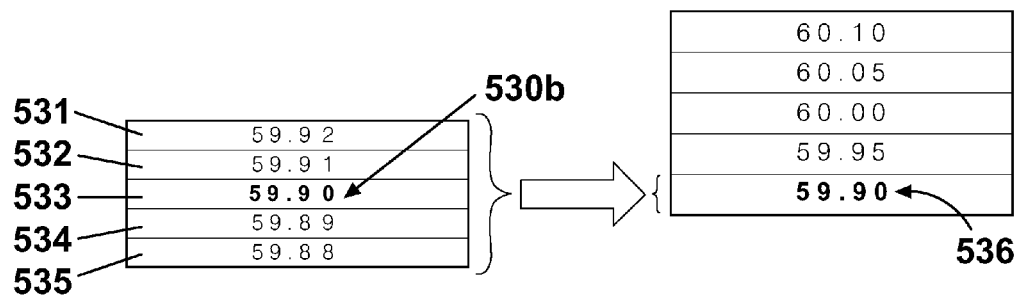
Figure 53C:
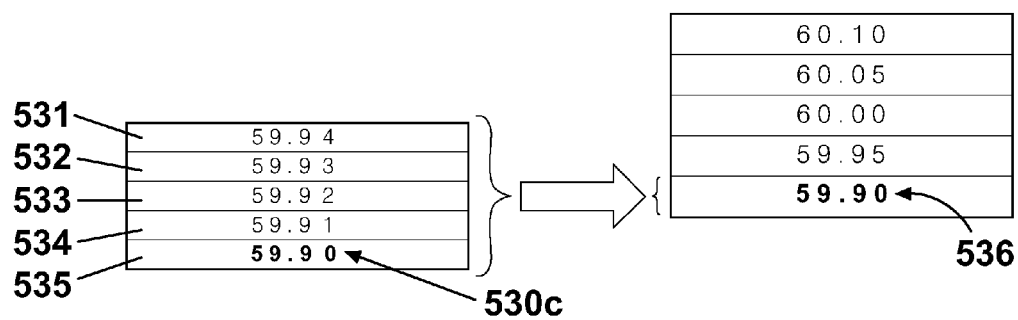

Turning now to FIGS. 53a, 53b, and 53c, there are shown representations of how prices associated with a sequence of rows can be grouped into a single row as the visible price range is expanded. On the left side of each of FIGS. 53a, 53b, and 53c, there are five adjacent cells or rows 531, 532, 533, 534, and 535. For example, as the bin size is changed from 0.01 to 0.05, the price range of the price axis visible on the grid expands. The nominal bin price label 536 of value 59.90, shown at the right side of each FIGS. 53a, 53b, and 53c, can be assigned from the price label shown at the top 530a, center 530b, or bottom 530c position of the five rows 531 . . . 535 on the left. Which five values shown on the left side are mapped to a five-cent bin on the right side, and how the nominal price label 536 of the larger five-cent bin is selected, is defined by the user in the user preferences or by the trader's brokerage.

Since orders are usually not entered in increments finer than the Minimum Price Variance (MPV), the basic price range on a grid is based on the MPV. The number of distinct MPV price levels associated with a particular price bin is a function of the specific security, volatility of the security, and the user preference of the front end. The number of visible price bin rows may contract when a grid is zoomed out to show a birds eye view of trading activity. How smaller rows, such as 0.01 increment rows, map into larger 0.05 bin rows, affects how a bin cell shows a quote or order, and how it does not, as discussed above.

A standard protocol is utilized so as to define the format of instructions and data that are exchanged between the front end 32 and any backend system 44. That standard protocol may be based on XML.

The method depicted in FIG. 53*b* is used, for example, when market data from the 0.01 price increments in grid 120 of FIG. 10 are mapped to the 0.05 price increments shown in grid 122 of FIG. 11.

Each of the input parameters and each of the return value items for the set of instruction and data noted above is linked to a respective GUI object in the software which is at any trader's front end 32.

In another embodiment of the present invention, a component-oriented approach is used to implement the "grid-based graphical interface" as a software object. Such an approach is in keeping with modern software development technology, which currently favors the construction of application programs based on distinct units called "components" or "objects".

A software object is a self-contained, re-usable programming construct that encapsulates both data and behavior. Software objects utilized according to the principles of component-based software development facilitate the creation of application programs using pre-built building blocks. This approach greatly simplifies software development and helps shorten the software development life cycle. Major software vendors like Microsoft Corporation and Sun Microsystems, among others, have adopted and are increasingly promoting component-based software technology. Microsoft Corporation has its Component Object Model (COM), ActiveX, and Web Services technologies, while Sun Microsystems has its JavaBeans, Enterprise JavaBeans, Java applets, and Swing/JFC component technologies.

Figure 54:
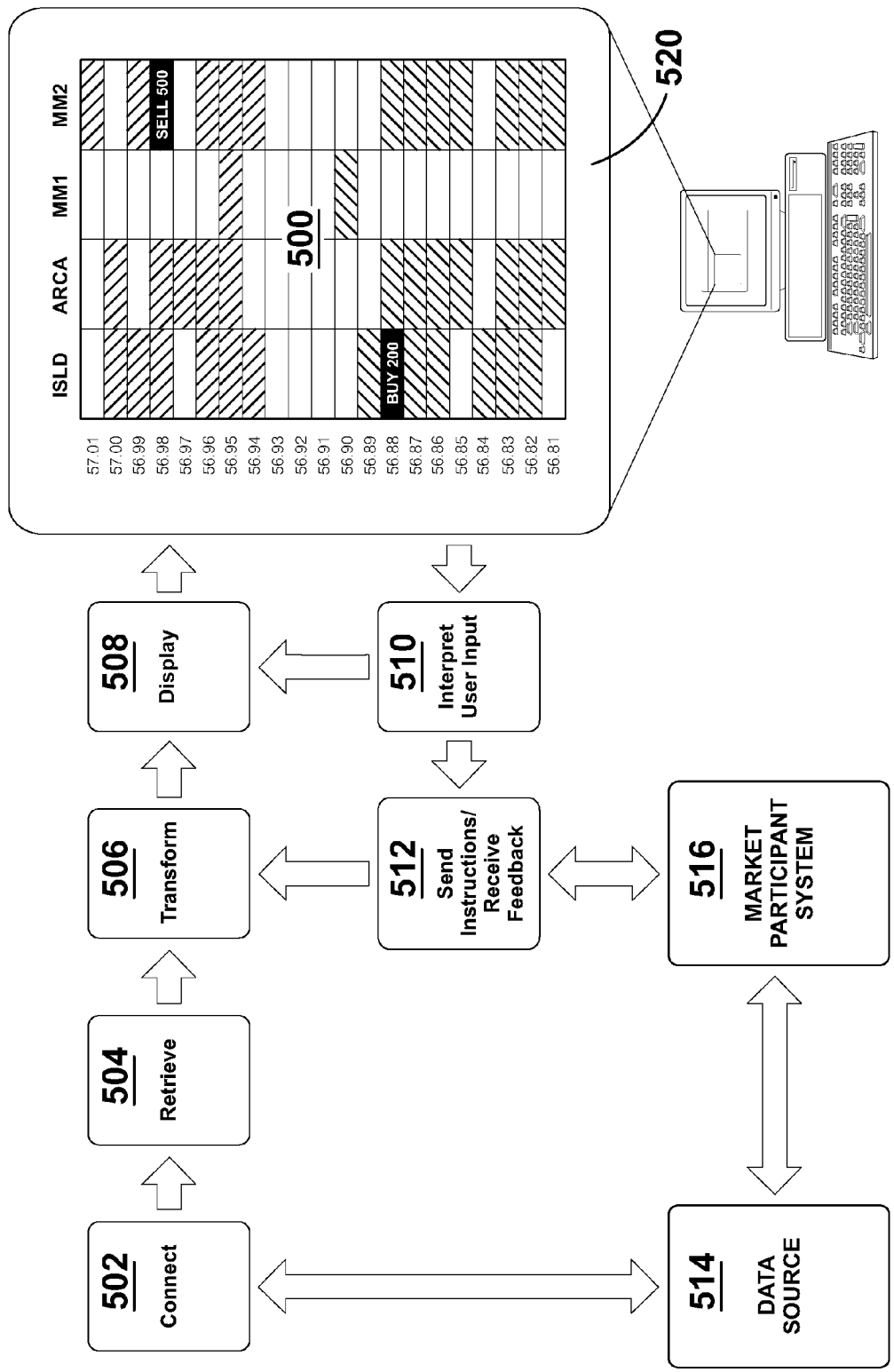
FIG. 54 illustrates a further embodiment of the present invention employing a grid-based graphical interface as a software object.

A software object implementing the functionality of the "grid-based graphical interface" of the foregoing descriptions is shown in FIG. 54. It will be noted that what is shown in FIG. 54 is actually a blow-up of the grid graphical object 52 depicted in FIG. 5.

The software object executes on a computer and has two aspects: (1) its visual manifestation, which is displayed on the computer screen, and which a user sees and interacts with; and (2) its program logic, which is implemented in computer code. The software object's program logic includes six methods or processes, which the software object employs to accomplish its tasks. However, it is also to be noted that the six processes noted below are only representative of all possible combinations of methods and processes that the software object may employ.

The software object's visual manifestation is composed of one or more axes, a drawing area, and GUI objects (icons, images, geometric shapes). The software object's visual manifestation is where trading data is graphically presented. This graphical presentation can employ several styles.

It must be stated that the software object's visual appearance can exactly match the visual appearance of the "grid-based graphical interface" of the foregoing descriptions, as seen at 500 in FIG. 54.

The software object's program logic consists of the following processes: (1) Connect process 502; (2) Retrieve process 504; (3) Transform process 506; (4) Display process 508; (5) Interpret User Input process 510; and (6) Send Instructions/Receive Feedback process 512.

The Connect process 502 is used by the software object to establish connections with one or more data sources, 514.

The Retrieve process 504 is used by the software object to receive trading data from a data source 514.

The Transform process 506 is used by the software object to process the trading data it receives from data sources 514.

The Display process 508 is used by the software object to plot and render GUI objects, each one representing an order or a quote, on the software object's drawing area 520.

The Interpret process 510 is used by the software object to receive and interpret inputs coming from the user. These inputs might be commands to change the graphical properties of the visual manifestation, or they might be inputs that effect a trading transaction.

The Send Instructions/Receive Feedback process 512 is used by the software object to automatically generate and transmit transaction instructions, as a result of the user's interaction with specific elements of the software object's visual manifestation. This process 512 also receives feedback data pertaining to the status of the previously transmitted transaction instructions.

A Data Source 514 is any system that can supply trading data. It can be any or a combination of the following: securities exchanges, stock markets, currency markets, commodities exchanges, electronic communication networks (ECNs), brokerage firms, data feed providers, market simulation software, and trading data published on any suitable media (such as CD-ROM).

A Market Participant System 516 is any system that can receive, validate, route, and possibly execute trading orders. It can be any or a combination of the following: securities exchanges, stock markets, currency markets, commodities exchanges, electronic communication networks (ECNs), brokerage firms, order-entry firms, and market simulation software.

Often times, the Data Source 514 and the Market Participant System 516 are one and the same system. This is the case, for example, when the Data Source is Island ECN, and the Market Participant System is also Island ECN.

FIG. 55 illustrates yet a further visual manifestation of the object's visual appearance 500, with the data being presented in a more iconic fashion. As seen, however, a somewhat different convention is used, in that bid prices are shown with round icons 501, ask prices are shown with square icons 503, a buy order is shown with an hexagonal icon 505, and a sell order is shown with a trapezoidal-shaped icon 507.

Each of FIGS. 54 and 55 show prices and trading activity for a selected security, with the activities of several market participants being indicated. The same data is shown in each of the FIGS. 54 and 55. Also, the same data are shown in FIG. 3.

An interactive grid-based graphical trading system, and the interactive relationship of the trading system where a plurality of traders and a plurality of market participants will be found, has been described.

The software, and particulars of the software, have been described to the extent necessary, it being understood that any person skilled in the art of writing software for the appropriate platform such as ActiveX, Windows, GUI-based systems, and so on, may write specific software, and may provide specific functional and logical architecture, without departing from the spirit and the scope of the appended claims.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. An interactive grid-based graphical trading system for use by any trader who engages in trading securities through established security trading markets, in essentially real time, where the system comprises a grid-based graphical interface for use by any trader, said graphical interface being adapted to establish a connection with any backend system used by any market participant through suitable communication channels;

wherein said interactive grid-based graphical trading system is available through a computer at each participating trader's site;

wherein said interactive grid-based graphical trading system for use by any trader is adapted to receive and display market trading data received from a plurality of market participants, in essentially real time; and wherein any trader may select any particular securities for which data are electively required, at any instant in time;

wherein said interactive grid-based graphical trading system includes first process means that function to send transaction instructions through said communication channels to the backend system used by any market participant, and to receive messages from said backend system through said communication channels; and wherein said grid-based graphical interface includes second process means that function to receive, process, and display said market trading data, and said messages, to any trader;

wherein said market trading data includes information chosen from the group of market trading data consisting of: order data as to buy, sell, or other trading orders existing at that instant in time for any selected security or group of securities, quote data as to bid and ask prices, volume, market participant identifiers, and other parameters, existing at that instant in time for any selected security or group of securities; wherein said market trading data is transmitted to each said grid-based graphical interface at the site of any participating trader from said backend system of any market participant in computer-readable electronic format;

wherein said interactive grid-based graphical trading system includes third process means that function to transform said market trading data received from any back end system, at any instant in time, into a graphical representation for display on any display device, wherein said graphical representation includes at least one grid having a plurality of cells arranged in an array of at least one row or at least one column;

wherein a row is an arrangement of horizontally adjacent cells with at least one common property, and a column is an arrangement of vertically adjacent cells with at least one common property, and wherein each cell within the said plurality of cells belongs to one row and one column;

wherein said plurality of cells is arranged in a matrix chosen from the group consisting of a plurality of rows and at least one column, and in a plurality of columns and at least one row, and wherein said plurality of rows or said plurality of columns are associated with an axis representing price;

wherein any cell is associated with said market trading data, and contains a graphical representation of said market trading data, and is associated with a specific price or range of prices; wherein each cell along said price axis indicates a price or price range for which said market trading data exists, and the other of said at least one column or said a least one row is indicative of a specific criterion chosen from a plurality of selected criteria within which said market trading data is categorized as to price or a range of prices; and wherein any trader can place, or modify, an order for a selected security or group of securities, over which that trader has discretion, by interacting with said grid-based graphical interface; wherein said interaction can be accomplished by a drag and drop operation; and wherein said order or said quote is represented graphically in a cell.

2. The interactive grid-based graphical trading system of claim 1, wherein said communication channels are network-based, so that at any instant in time a connection between any trader and a backend system of any market participant may be persistent or intermittent.

3. The interactive grid-based graphical trading system of claim 2, wherein said network is the Internet.

4. The interactive grid-based graphical trading system of claim 1, wherein any cell in said plurality of cells is assigned specific visual or graphical attributes or properties chosen from the group of graphical or visual attributes or properties consisting of: color, border, label indicator, graphic overlay, text overlay, and combinations thereof; and wherein the specific attribute or property assigned to any cell is a function of the specific market trading data associated therewith.

5. The interactive grid-based graphical trading system of claim 1, wherein any trader can modify the parameters of any order, over which that trader has discretion, for a selected security or group of securities being displayed on the grid-based graphical interface, at any instant in time, by selecting a relevant order cell using a pointing device interactive with said grid-based graphical interface, and dragging and dropping said selected relevant order cell to a destination cell; wherein said dragging and dropping of said selected relevant order cell causes said grid-based graphical interface to activate said first process means to send transaction instructions comprising an amendment of previous specific trading parameters associated with the relevant selected order; and wherein said second process means electively affects an alteration of the specific visual or graphical properties assigned to both said relevant order cell and said destination cell.

6. The interactive grid-based graphical trading system of claim 1, wherein said axis associated with price is presented as a specific price range above and a specific price range below the last traded price of a selected security or groups of securities at any instant in time, and wherein said last traded price is present on said price axis.

7. The interactive grid-based graphical trading system of claim 1, wherein said communication channels include middleware used by any market participant.

8. The interactive grid-based graphical trading system of claim 6, wherein the price difference between two adjacent cells along said price axis is the minimum price variance (MPV), or a multiple of the minimum price variance, for any selected security or groups of securities being displayed at any instant in time.

9. The interactive grid-based graphical trading system of claim 1, wherein said market trading data representing specific order data and quote data for a selected security or group of securities, is presented in a matrix comprising a plurality of rows and a plurality of columns of cells, wherein each row of cells or each column of cells is associated with a specific price or range of specific prices for any given security or group of securities, and wherein said market trading data being displayed in any cell of said row of cells or said column of cells includes a plurality of specific components related to selected market parameters associated with said data.

10. The interactive grid-based graphical trading system of claim 9, wherein specific order data and specific quote data are linked and associated to a respective one of a set of GUI objects in said grid-based graphical interface at each said trader's location.

11. The interactive grid-based graphical trading system of claim 7, wherein said middleware functions to translate data and instructions sent over any communication channel into a format that is understood by said grid-based graphical interface at any trader's location, or a respective backend system at any market participant's location.

12. The interactive grid-based graphical trading system of claim 11, wherein said middleware has components therein to translate any trading order instruction issued thereto from a trader, or to translate messages from a market participant.

13. The interactive grid-based graphical trading system of claim 1, wherein said grid-based graphical interface for any trader has a data storage.

14. The interactive grid-based graphical trading system of claim 7, wherein said middleware has an associated data storage relevant to said system.

15. The interactive grid-based graphical trading system of claim 1, wherein a selected security for which said trading data is displayed at any instant in time may be changed to another selected security by any trader, at any instant in time.

16. The interactive grid-based graphical trading system of claim 1, wherein the trading data for any selected security being displayed at any instant in time by any trader is constantly updated having regard to new trading data being received by the grid-based graphical interface for that selected security.

17. The interactive grid-based graphical trading system of claim 1, wherein any backend system will perform at least the following tasks: account management for each trading account, processing trading orders for each valid transaction which a trader issues; order execution, whereby each valid transaction issued by any trader is executed; data dissemination, whereby market trading data concerning any security is delivered to any trader's grid-based graphical interface; and backend system management for monitoring and maintaining security and operation of the backend system.

18. The interactive grid-based graphical trading system of claim 1, wherein each market participant is chosen from the group consisting of stock brokerages, electronic communication networks (ECN's), stock exchanges, commodity exchanges, futures exchanges, bourses, and auction houses.

19. The interactive grid-based graphical trading system of claim 1, wherein each selected security for which market trading data is displayed is chosen from the group consisting of shares of stock, commodities, futures, options, bonds, warrants, exchange traded funds (ETFs), share or index based options, futures contracts, options on futures contracts, and items that are bought or sold by auction.

20. The interactive grid-based graphical trading system of claim 1, wherein data communications over said communications channels are in keeping with selected protocols which are established to standardize data interchange between the grid-based graphical interface communicating over any said communications channels, with any backend systems; wherein said data communications may electively use secure data encryption modes.

\* \* \* \* \*